US00RE49014E

(19) United States
(12) Reissued Patent
Amano et al.

(10) Patent Number: US RE49,014 E
(45) Date of Reissued Patent: Apr. 5, 2022

(54) VOICE INTERACTION METHOD, AND DEVICE

(71) Applicant: Panasonic Intellectual Property Corporation of America, Torrance, CA (US)

(72) Inventors: Hiroshi Amano, Osaka (JP); Masayuki Kozuka, Osaka (JP); Motoji Ohmori, Osaka (JP); Takako Hirose, Kyoto (JP); Toshihisa Nakano, Osaka (JP); Takahiro Yamaguchi, Kanagawa (JP)

(73) Assignee: PANASONIC INTELLECTUAL PROPERTY CORPORATION OF AMERICA, Torrance, CA (US)

(21) Appl. No.: 16/268,938

(22) Filed: Feb. 6, 2019

Related U.S. Patent Documents

Reissue of:
(64) Patent No.: 9,564,129
Issued: Feb. 7, 2017
Appl. No.: 14/777,920
PCT Filed: Jun. 10, 2014
PCT No.: PCT/JP2014/003097
§ 371 (c)(1),
(2) Date: Sep. 17, 2015
PCT Pub. No.: WO2014/203495
PCT Pub. Date: Dec. 24, 2014

U.S. Applications:
(60) Provisional application No. 61/836,763, filed on Jun. 19, 2013.

(51) Int. Cl.
*G10L 15/00* (2013.01)
*G10L 21/00* (2013.01)
(Continued)

(52) U.S. Cl.
CPC ..... *G10L 15/22* (2013.01); *G06F 3/167* (2013.01); *G10L 15/08* (2013.01); *G10L 15/222* (2013.01);
(Continued)

(58) Field of Classification Search
CPC ..... G06F 3/167; G10L 15/08; G10L 15/22; G10L 15/222; G10L 15/32; G10L 2015/088
See application file for complete search history.

(56) References Cited

U.S. PATENT DOCUMENTS 6,229,880 B1 * 5/2001 Reformato ..... H04M 1/64 379/207.02
6,249,720 B1 6/2001 Kubota et al.
(Continued)

FOREIGN PATENT DOCUMENTS

CN 101558443 10/2009
CN 101689366 3/2010
(Continued)

OTHER PUBLICATIONS

International Search Report dated Sep. 9, 2014 in corresponding International Application No. PCT/JP2014/003097 (with English translation).
(Continued)

*Primary Examiner* — Rachna S Desai
(74) *Attorney, Agent, or Firm* — Wenderoth, Lind & Ponack, L.L.P.

(57) ABSTRACT

A voice dialogue method performed by a voice dialog system includes: a voice signal generation unit; a voice dialog agent unit; a voice output unit; and a voice input control unit, the method including: a step of, by the voice signal generation unit, receiving a voice input and generating a voice signal based on the received voice input; a step of, by the voice dialog agent unit, performing voice recognition processing on the voice signal and performing processing based on a result of the voice recognition processing to generate a response signal; a step of, by the voice output unit, outputting a voice based on the response signal; and a step of, when the voice output unit outputs the voice, by the
(Continued)

voice input control unit, keeping the voice signal generation unit, for predetermined period after output of the voice, a receivable state in which a voice input is receivable.

9 Claims, 44 Drawing Sheets

(51) Int. Cl.
*G10L 15/22* (2006.01)
*G06F 3/16* (2006.01)
*G10L 15/08* (2006.01)
*G10L 15/32* (2013.01)

(52) U.S. Cl.
CPC ..... *G10L 15/32* (2013.01); *G10L 2015/088* (2013.01)

(56) References Cited

U.S. PATENT DOCUMENTS 6,480,599 B1 * 11/2002 Ainslie ..... H04M 3/493 379/220.01
6,636,831 B1 * 10/2003 Profit, Jr. ..... G10L 15/26 704/270
7,003,079 B1 * 2/2006 McCarthy ..... H04M 3/493 379/265.02
7,039,166 B1 * 5/2006 Peterson ..... H04M 3/493 379/265.03
7,117,051 B2 * 10/2006 Landry ..... H04L 12/2818 700/83
7,177,402 B2 * 2/2007 Metcalf ..... H04L 12/2856 358/402
7,228,275 B1 * 6/2007 Endo ..... G10L 15/32 704/231
7,460,652 B2 * 12/2008 Chang ..... H04M 3/493 379/212.01
7,903,792 B2 * 3/2011 Balentine ..... H04L 69/329 379/76
8,150,020 B1 * 4/2012 Blanchard ..... G10L 15/22 379/265.03
9,263,058 B2 * 2/2016 Huang ..... G10L 15/22
9,558,745 B2 * 1/2017 Schalk ..... G10L 15/22
9,564,129 B2 * 2/2017 Amano ..... G10L 15/222
10,181,099 B2 * 1/2019 Penilla ..... G09G 5/14
10,546,441 B2 * 1/2020 Joao ..... G07C 9/00896
10,798,244 B2 * 10/2020 Stepanian ..... G06Q 30/0241
2002/0046023 A1 4/2002 Fujii et al.
2003/0163309 A1 8/2003 Yamada et al.
2004/0044516 A1 3/2004 Kennewick et al.
2005/0033582 A1 * 2/2005 Gadd ..... G06Q 30/02 704/277
2005/0256712 A1 * 11/2005 Yamada ..... G10L 15/065 704/255
2007/0265831 A1 * 11/2007 Dinur ..... G06F 17/273 704/10
2008/0208584 A1 * 8/2008 Ativanichayaphong ..... G10L 15/22 704/260
2009/0150156 A1 6/2009 Kennewick et al.
2010/0076751 A1 3/2010 Chikuri
2011/0172994 A1 * 7/2011 Lindahl ..... G10L 15/22 704/211
2011/0208525 A1 8/2011 Inoue et al.
2012/0221502 A1 * 8/2012 Jerram ..... G06Q 30/02 706/46
2014/0095173 A1 * 4/2014 Lynch ..... G10L 15/22 704/275
2014/0304365 A1 * 10/2014 Khanna ..... H04L 67/02 709/217
2020/0105082 A1 * 4/2020 Joao ..... H04L 67/125
2020/0193748 A1 * 6/2020 Konicek ..... G08B 13/00

FOREIGN PATENT DOCUMENTS

EP 1154406 A1 * 11/2001 ..... G10L 15/26
EP 1591979 A1 * 11/2005 ..... G01C 21/3608
JP 11-37766 2/1999
JP 2001-56225 2/2001
JP 2002-116797 4/2002
JP 2003-241797 8/2003
JP 2004-233794 8/2004
JP 2004-240150 8/2004
JP 2005-266192 9/2005
JP 2006-178175 7/2006
JP 2008-90545 4/2008
JP 2011-232619 11/2011
JP 2013-114020 6/2013
WO 2009/145796 12/2009

OTHER PUBLICATIONS

Extended European Search Report dated Jun. 1, 2016 in European Application No. 14814417.3.
Office Action issued Jun. 1, 2018 in Chinese Application No. 201480021678.6 (with English translation of Search Report).
Lin et al., (1999). "A distributed architecture for cooperative spoken dialogue agents with coherent dialogue state and history." In: Proc. Workshop Automatic Speech Recognition and Understanding.*

* cited by examiner

FIG. 5

Dialogue DB 500

| 510 Keyword | 520 Target device | 530 Startup application | 540 Processing details | 550 Response text |
|---|---|---|---|---|
| What is Mr. XX's address (birthday/phone number)? | Smartphone | Contact information | Check Mr. XX's address (birthday/phone number) | Mr. XX's address (birthday/phone number) is YY. |
| Make call to Mr. XX | Smartphone | Phone | Make call to Mr. XX | Call to Mr. XX is made. |
| Play back XX | Smartphone | Music | Play back XX | XX is playing back. |
| Send message to Mr. XX | Smartphone | Message | Send message to Mr. XX | Message is sent to Mr. XX. |
| Set XX for YY o'clock | Smartphone | Calendar | Set XX for YY o'clock | XX is set for YY o'clock. |
| Remind XX | Smartphone | Reminder | Set XX in reminder | XX is set in reminder. |
| Check mail | Smartphone | Mail | Check mail | Mail is checked. |
| What is weather (forecast) of XX? | Smartphone | Weather | Check weather (forecast) | Weather (forecast) of XX is YY. |
| What is stock price of XX? | Smartphone | Stock price | Check stock price of XX | Stock price of XX is YY. |
| Wake up at XX o'clock, set alarm for XX o'clock | Smartphone | Timer | Set alarm for XX o'clock | Alarm is set for XX o'clock. |
| Note XX | Smartphone | Memo | Note XX in notepad | XX is noted in notepad. |
| Check XX, search for XX | Smartphone | Web search | Search for XX on Web and display search result on display | XX is searched for on Web and search result is displayed on display. |
| ... | ... | ... | ... | ... |
| Time-shift XX | Recorder | Time-shifting | Time-shift XX program | XX program is time-shifted. |
| ... | ... | ... | ... | ... |
| Wash | Washing machine | Washing | Turn on washing machine | Washing is made. |
| ... | ... | ... | ... | ... |

Target agent DB 2300

| 2310 Keyword | 2320 Target agent | 2330 IP address |
|---|---|---|
| In-car | Car agent | 132.182.xxx.48:443 |
| Car | Car agent | 132.182.xxx.48:443 |
| Vehicle | Car agent | 132.182.xxx.48:443 |
| Navigation system | Car agent | 132.182.xxx.48:443 |
| Convenience store | Retailer agent | 156.222.yyy.1:442 |
| ... | ... | ... |
| Living room | Home agent | 142.162.zzz.3:2000 |
| Entrance | Home agent | 142.162.zzz.3:2000 |
| Toilet | Home agent | 142.162.zzz.3:2000 |
| ... | ... | ... |

FIG. 31

Available service DB 3100

| 3110 Keyword | 3120 Target agent | 3130 Processing details | 3140 IP address | 3150 Availability |
|---|---|---|---|---|
| Temperature, In-car | Car agent | Acquire and display temperature in car | 132.182.xxx.48:443 | Available |
| Temperature, Living room | Home agent | Acquire and display temperature in living room | 142.162.zzz.3:2000 | Unavailable |
| Unlock, Car | Car agent | Unlock door of car | 132.182.xxx.48:443 | Available |
| Unlock, Home | Home agent | Unlock door of home | 142.162.zzz.3:2000 | Unavailable |
| Price, Boxed lunch | Retailer agent | Acquire and display price of boxed lunch | 156.222.yyy.1:442 | Unavailable |
| ... | ... | ... | ... | ... |
| Run hot water, Bath | Home agent | Run hot water in bath in home | 142.162.zzz.3:2000 | Unavailable |
| Turn on, Air conditioner, Living room | Home agent | Turn on air conditioner in home | 142.162.zzz.3:2000 | Unavailable |
| Turn on, Air conditioner, Car | Car agent | Turn on air conditioner in car | 132.182.xxx.48:443 | Available |
| ... | ... | ... | ... | ... |

Example of specific event
·Response has been received from agent

Example of specific event
·End of character strings is reached
·No voice is input for certain period
·Specific voice is input
·Input is prohibited by agent
·Disconnected from agent

VOICE INTERACTION METHOD, AND DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This application claims benefit to the provisional U.S. Application No. 61/836,763, filed on Jun. 19, 2013.] *This application is a reissue of U.S. Pat. No. 9,564,129, which issued on Feb. 7, 2017 from application Ser. No. 14/777,920, filed Sep. 17, 2015, which is the National Stage of International Application No. PCT/JP2014/003097, filed Jun. 10, 2014, which claims the benefit of U.S. Provisional Application No. 61/836,763, filed Jun. 19, 2013.*

TECHNICAL FIELD

The present invention relates to a voice dialogue method for performing processing based on a voice that is dialogically input.

BACKGROUND ART

There has conventionally been known a voice dialogue system that includes voice input interface and performs processing based on a voice that is dialogically input by a user.

For example, Patent Literature 1 discloses a headset that includes a microphone, performs voice recognition processing on a voice input through the microphone, and performs processing based on a result of the voice recognition processing.

Also, Patent Literature 2 discloses a voice dialogue system that includes an agent that performs processing based on a voice that is dialogically input by a user.

CITATION LIST

Patent Literature

[Patent Literature 1] Japanese Patent Application Publication No. 2004-233794

[Patent Literature 2] Japanese Patent Application Publication No. 2008-90545

SUMMARY OF INVENTION

Technical Problem

According to the headset disclosed in Patent Literature 1, it is necessary to perform an operation of pressing a voice recognition control button that is provided in the headset at a start time and an end time of a voice input. Accordingly, in the case where this headset is used as input means in a voice dialogue system that performs processing based on a dialogically input voice, a user of the headset needs to start a voice input by pressing the voice recognition control button and end the voice input by pressing the voice recognition control button for each voice input.

This sometimes makes the user to feel troublesome to perform the operation of pressing the voice recognition control button, which needs to be performed at a start time and an end time of each voice input.

The present invention was made in view of the problem, and aims to provide a voice dialogue method for reducing, in a voice dialogue system, the number of times that a user needs to perform an operation in accordance with a voice that is dialogically input, compared with a conventional technique.

Solution to Problem

In order to solve the above aim, one aspect of the present invention provides a voice dialogue method that is performed by a voice dialogue system, the voice dialogue system including: a voice signal generation unit; a voice dialogue agent unit; a voice output unit; and a voice input control unit, the voice dialogue method comprising: a step of, by the voice signal generation unit, receiving a voice input and generating a voice signal based on the received voice input; a step of, by the voice dialogue agent unit, performing voice recognition processing on the generated voice signal and performing processing based on a result of the voice recognition processing to generate a response signal; a step of, by the voice output unit, outputting a voice based on the generated response signal; and a step of, when the voice output unit outputs the voice, by the voice input control unit, keeping the voice signal generation unit in a receivable state for a predetermined period after output of the voice, the receivable state being a state in which a voice input is receivable.

Advantageous Effects of Invention

According to the above voice dialogue method, in the case where a voice generated by the voice dialogue agent unit is output, a user can input a voice without performing an operation with respect to the voice dialogue system. This reduces the number of times that the user needs to perform an operation in accordance with a voice that is dialogically input, compared with conventional techniques.

BRIEF DESCRIPTION OF DRAWINGS

FIG. 5 is a data structure diagram showing a dialog DB 500.

FIG. [26] *27* is a flow chart of disconnection response processing.

Figure 28:
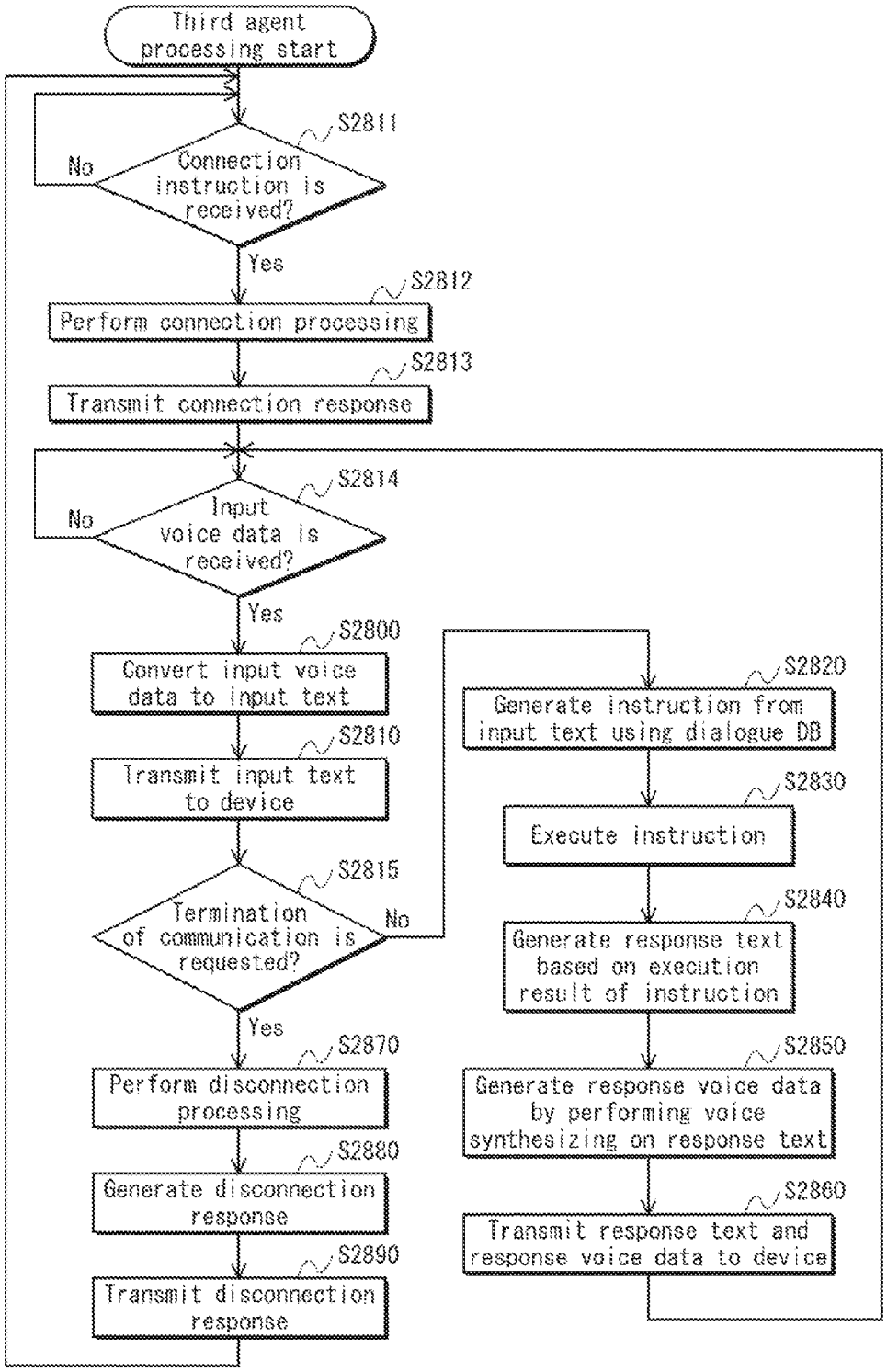

FIG. 28 is a flow chart of third agent processing.

Figure 29:
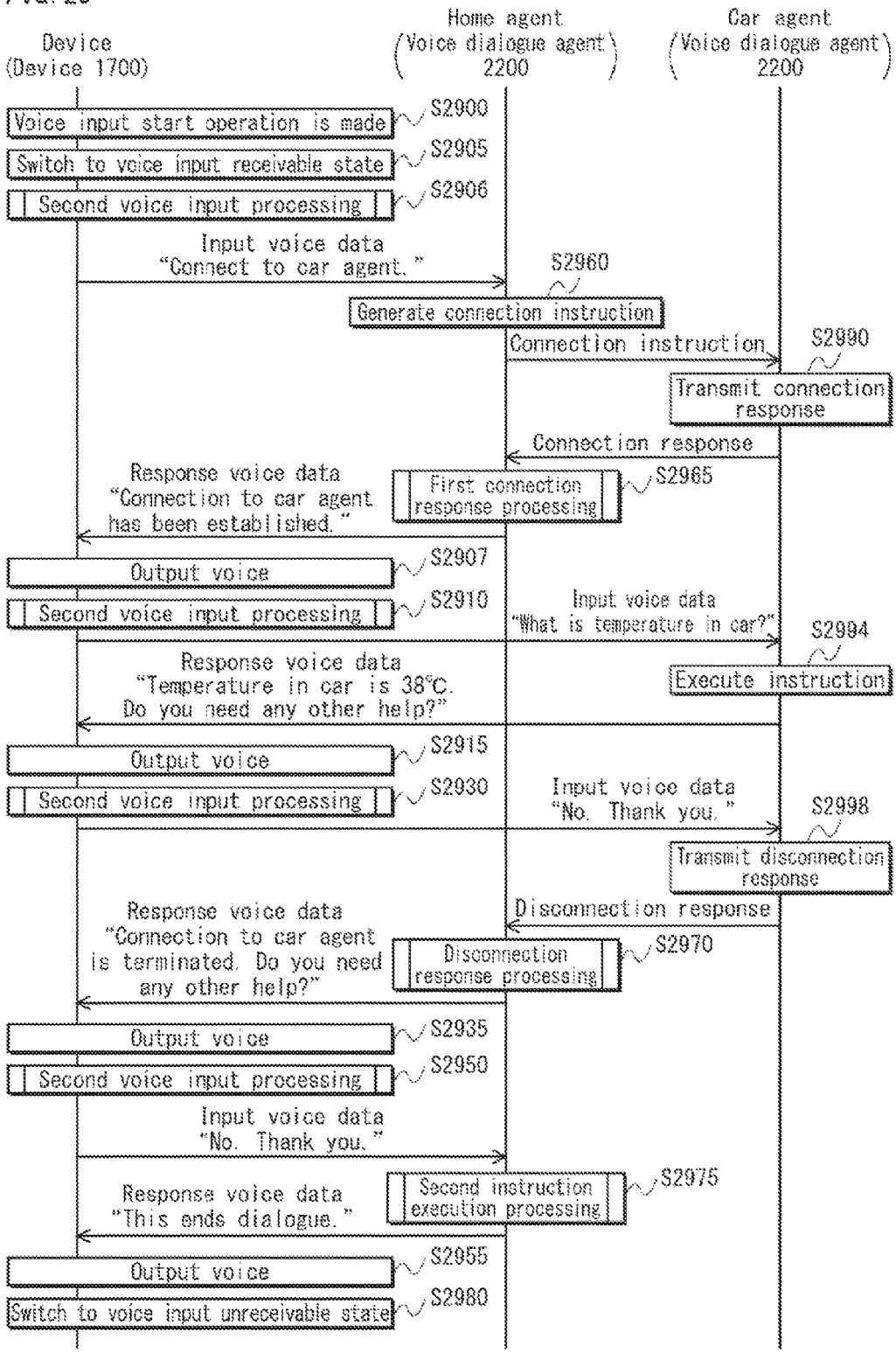

FIG. 29 is a procedure diagram schematically showing a situation in which a dialogue with a voice dialogue agent is performed.

Figure 30:
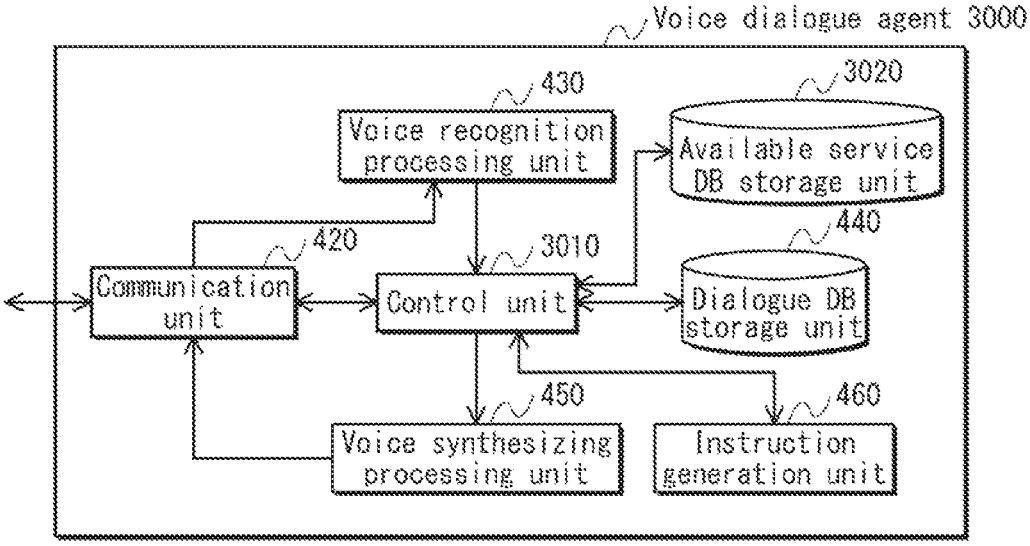

FIG. 30 is a block diagram showing functional configuration of a voice dialogue agent 3000.

FIG. 31 is a data structure diagram showing an available service DB 3100.

Figure 32:
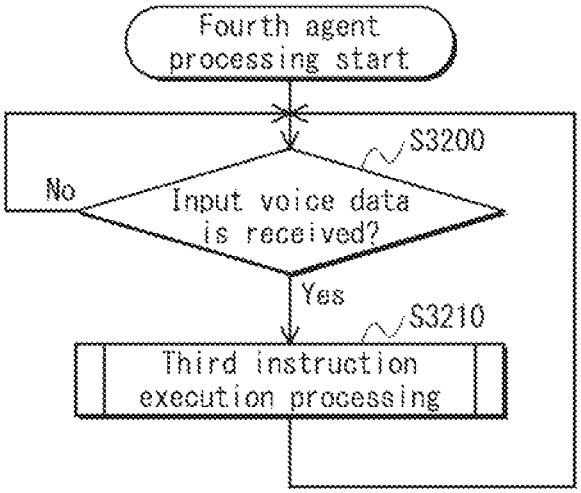

FIG. 32 is a flow chart of fourth agent processing.

Figure 33:
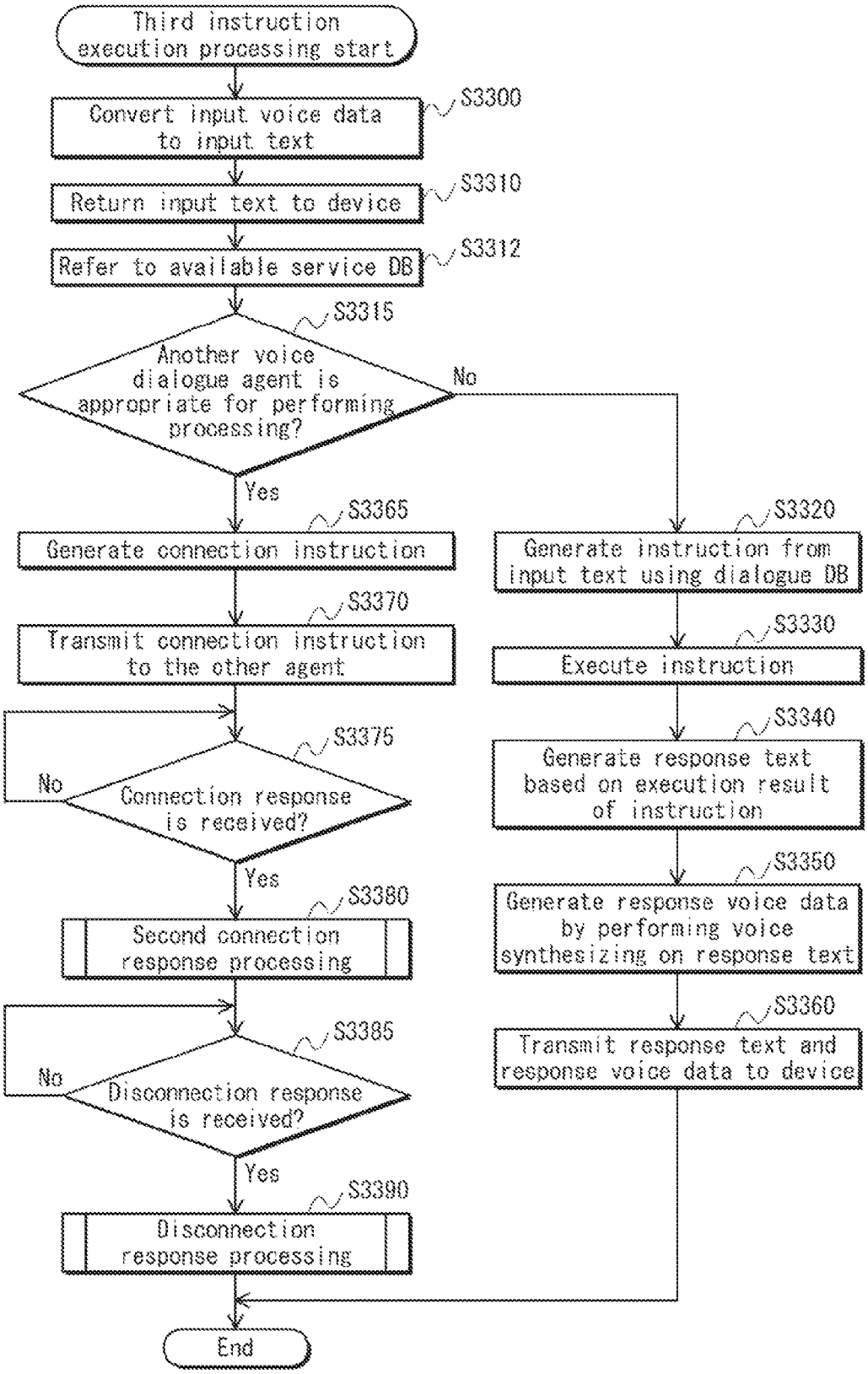

FIG. 33 is a flow chart of third instruction execution processing.

Figure 34:
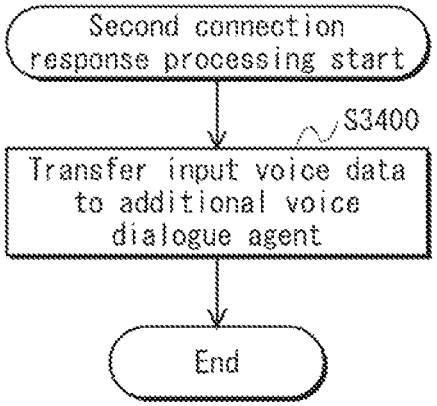

FIG. 34 is a flow chart of second connection response processing.

Figure 35:
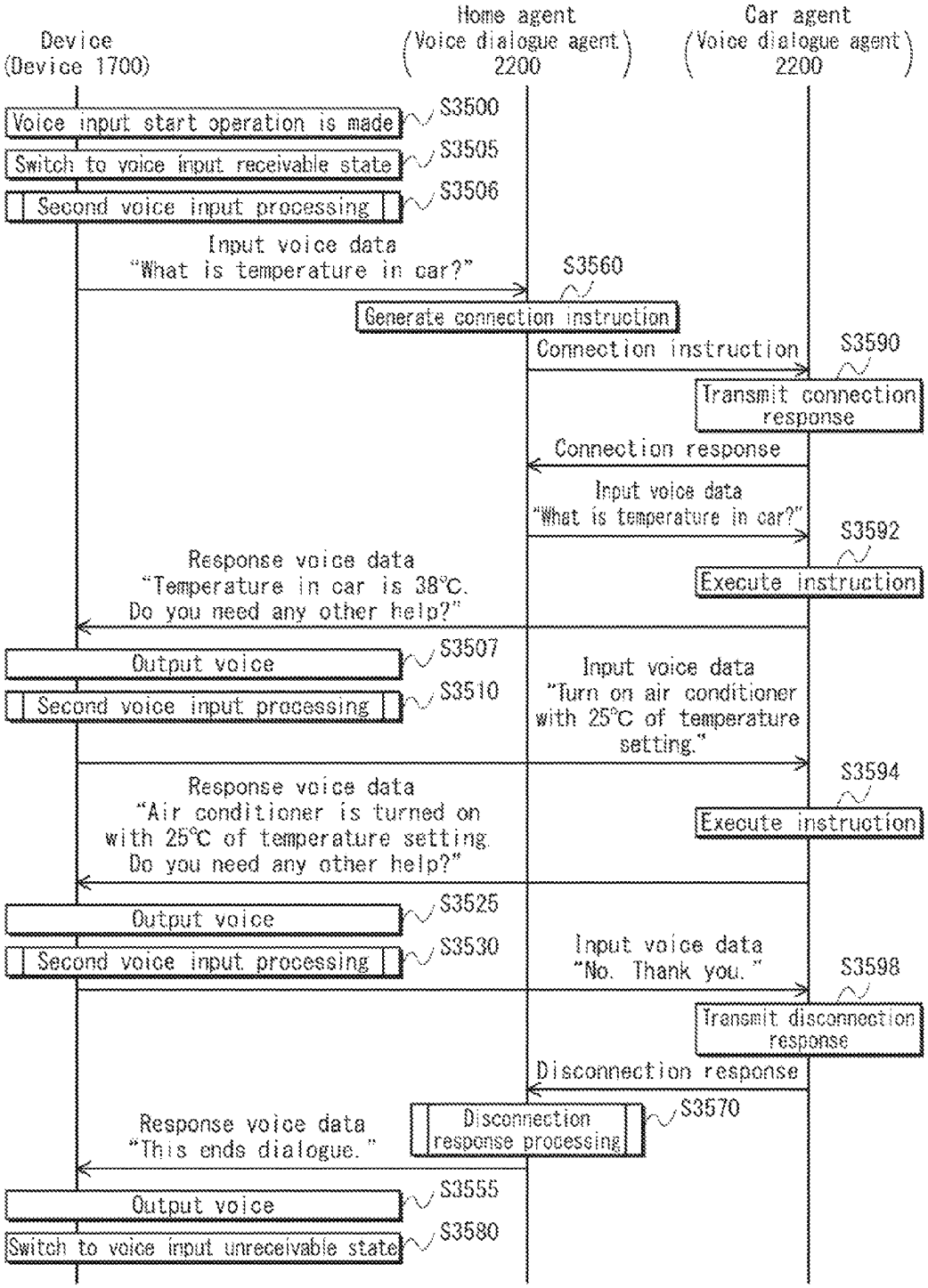

FIG. 35 is a procedure diagram schematically showing a situation in which a dialogue with a voice dialogue agent is performed.

Figure 36A:
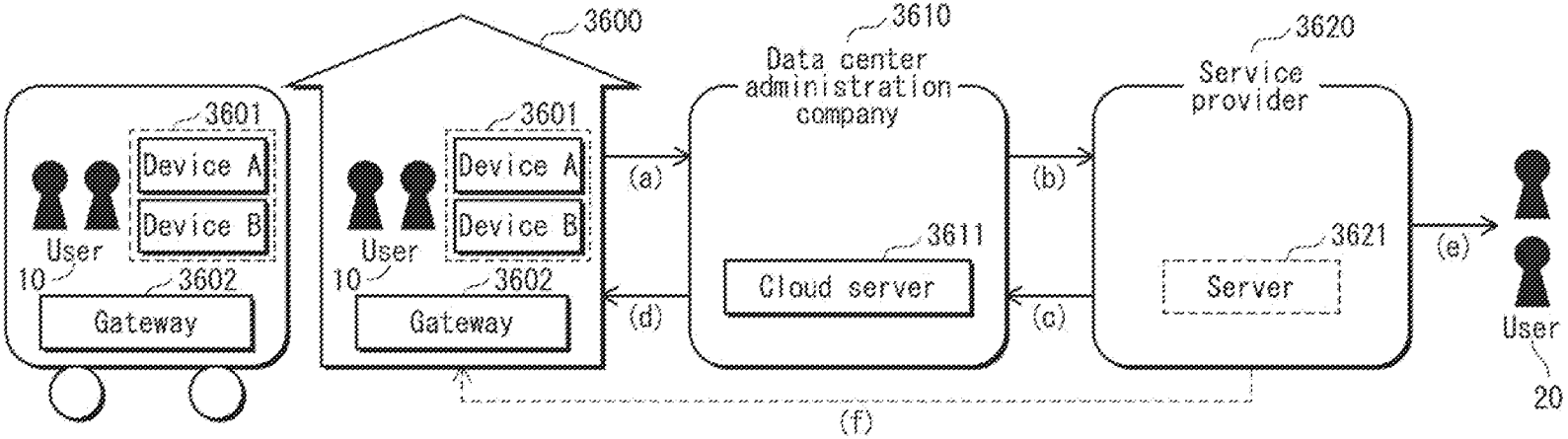
Figure 36C:
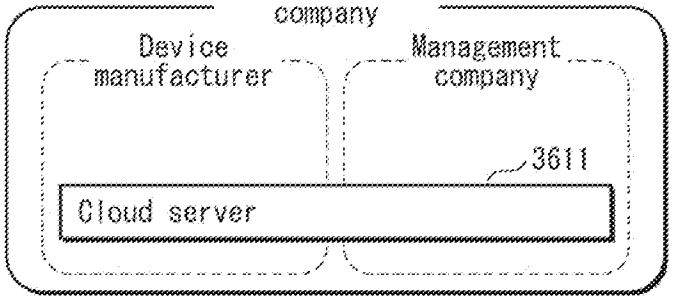
Figure 36B:
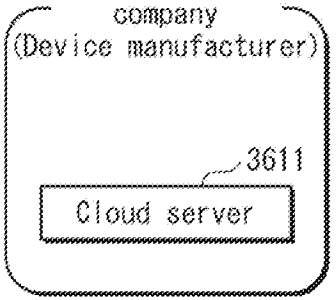

FIG. 36A is a diagram schematically showing an operation situation of the voice dialogue system, FIG. 36B and FIG. 36C are each a diagram schematically showing a data center administration company 3610.

Figure 37:
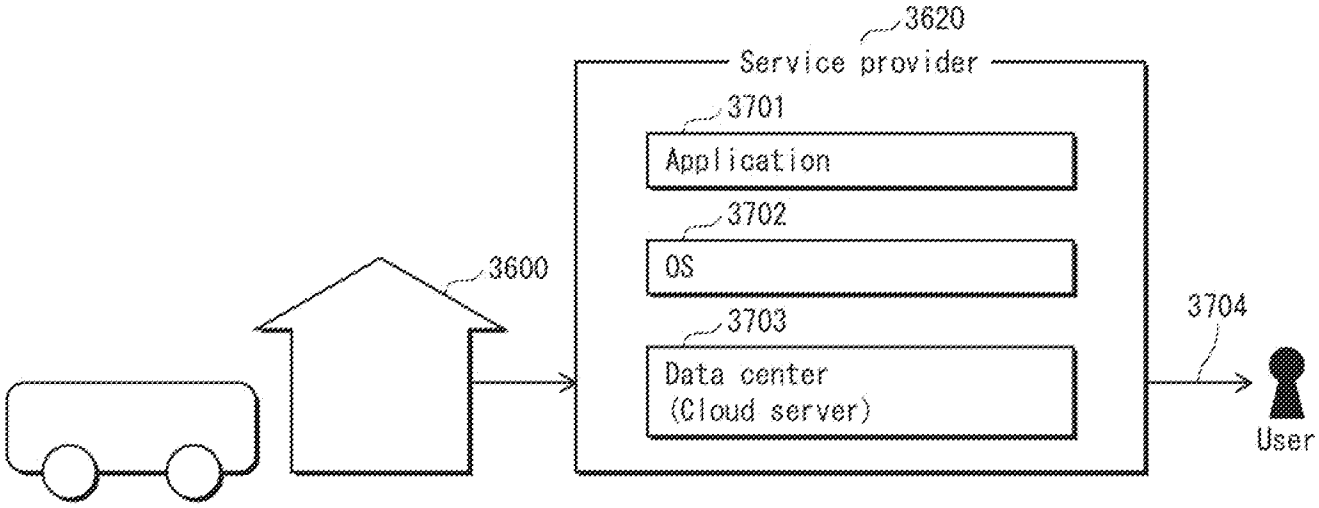

FIG. 37 is a diagram schematically showing service type 1.

Figure 38:
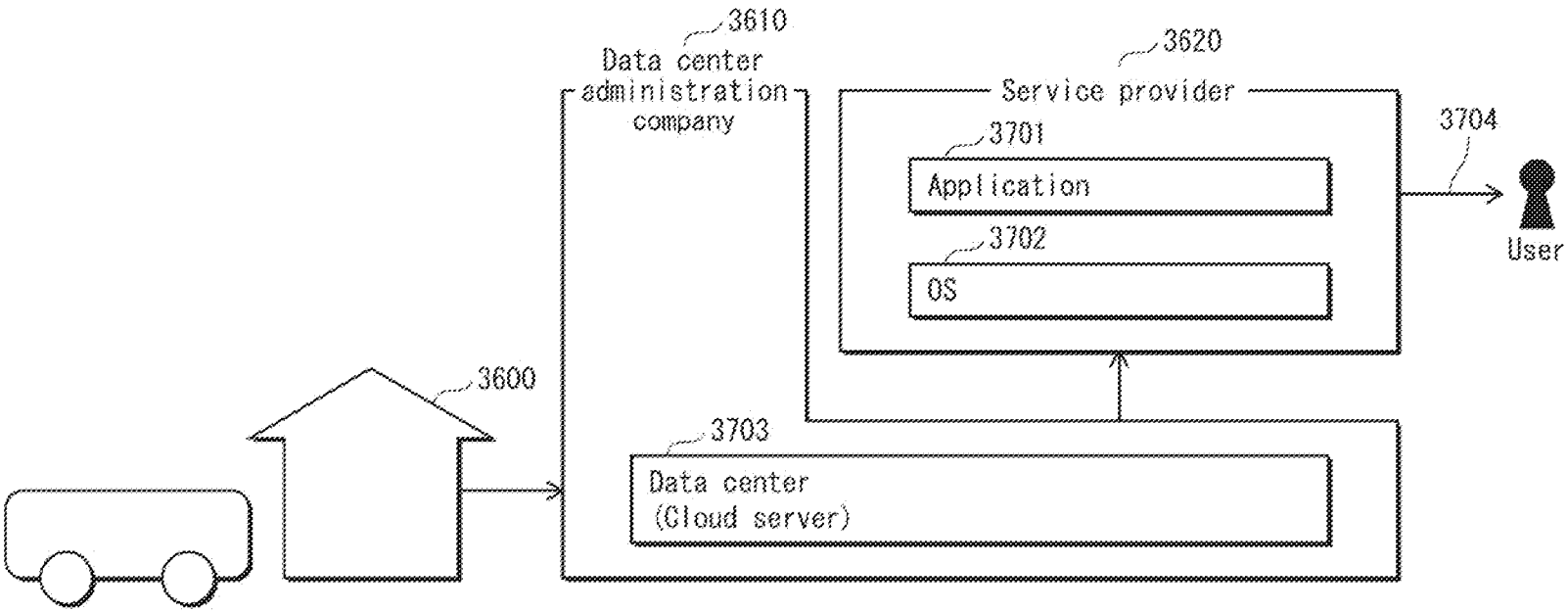

FIG. 38 is a diagram schematically showing service type 2.

Figure 39:
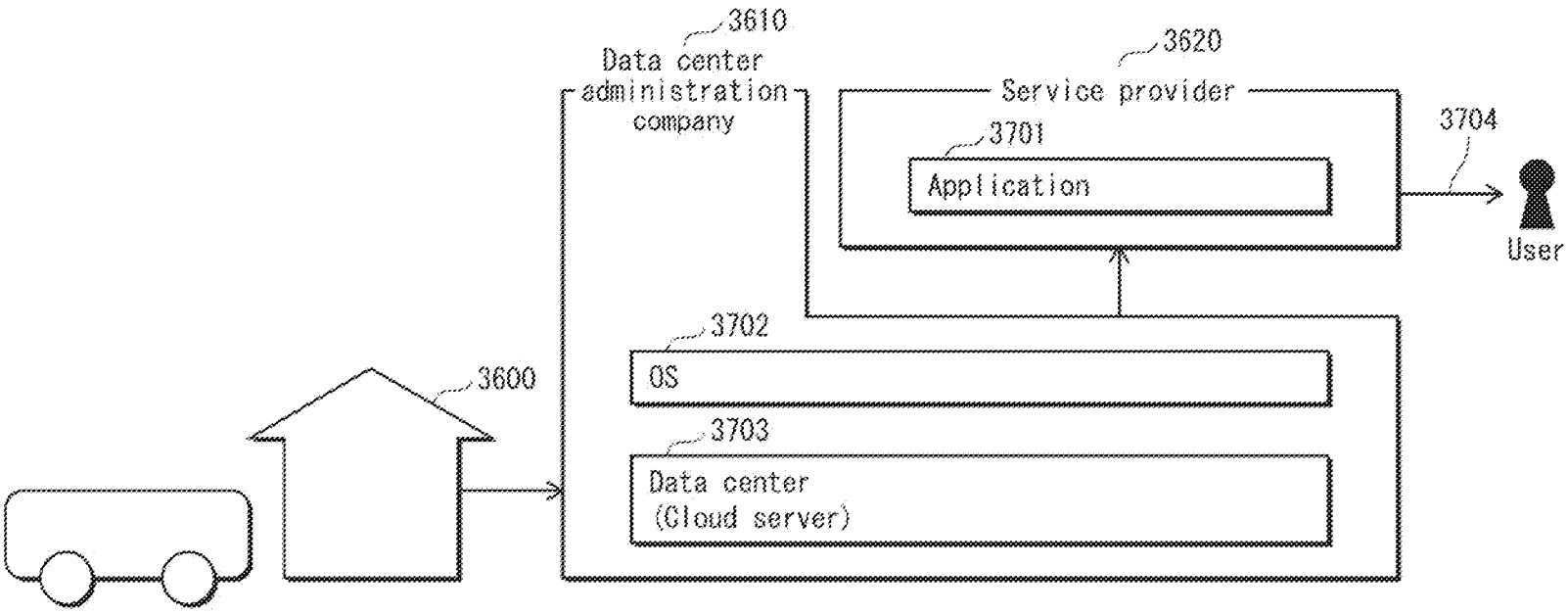

FIG. 39 is a diagram schematically showing service type 3.

Figure 40:
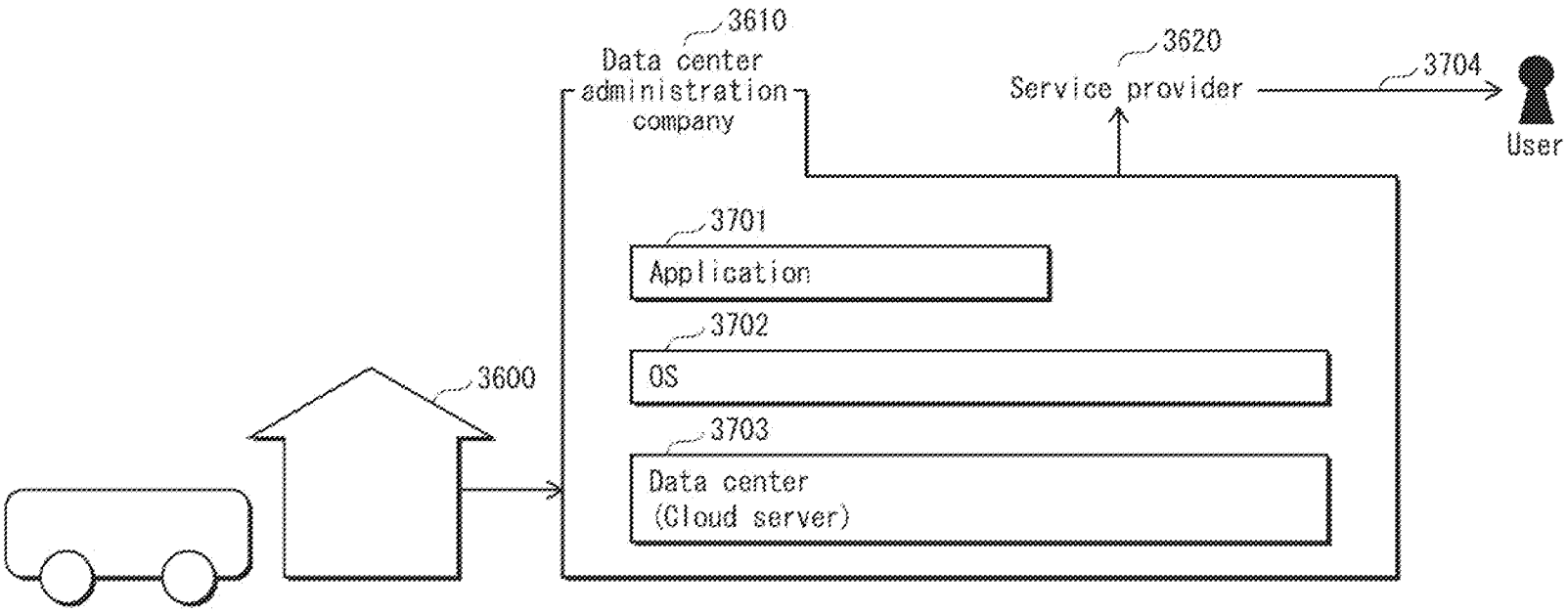

FIG. 40 is a diagram schematically showing service type 4.

Figure 41:
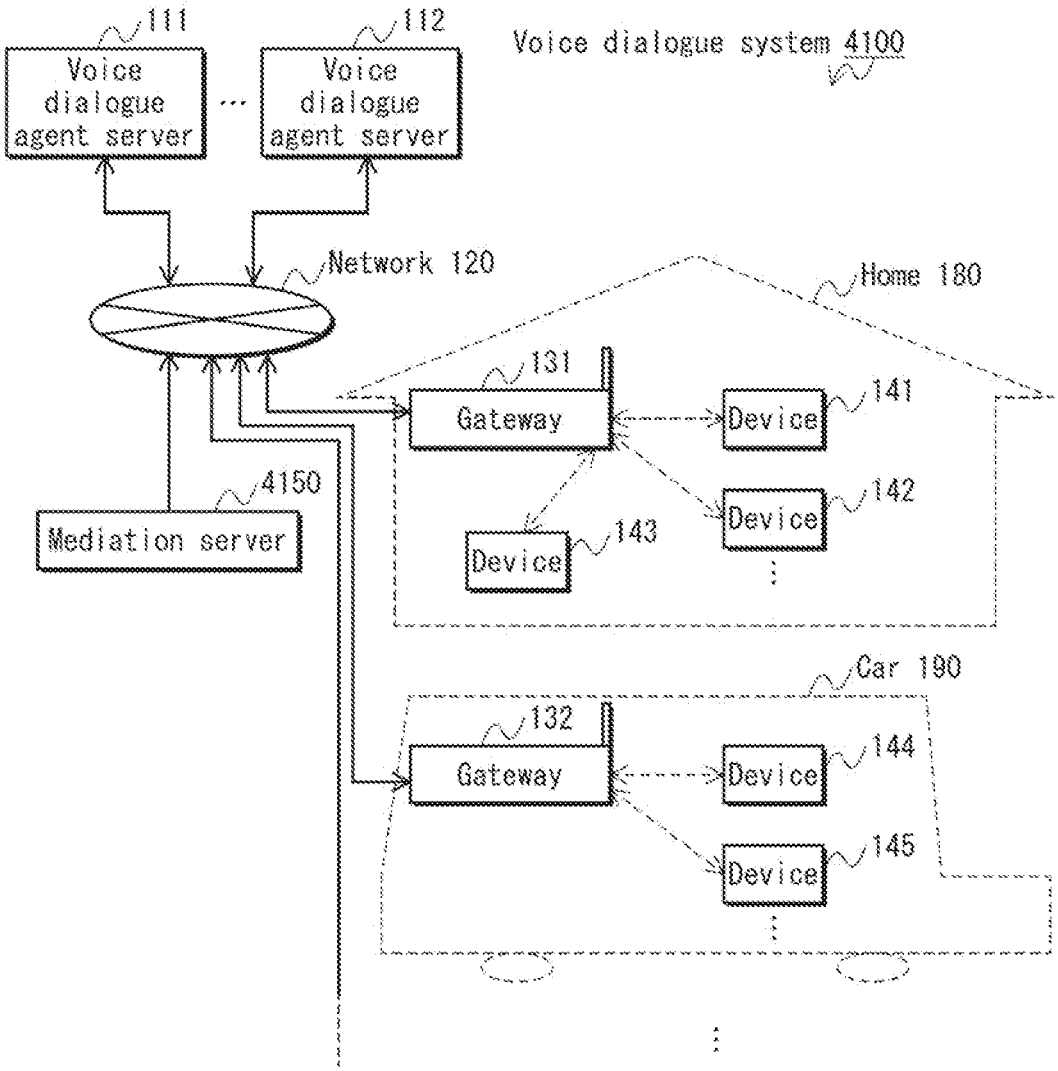

FIG. 41 is a system configuration diagram showing configuration of a voice dialogue system 4100.

Figure 42:
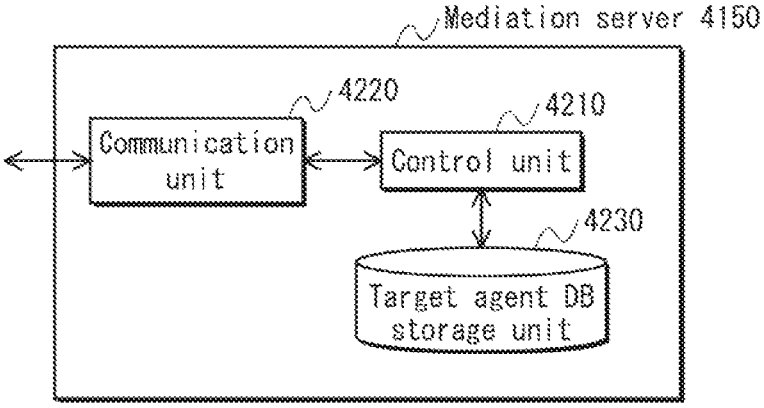

FIG. 42 is a block diagram showing functional configuration of a mediation server 4150.

Figure 43:
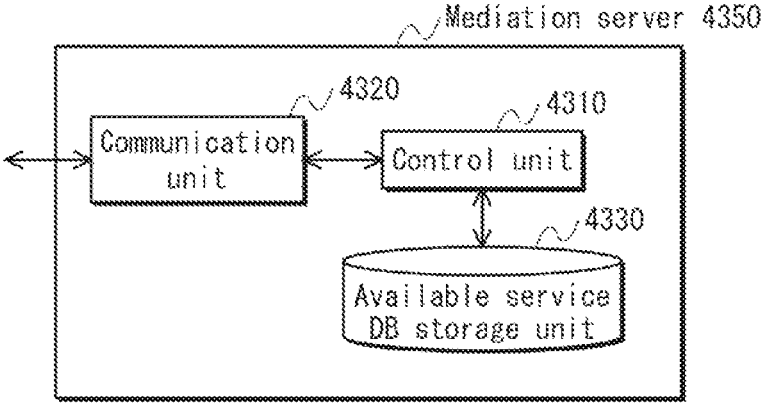

FIG. 43 is a block diagram showing functional configuration of a mediation server 4350.

FIG. 44A to FIG. 44D each show an example of an image displayed by a display unit.

Figure 45A:
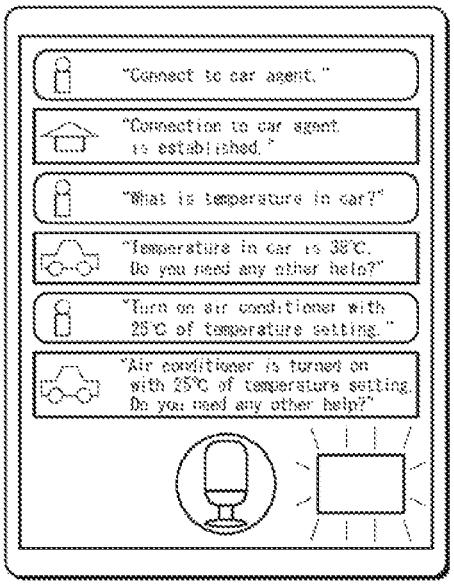
Figure 45B:
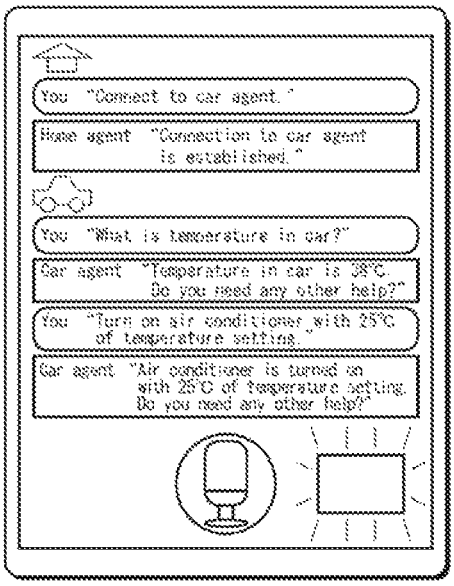

FIG. 45A and FIG. 45B each show an example of an image displayed by the display unit.

Figure 46:
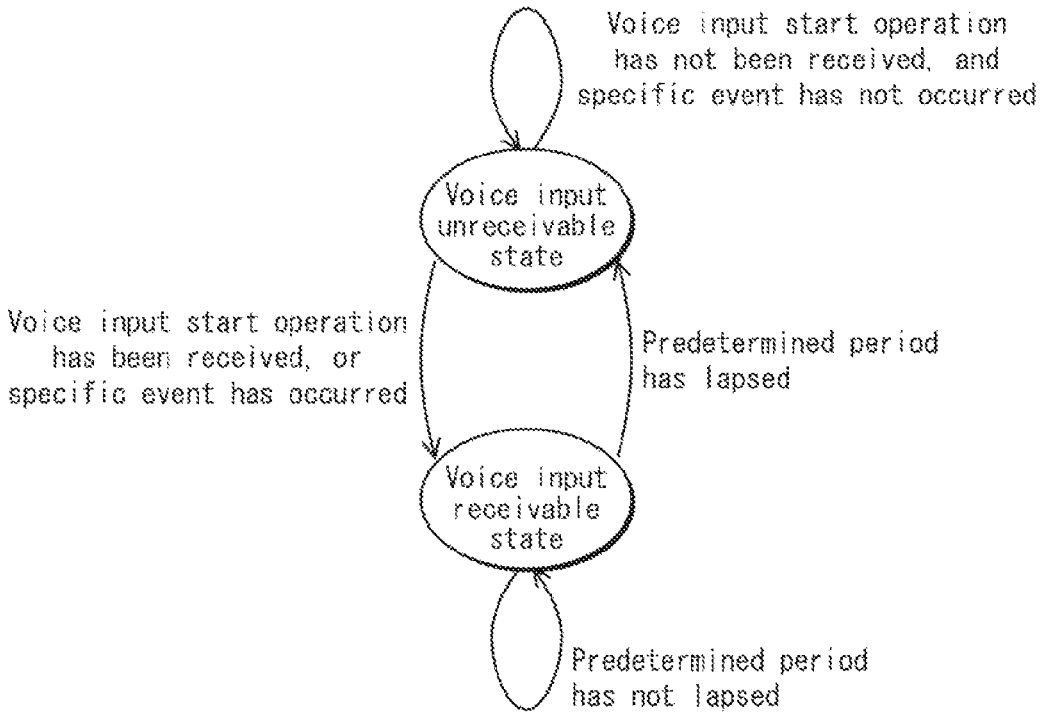

FIG. 46 shows an example of switching of the state.

Figure 47:
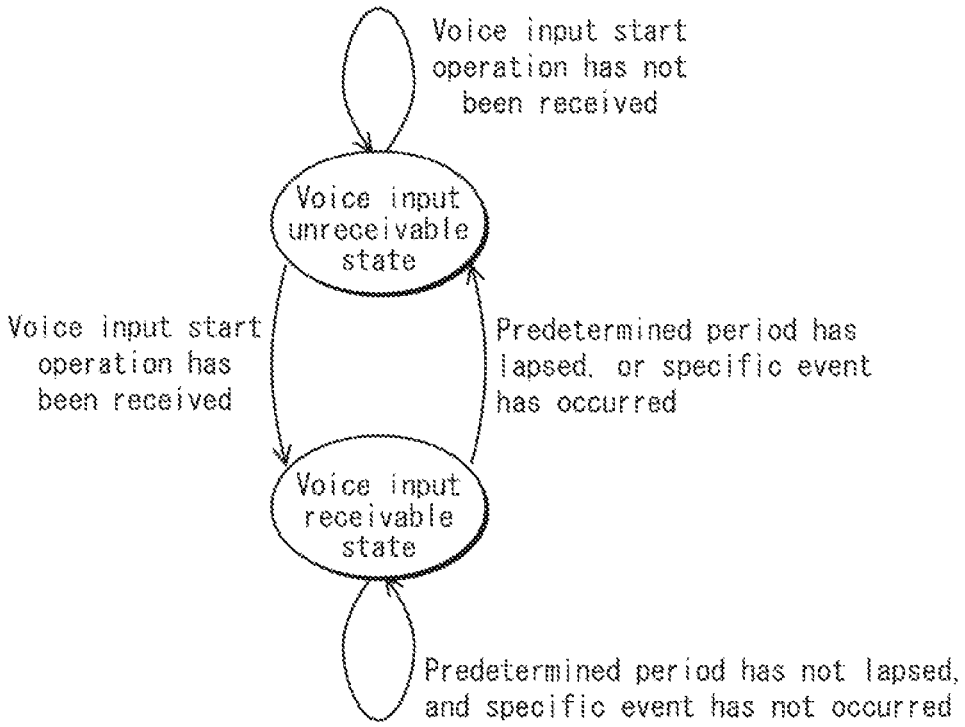

FIG. 47 shows an example of switching of the state.

Figure 48:
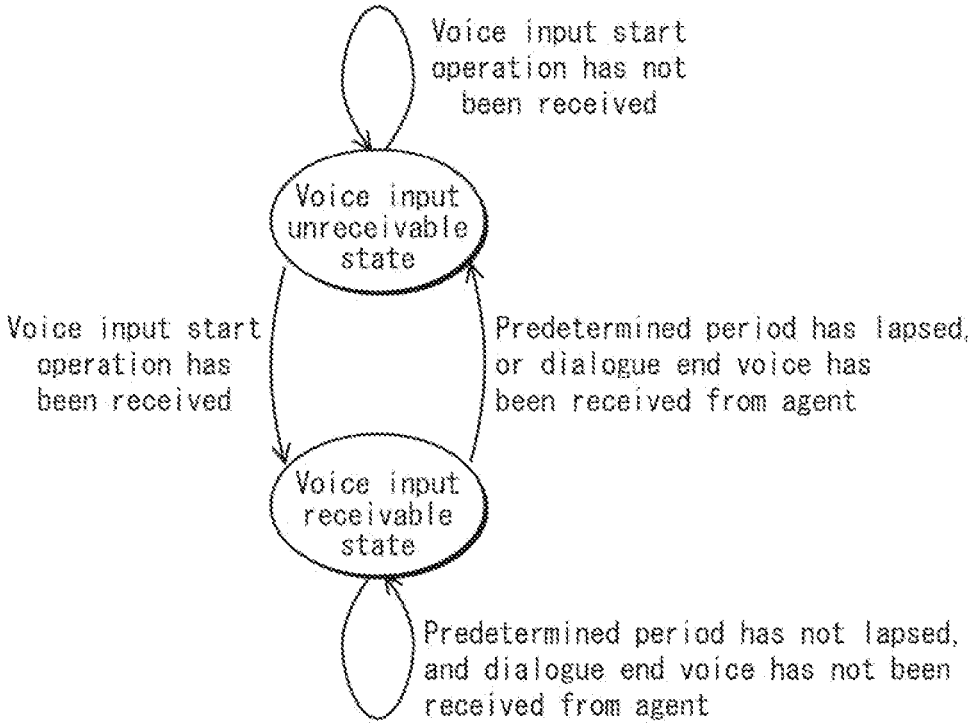

FIG. 48 shows an example of switching of the state.

Figure 49:
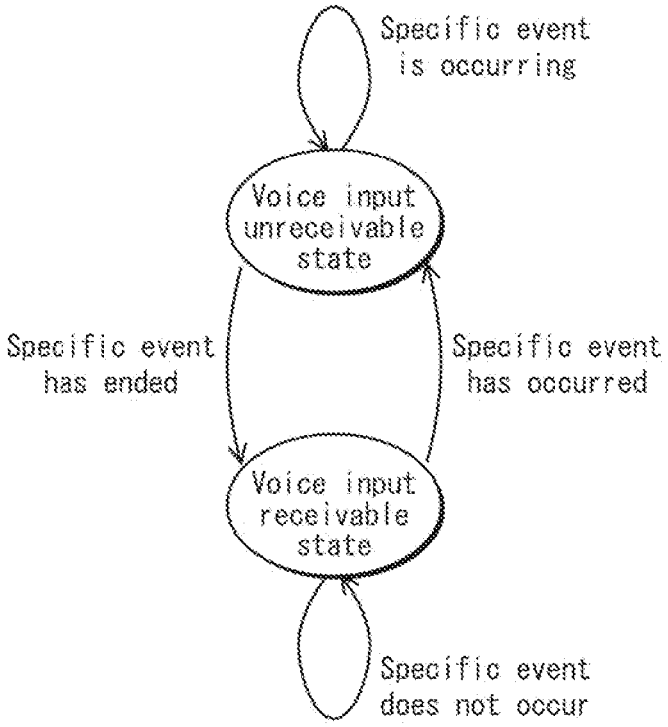

FIG. 49 shows an example of switching of the state.

Figure 50:
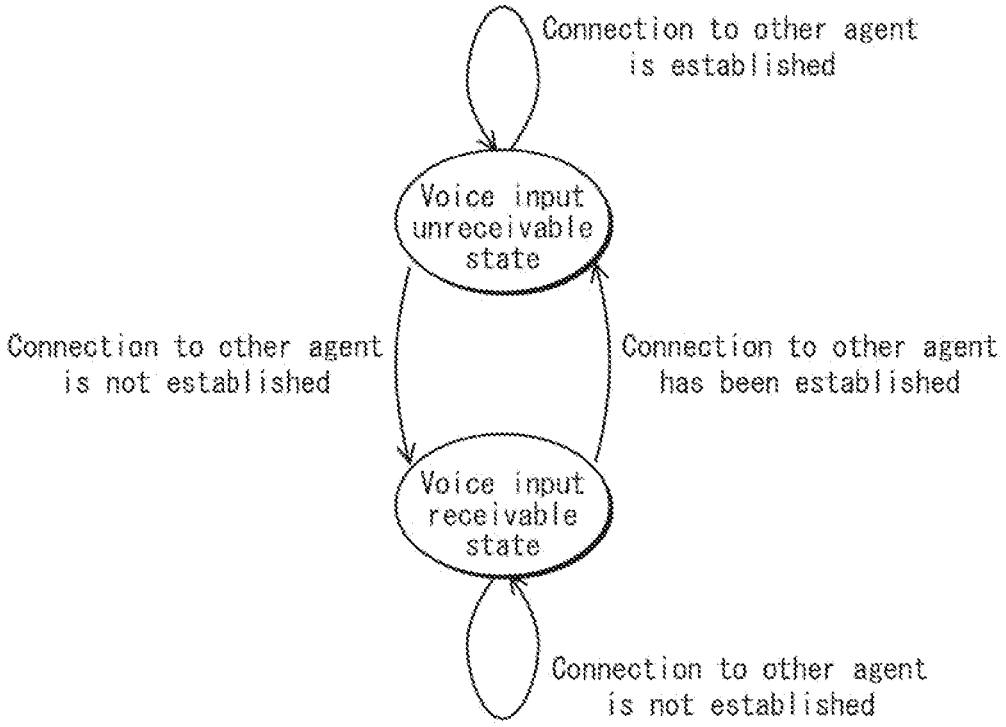

FIG. 50 shows an example of switching of the state.

DESCRIPTION OF EMBODIMENTS

Embodiment 1

<Outline>

The following explains, as one aspect of the voice dialogue method relating to the present invention and one aspect of the device relating to the present invention, a voice dialogue system including devices that are disposed in a home, a car, and so on and a voice dialogue agent server that communicates the devices.

In the voice dialogue system, the voice dialogue agent server embodies a voice dialogue agent by executing a program stored therein. The voice dialogue agent makes a voice dialogue via a device (input and output via a voice) with a user of the voice dialogue system. The voice dialogue agent performs processing that reflects details of the dialogue, and performs a voice output of a result of the processing via the device of the user.

In the case where the user hopes to make a dialogue with the voice dialogue agent (hopes to perform a voice input with respect to the voice dialogue agent), the user performs a predetermined voice input start operation with respect to the device constituting the voice dialogue system. The device is switched to a state in which voice input is receivable for a predetermined period after the voice input start operation. While the device is in the state in which voice input is receivable, the user performs voice input with respect to the voice dialogue agent.

The following explains the details of the voice dialogue system with reference to the drawings.

<Configuration>

Figure 1:
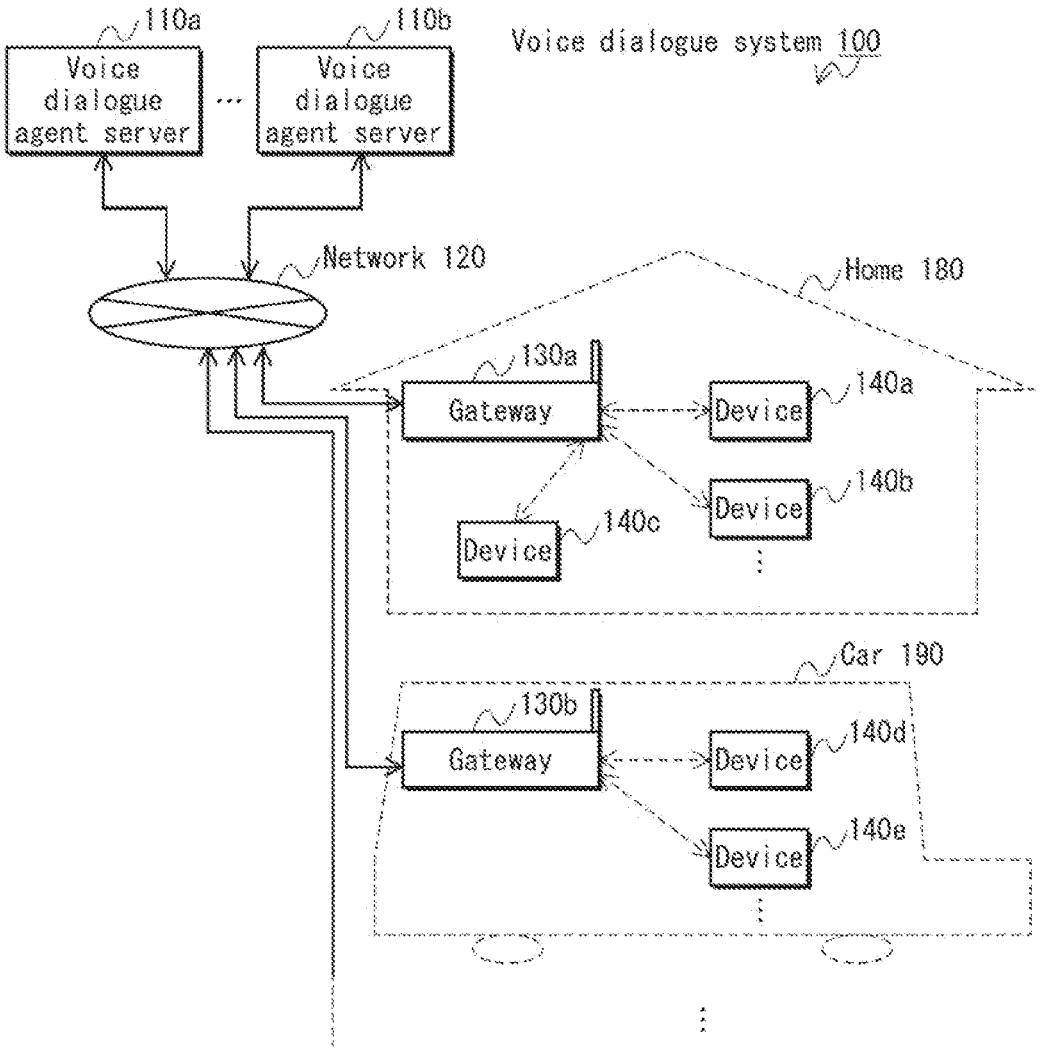
FIG. 1 is a system configuration diagram showing configuration of a voice dialogue system 100.

FIG. 1 is a system configuration diagram showing configuration of a voice dialogue system 100.

As shown in the figure, the voice dialogue system 100 includes voice dialogue agent servers 110a and 110b, a network 120, gateways 130a and 130b, and devices 140a-140e.

While the gateway 130a and the devices 140a-140c are disposed in a home 180, the gateway 130b and the devices 140d and 140e are disposed in a car 190.

The gateways 130a and 130b are hereinafter just referred to as a gateway 130 except in the case of explicit distinction. Also, the voice dialogue agent servers 110a and 110b are hereinafter just referred to as a voice dialogue agent server 110 except in the case of explicit distinction. The devices 140a-140e each have a function of performing a wireless or wired communication with the gateway 130 and a function of performing a wireless or wired communication with the voice dialogue agent server 110.

The devices 140a-140c, which are disposed in the home 180, are each for example a television, an air conditioner, a recorder, a washing machine, a portable smartphone, or the like that is disposed in the home 180. The devices 140d-140e, which are disposed in the car 190, are each for example a car air conditioner, a car navigation system, or the like that is disposed in the car 190.

Here, explanation is provided on a virtual device 140 that has functions the devices 140a-140e commonly have, instead of separate explanations of the devices 140a-140e.

Figure 2:
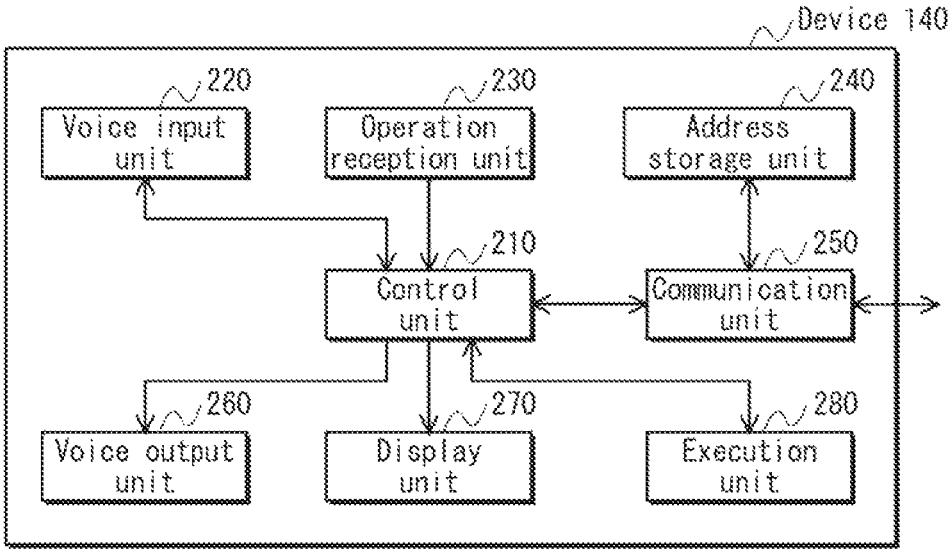
FIG. 2 is a block diagram showing functional configuration of a device 140.

FIG. 2 is a block diagram showing functional configuration of the device 140.

As shown in the figure, the device 140 includes a control unit 210, a voice input unit 220, an operation reception unit 230, an address storage unit 240, a communication unit 250, a voice output unit 260, a display unit 270, and an execution unit 280.

The voice input unit 220 is for example embodied by a microphone and a processor that executes programs. The voice input unit 220 is connected to the control unit 210, and is controlled by the control unit 210. The voice input unit 220 has a function of receiving a voice input from a user and generating a voice signal (hereinafter, referred to also as input voice data).

The voice input unit 220 is in either a voice input receivable state or a voice input unreceivable state under the control by the control unit 210. In the voice input receivable state, the voice input unit 220 is able to receive a voice input. In voice input unreceivable state, the voice input unit 220 is unable to receive a voice input.

The operation reception unit 230 is for example embodied by a touchpanel, a touchpanel controller, and a processor that executes programs. The operation reception unit 230 is connected to the control unit 210, and is controlled by the control unit 210. The operation reception unit 230 has a function of receiving a predetermined contact operation performed by the user and generating an electrical signal based on the received contact operation.

The predetermined contact operation performed by the user, which is received by the operation reception unit 230, includes a predetermined voice input start operation indicating that a voice input using the voice input unit 220 is to be started.

The voice input start operation is for example assumed to be an operation of contacting an icon for receiving the voice input start operation that is displayed on the touchpanel which is part of the operation reception unit 230. Also, the voice input start operation is for example assumed to be an operation of pressing a button for receiving the voice input start operation that is included in the operation reception unit 230.

The address storage unit 240 is for example embodied by a memory and a processor that executes programs, and is connected to the communication unit 250. The address storage unit 240 has a function of storing therein an IP (Internet Protocol) address of one of the voice dialogue agent servers 110 in the network 120. Hereinafter, the one voice dialogue agent server 110 is referred to as a specific voice dialogue agent server.

The device 140 is associated with the specific voice dialogue agent server, which is one of the voice dialogue agent servers 110.

Note that the memory included in the device 140 is for example a RAM (Random Access Memory), a ROM (Read Only Memory), a flash memory, or the like.

The communication unit 250 is for example embodied by a processor that executes programs, a communication LSI (Large Scale Integration), and an antenna. The communication unit 250 is connected to the control unit 210 and the address storage unit 240, and is controlled by the control unit 210. The communication unit 250 has a gateway communication function and a voice dialogue agent server communication function described below.

The gateway communication function is a function of performing a wireless or wired communication with the gateway 130.

The voice dialogue agent server communication function is a function of communicating with the voice dialogue agent server 110 via the gateway 130 and the network 120.

Here, in communication with any one of the voice dialogue agent servers 110, in the case where the control unit 210 does not designate a specific one of the voice dialogue agent servers 110 as a voice dialogue agent server 110 that is a communication party, the communication unit 250 communicates with a specific voice dialogue agent server with reference to an IP address stored in the address storage unit 240.

The voice output unit 260 is for example embodied by a processor that executes programs and a speaker. The voice output unit 220 is connected to the control unit 210, and is controlled by the control unit 210. The voice output unit 260 has a function of converting an electrical signal, which is transmitted from the control unit 210, to a voice and outputting the voice.

The display unit 270 is for example embodied by a touchpanel, a touchpanel controller, and a processor that executes programs. The display unit 270 is connected to the control unit 210, and is controlled by the control unit 210. The display unit 270 has a function of displaying images, character strings, and the like based on the electrical signal, which is transmitted from the control unit 210.

The execution unit 280 is a functional block that achieves a function the device 140 as a device originally has. In the case where the device 140 is for example a television, the function is a function of receiving and decoding a television signal, displaying television images resulting from the decoding on a display, and outputting television audio resulting from the decoding via a speaker. In the case where the device 140 is for example an air conditioner, the function is a function of blowing cool air or warm air through a duct to bring a temperature in a room in which the air conditioner is disposed to a set temperature. The execution unit 280 is connected to the control unit 210, and is controlled by the control unit 210.

In the case where the device 140 is for example a television, the execution unit 280 is embodied by a television signal receiver, a television signal tuner, a television signal decoder, a display, a speaker, and so on.

Also, the execution unit 280 does not necessarily need to have a configuration in which all compositional elements thereof are included in a single housing. In the case where the device 140 is for example a television, the execution unit 280 is assumed to have for example a configuration in which a remote controller and the display are included in separate housings. Similarly, functional blocks of the device 140 each do not need to have a configuration in which all compositional elements thereof are included in a single housing.

The control unit 210 is for example embodied by a processor that executes programs. The control unit 210 is connected to the voice input unit 220, the operation reception unit 230, the communication unit 250, the voice output unit 260, the display unit 270, and the execution unit 280. The control unit 210 has a function of controlling the voice input unit 220, a function of controlling the operation reception unit 230, a function of controlling the communication unit 250, a function of controlling the voice output unit 260, a function of controlling the display unit 270, and a function of controlling the execution unit 280. The control unit 210 further has a voice input unit state management function and a first device processing execution function described below.

The voice input unit state management function is a function of managing the state of the voice input unit 220, which is either the voice input receivable state or the voice input unreceivable state.

Figure 3:
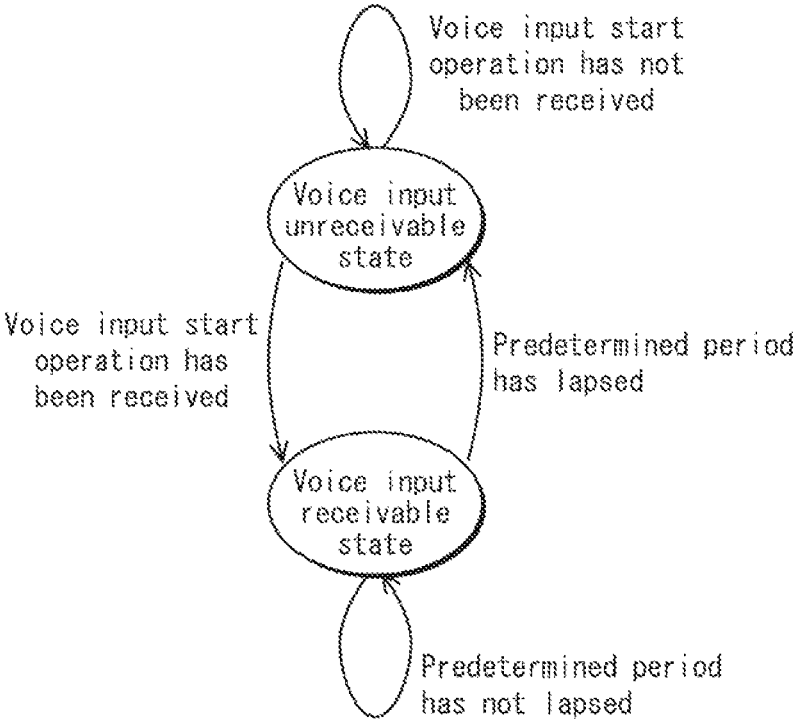
FIG. 3 shows switching of a state managed by a control unit 210.

FIG. 3 shows switching of the state managed by the control unit 210.

As shown in the figure, in the case where the state is the voice input unreceivable state, (1) the control unit 210 keeps the state to the voice input unreceivable state until the operation reception unit 230 receives a voice input start operation. (2) After the reception of the voice input start operation by the operation reception unit 230, the control unit 210 switches the state to the voice input receivable state. Then, in the case where the state is the voice input receivable state, (3) the control unit 210 keeps the state to the voice input receivable state until a predetermined period T1 (for example, five seconds) has lapsed after the switching of the state to the voice input receivable state. (4) After the lapse of the predetermined period T1, the control unit 210 switches the state to the voice input unreceivable state.

Note that upon bootup of the device 140, the control unit 210 starts managing the state as the voice input unreceivable state.

Returning to FIG. 2, the explanation on the control unit 210 is continued.

The first device processing execution function is a function performed by the control unit 210 controlling the voice input unit 220, the operation reception unit 230, the communication unit 250, the voice output unit 260, the display unit 270, and the execution unit 280 to cause the device 140 to execute the first device processing as its characteristic operation to execute a sequence of processing described below. In the sequence of processing, (1) when the user performs a voice input start operation, (2) the device 140 receives a voice input from the user, and generates input voice data, (3) transmits the generated input voice data to a voice dialogue agent, (4) receives response voice data returned from the voice dialogue agent, and (5) outputs a voice based on the received response voice data.

Note that the first device processing is explained in detail in section <First Device Processing> later with reference to a flow chart.

Referring back to FIG. 1, the explanation on the device 140 is continued.

The gateway 130 is for example embodied by a personal computer or the like having a communication function, and is connected to the network 120. The gateway 130 has the following functions achieved by executing programs stored therein: a function of performing a wireless or wired communication with the device 140; a function of communicating with the voice dialogue agent server 110 via the network 120; and a function of relaying communication between the device 140 and the voice dialogue agent server 110.

The voice dialogue agent server 110 is for example embodied by a server, which is composed of one or more computer systems and has a communication function. The voice dialogue agent server 110 is connected to the network 120. The voice dialogue agent server 110 has the following functions achieved by executing programs stored therein: a function of communicating with another device which is connected to the network 120; a function of communicating with the device 140 via the gateway 130; and a function of embodying the voice dialogue agent 400.

Figure 4:
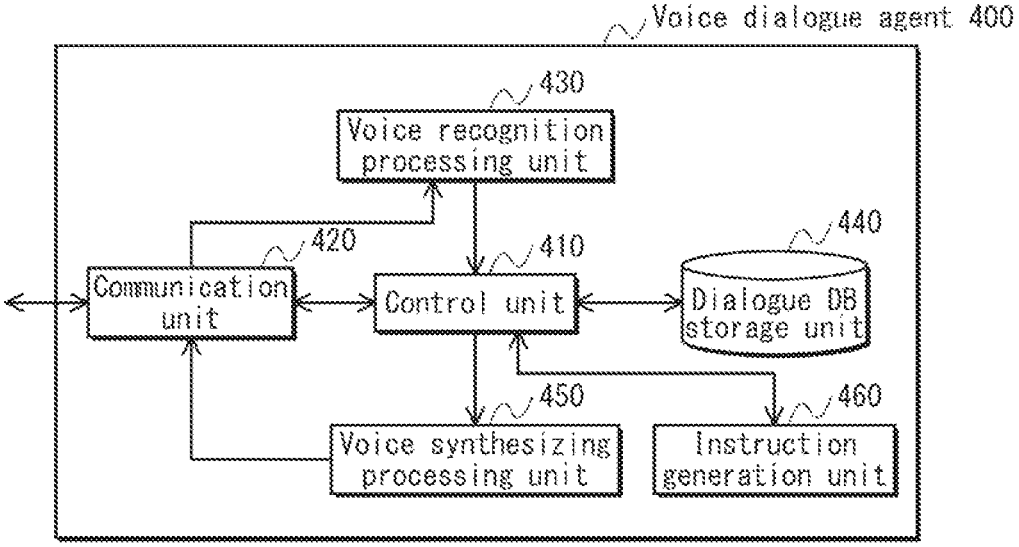
FIG. 4 is a block diagram showing functional configuration of a voice dialogue agent 400.

FIG. 4 is a block diagram showing functional configuration of the voice dialogue agent 400 embodied by the voice dialogue agent server 110.

As shown in the figure, the voice dialogue agent 400 includes a control unit 410, a communication unit 420, a voice recognition processing unit 430, a dialogue DB (Date Base) storage unit 440, a voice synthesizing processing unit 450, and an instruction generation unit 460.

The communication unit 420 is for example embodied by a processor that executes programs and a communication LSI. The communication unit 420 is connected to the control unit 410, the voice recognition processing unit 430, and the voice synthesizing processing unit 450, and is controlled by the control unit 410. The communication unit 420 has a function of communicating with another device which is connected to the network 120 and a function of communicating with the device 140 via the gateway 130.

The voice recognition processing unit 430 is embodied by a processor that executes programs. The voice recognition processing unit 430 is connected to the control unit 410 and the communication unit 420, and is controlled by the control unit 410. The voice recognition processing unit 430 has a function of performing voice recognition processing on input voice data received by the communication unit 420 to convert the voice data to a character string (hereinafter, referred to also as an input text).

The voice synthesizing processing unit 450 is for example embodied by a processor that executes programs. The voice synthesizing processing unit 450 is connected to the control unit 410 and the communication unit 420, and is controlled by the control unit 410. The voice synthesizing processing unit 450 has a function of performing voice synthesizing processing on a character sting transmitted from the control unit 410 to convert the character string to voice data.

The dialogue DB storage unit 440 is for example embodied by a memory and a processor that executes programs. The dialogue DB storage unit 440 is connected to the control unit 410, and has a function of storing therein a dialog DB 500.

FIG. 5 is a data structure diagram showing the dialog DB 500 stored in the dialogue DB storage unit 440.

As shown in the figure, the dialog DB 500 includes keyword 510, target device 520, startup application 530, processing details 540, and response text 550 that are associated with each other.

The keyword 510 indicates a character string that is assumed to be included in an input text converted by the voice recognition processing unit 430.

The target device 520 indicates information for specifying a device that is to execute processing specified by the associated processing details 540, which are described later.

Here, the device specified by the target device 520 may be the voice dialogue agent 400.

The startup application 530 is information for specifying an application program to be started up in a device specified by the associated target device 520 in order to cause the specified device to execute processing specified by the associated processing details 540, which are described later.

The processing details 540 are information for specifying, in the case where a character string indicated by the associated keyword 510 is included in an input text that is converted by the voice recognition processing unit 430, processing that is determined to be executed by a device that is specified by the associated target device 520.

The response text 550 is information for indicating, in the case where processing specified by the associated processing details 540 is executed, a character string that is determined to be generated based on a result of the processing (hereinafter, referred to also as a response text).

Referring back to FIG. 4, the explanation on the voice dialogue agent 400 is continued.

The instruction generation unit 460 is for example embodied by a processor that executes programs. The instruction generation unit 460 is connected to the control unit 410, and is controlled by the control unit 410. The instruction generation unit 460 has a function of, upon reception of a group of the target device 520, the startup application 530, and the processing details 540 transmitted from the control unit 410, starting up an application program that is specified by the startup application 530 included in a device that is specified by the target device 520, and generating an instruction set for causing the specified device to execute processing that is specified by the processing details 540.

The control unit 410 is for example embodied by a processor that executes programs. The control unit 410 is connected to the communication unit 420, the voice recognition processing unit 430, the dialogue DB storage unit 440, the voice synthesizing processing unit 450, and the instruction generation unit 460. The control unit 410 has a function of controlling the communication unit 420, a function of controlling the voice recognition processing unit 430, a function of controlling the voice synthesizing processing unit 450, and a function of controlling the instruction generation unit 460. The control unit 410 further has an input text return function, an instruction generation function, an instruction execution function, and a first agent processing execution function described below.

The input text return function is a function of controlling, in the case where input voice data received by the communication unit 420 is converted to an input text by the voice recognition processing unit 430, the communication unit 420 to return the input text to the device 140 which has transmitted the input voice data.

The instruction generation function is a function of, upon reception of the input text transmitted from the voice recognition processing unit 430, controlling the instruction generation unit 460 to generate an instruction set: by (1) referring to the dialog DB 500 stored in the dialogue DB storage unit 440 to read, based on the keyword 510 included in the input text, the target device 520, the startup application 530, the processing details 540, and the response text 550, which are associated with the keyword 510; and (2) transmitting a group of the read target device 520, startup application 530, and processing details 540 to the instruction generation unit 460.

The instruction execution function is a function of executing an instruction set generated by the instruction generation unit 460, generating a response text specified by the response text 550 based on an execution result of the instruction set, and transmitting the generated response text to the voice synthesizing processing unit 450.

In execution of the instruction execution function, the control unit 410 generates a response text by communicating with a device specified by the target device 520 with use of the communication unit 420 to cause the specified device to execute the instruction set and transmit an execution result of the instruction set.

The first agent processing execution function is a function performed by the control unit 410 controlling the communication unit 420, the voice recognition processing unit 430, the voice synthesizing processing unit 450, and the instruction generation unit 460 to cause the voice dialogue agent 400 to execute first agent processing that is its characteristic operation to execute a sequence of processing described below. In the sequence of processing, (1) the voice dialogue agent 400 receives input voice data transmitted from a device, (2) performs voice recognition processing on the received input voice data to generate an input text, and returns the generated input text to the device, (3) generates an instruction set based on the generated input text, and executes the generated instruction set (4) generates a response text based on an execution result of the instruction set, (5) converts the generated response text to response voice data, and (6) returns the response text and the response voice data to the device.

Note that the first agent processing is explained in detail in section <First Agent Processing> later with reference to a flow chart.

Here, assume a case for example where an input text "Where is Mr. A's address?" is transmitted from the voice recognition processing unit 430. In this case, with reference to the dialog DB 500 stored in the dialogue DB storage unit 440, the control unit 410 causes a device "smartphone" specified by the target device 520 to start up an application program "Contact information" specified by the startup application 530 and execute processing of "Check Mr. A's address" specified by the processing details 540, and generates a response text "Mr. A's address is XXXX." based on an execution result of the processing.

The following explains the operation of the voice dialogue system 100 having the above configuration, with reference to the drawings.

<Operation>

The voice dialogue system 100 performs, as its characteristic operation, the first device processing and the first agent processing.

Explanation is given below on the processing in order.

<First Device Processing>

The first device processing is processing performed by the device 140. In the first device processing, (1) when the user performs a voice input start operation, (2) the device 140 receives a voice input from the user, and generates input voice data, (3) transmits the generated input voice data to a voice dialogue agent, (4) receives response voice data returned from the voice dialogue agent, and (5) outputs a voice based on the received response voice data.

Figure 6:
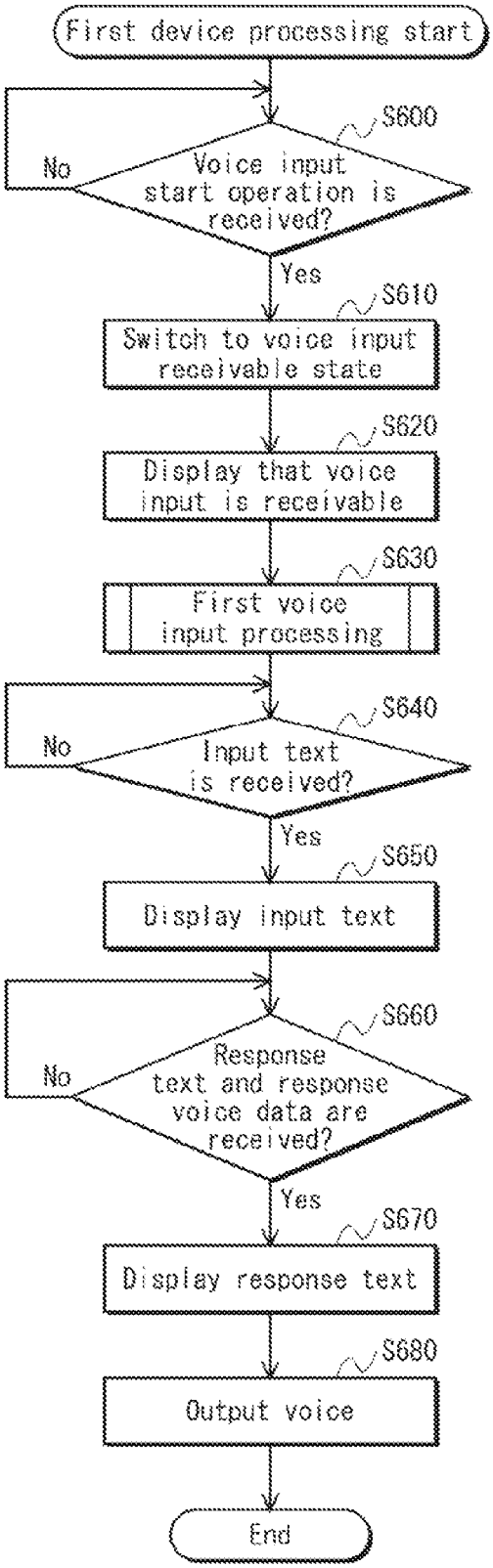
FIG. 6 is a flow chart of first device processing.

FIG. 6 is a flow chart of the first device processing.

Upon bootup of the device 140, the first device processing is started.

At a time of bootup of the device 140, the state managed by the control unit 210 is the voice input unreceivable state.

When the first device processing is started, the control unit 210 stands by until the operation reception unit 230 receives a voice input start operation performed by a user of the voice dialogue system 100 (Step S600: Repetition of No). When the operation reception unit 230 receives the voice input start operation (Step S600: Yes), the control unit 210 switches the state from the voice input unreceivable state to the voice input receivable state (Step S610), and causes the display unit 270 to display that the state is the voice input receivable state (Step S620).

Figure 11A:
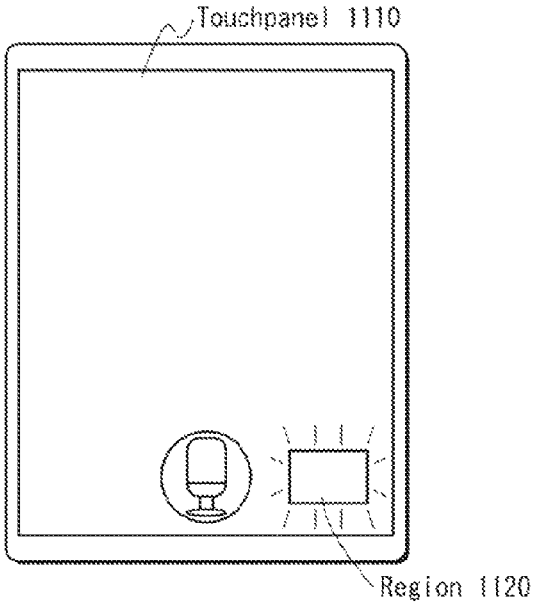
FIG. 11A to FIG. 11D are each a pattern diagram showing contents displayed by the device 140.

FIG. 11A is a pattern diagram showing an example of a situation in which in the case where the device 140 is for example a smartphone, the display unit 270 displays that the state is the voice input receivable state.

In the figure, a touchpanel 1110 that constitutes the smartphone is part of the display unit 270. The touchpanel 1110 displays that the state is the voice input receivable state by blinking a region 1120 that is positioned at the lower right in the touchpanel 1110 (for example by alternately lighting black color and white color in the region 1120).

Referring back to FIG. 6, the explanation on the first device processing is continued.

After the end of the processing in Step S620, the device 140 executes first voice input processing (Step S630).

Figure 7:
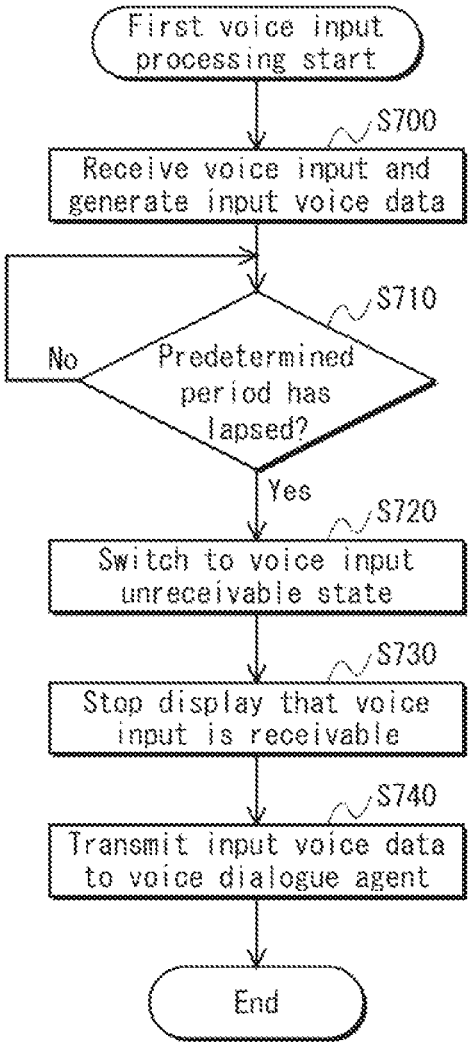
FIG. 7 is a flow chart of first voice input processing.

FIG. 7 is a flow chart of the first voice input processing.

When the first voice input processing is started, the voice input unit 220 receives a voice input from a user, and generates input voice data (Step S700). Then, when a predetermined period T1 has lapsed after switching of the state to the voice input receivable state (Step S710: Yes after repetition of No), the control unit 210 switches the state from the voice input receivable state to the voice input unreceivable state (Step S720), and causes the display unit 270 to stop displaying that the state is the voice input receivable state (Step S730).

Then, the control unit 210 controls the communication unit 250 to transmit the input voice data, which is generated by the voice input unit 220, to the voice dialogue agent 400 which is embodied by a specific voice dialogue agent server (Step S740).

After the end of the processing in Step S740, the device 140 ends the first voice input processing.

Referring back to FIG. 6 again, the explanation on the first device processing is continued.

After the end of the first voice input processing, the control unit 210 stands by until the communication unit 250 receives an input text that is returned from the voice dialogue agent 400 in response to the input voice data transmitted in the processing in Step S740 (Step S640: Repetition of No).

Here, the input text is a character string resulting from conversion of the input voice data transmitted in the processing in Step S740 performed by the voice dialogue agent 400.

When the communication unit 250 receives the input text (Step S640: Yes), the display unit 270 displays the input text (Step S650).

Figure 11B:
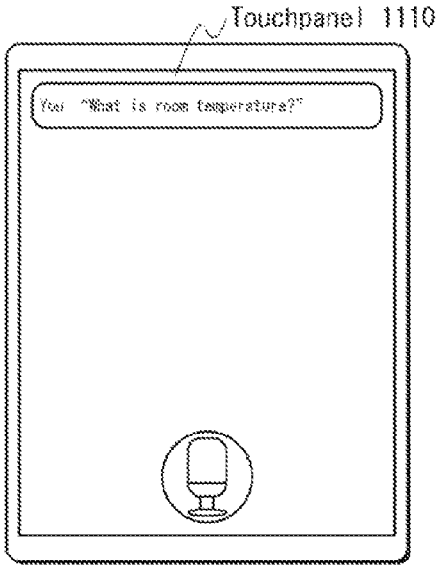

FIG. 11B is a pattern diagram showing an example of a situation in which in the case where the device 140 is for example a smartphone, the display unit 270 displays an input text.

In the figure, an example is shown in which the input text is a character string "What is room temperature?". As shown in the figure, the input text, which is the character string "What is room temperature?" is displayed on the touchpanel 1110, which is part of the display unit 270, together with a character string "You".

Referring back to FIG. 6 again, the explanation on the first device processing is continued.

After the end of the processing in Step S650, the control unit 210 stands by until the communication unit 250 receives a response text and response voice data that are returned from the voice dialogue agent 400 in response to the input voice data transmitted in the processing in Step S740 (Step S640: Repetition of No).

When the communication unit 250 receives the response text and the response voice data (Step S660: Yes), the display unit 270 displays the response text (Step S670), and the voice output unit 260 converts the response voice data to a voice and outputs the voice (Step S680).

Figure 11C:
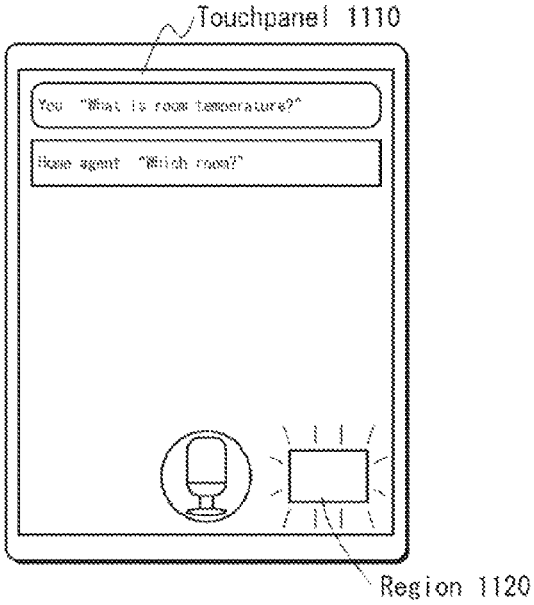
Figure 11D:
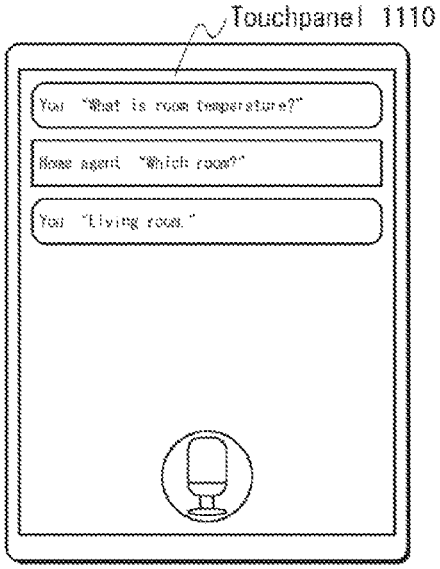

FIG. 11C is a pattern diagram showing an example of a situation in which in the case where the device 140 is for example a smartphone, the display unit 270 displays a response text.

In the figure, an example is shown in which the response text is a character string "Which room?". As shown in the figure, the response text, which is the character string "Which room?", is displayed on the touchpanel 1110 which is part of the display unit 270, together with a character string "Home agent".

Referring back to FIG. 6 again, the explanation on the first device processing is continued.

After the end of the processing in Step S680, the device 140 ends the first device processing.

<First Agent Processing>

The first agent processing is processing performed by the voice dialogue agent 400. In the first agent processing, (1) the voice dialogue agent 400 receives input voice data transmitted from a device, (2) performs voice recognition processing on the received input voice data to generate an input text, and returns the generated input text to the device, (3) generates an instruction set based on the generated input text, and executes the generated instruction set, (4) generates a response text based on an execution result of the instruction set, (5) converts the generated response text to response voice data, and (6) returns the response text and the response voice data to the device.

Figure 8:
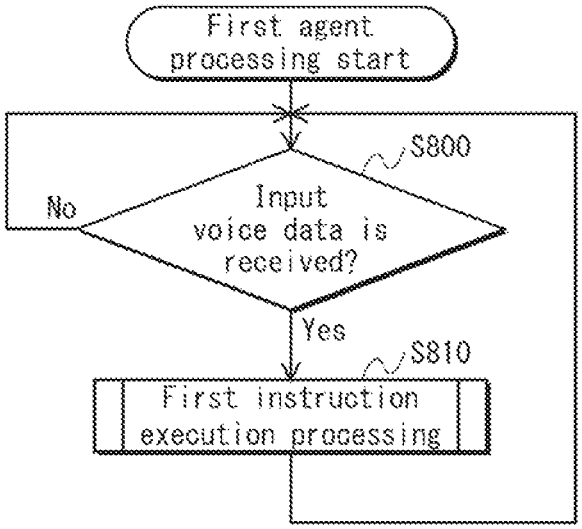
FIG. 8 is a flow chart of first agent processing.

FIG. 8 is a flow chart of the first agent processing.

Upon bootup of the voice dialogue agent 400, the first agent processing is started.

When the first agent processing is started, the voice dialogue agent 400 stands by until the communication unit 420 receives input voice data transmitted from the device 140 (Step S800: Repetition of No). When the communication unit 420 receives the input voice data (Step S800: Yes), the voice dialogue agent 400 performs first instruction execution processing (Step S810).

Figure 9:
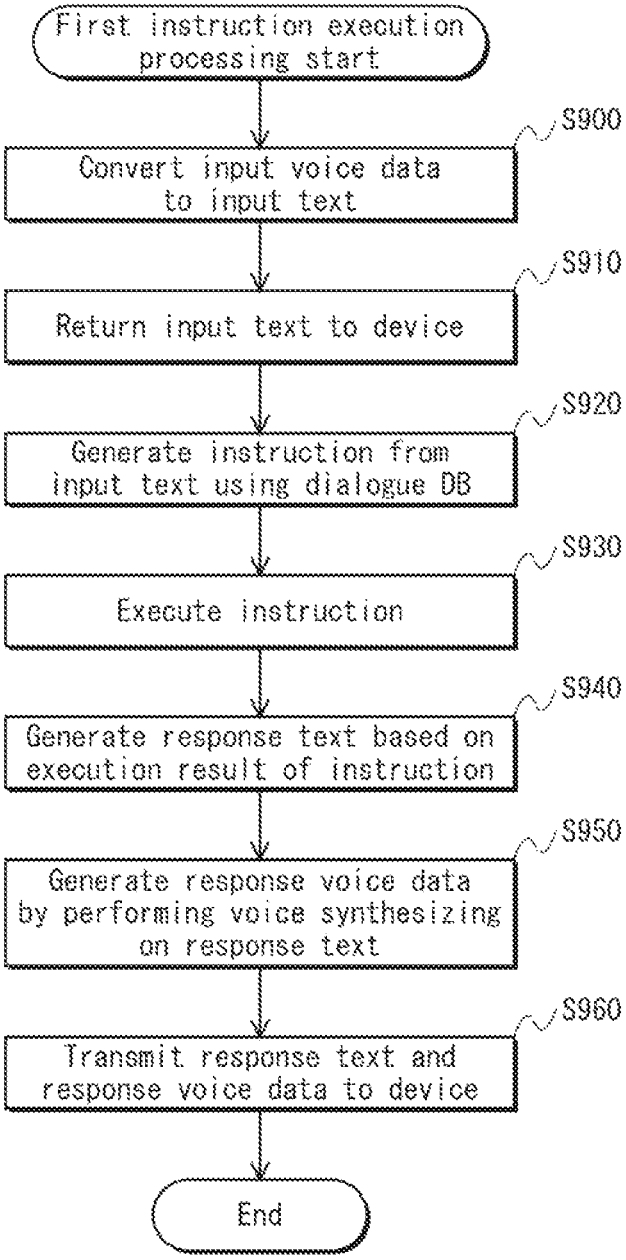
FIG. 9 is a flow chart of first instruction execution processing.

FIG. 9 is a flow chart of the first instruction execution processing.

When the first instruction execution processing is started, the voice recognition processing unit 430 performs voice recognition processing on the input voice data, which is received by the communication unit 420, to convert the input voice data to an input text that is a character string (Step S900).

After the conversion to the input text, the control unit 410 controls the communication unit 420 to return the converted input text to the device 140 which has transmitted the input voice data (Step S910).

The control unit 410 controls the instruction generation unit 460 to generate an instruction set by: (1) referring to the dialog DB 500 stored in the dialogue DB storage unit 440 to read, based on the keyword 510 included in the input text, the target device 520, the startup application 530, the processing details 540, and the response text 550, which are associated with the keyword 510; and (2) transmitting a group of the read target device 520, startup application 530, and processing details 540 to the instruction generation unit 460.

After the generation of the instruction set, the control unit 410 executes the generated instruction set (Step S930), and generates a response text specified by the response text 550 based on an execution result of the instruction set (Step S940). Here, the control unit 410 generates a response text by communicating with a device specified by the target device 520 with use of the communication unit 420 to cause the specified device to execute part of the instruction set and transmit an execution result of the part of the instruction set.

After the generation of the response text, the voice synthesizing processing unit 450 performs voice synthesizing processing on the generated response text to generate response voice data (Step S950).

After the generation of the response voice data, the control unit 410 controls the communication unit 420 to transmit the generated response text and response voice data to the device 140 which has transmitted the input voice data (Step S960).

After the end of the processing in Step S960, the voice dialogue agent 400 ends the first instruction execution processing.

Referring back to FIG. 8, the explanation on the first agent processing is continued.

After the end of the first instruction execution processing, the voice dialogue agent 400 returns to the processing in Step S800 to perform the processing in Step S800 and the subsequent steps.

The following explains a specific example of the operation performed by the voice dialogue system 100 having the above configuration, with reference to the drawing.

<Specific Example>

Figure 10:
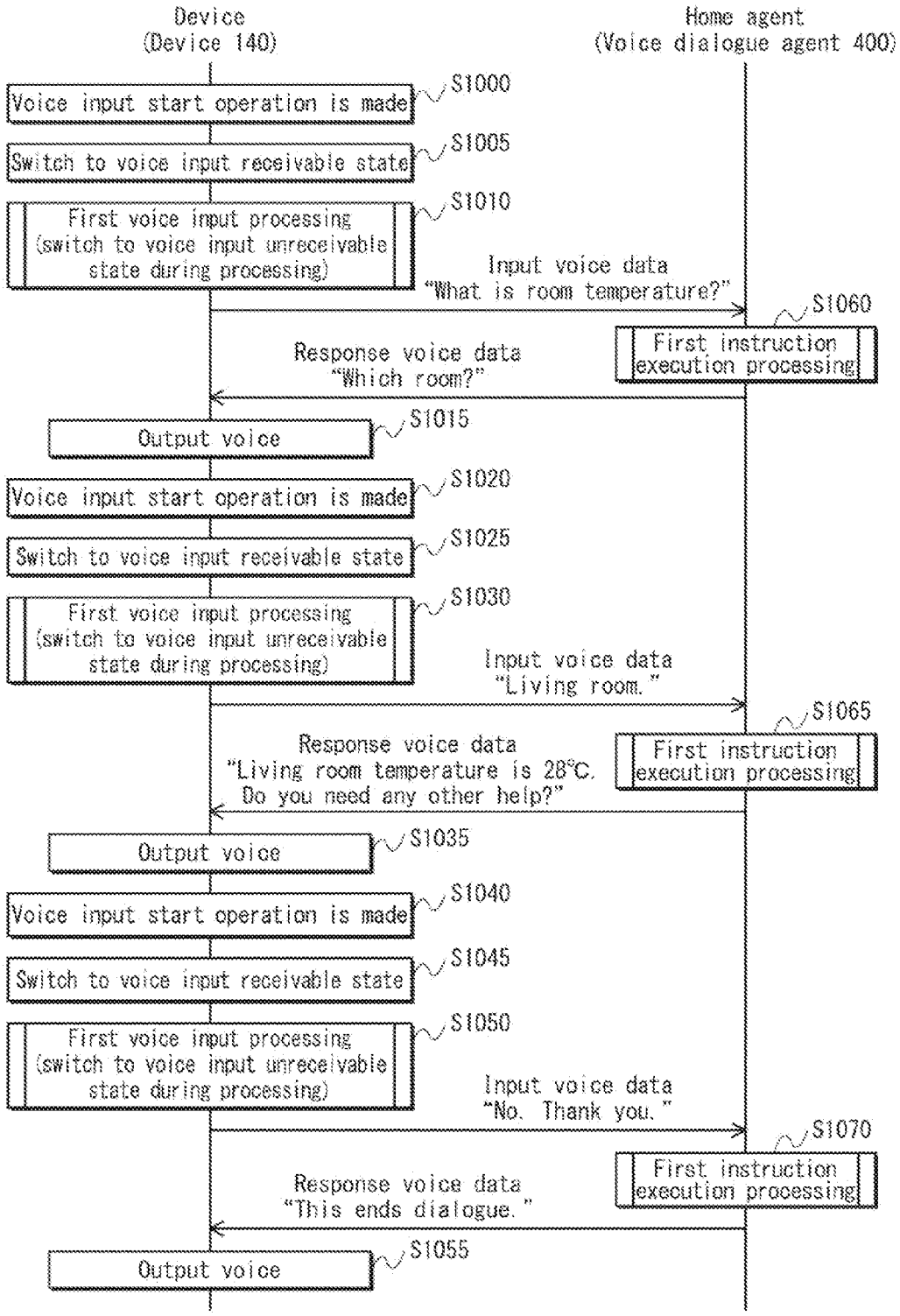
FIG. 10 is a procedure diagram in a specific example.

FIG. 10 is a procedure diagram schematically showing a situation in which the user of the voice dialogue system 100 makes a voice dialogue with the voice dialogue agent 400 with use of the device 140 (here, a smartphone), and the voice dialogue agent 400 performs processing that reflects details of the dialogue.

When the user performs a voice input start operation (Step S1000, corresponding to Step S600: Yes in FIG. 6), the state is switched to the voice input receivable state (Step S1005, corresponding to Step S610 in FIG. 6), and the device 140 performs first voice input processing (Step S1010, corresponding to Step S630 FIG. 6).

FIG. 11A is a diagram schematically showing an example of a situation in which, while the state is the voice input receivable state in the first voice input processing, the touchpanel 1110, which is part of the display unit 270 included in the device 140 which is a smartphone, displays that the state is the voice input receivable state by blinking the region 1120.

Referring back to FIG. 10, the explanation on the specific example is continued.

In the first voice input processing, in the case where the user inputs a voice "What is room temperature?", the device 140 transmits input voice data "What is room temperature?" to the voice dialogue agent 400 (corresponding to Step S740 in FIG. 7).

Then, the voice dialogue agent 400 receives the input voice data (corresponding to Step S800: Yes in FIG. 8), and performs first instruction execution processing (Step S1060, corresponding to Step S810 in FIG. 8).

Here, in the first instruction execution processing, in the case where the voice dialogue agent 400 generates response voice data "Which room?", the voice dialogue agent 400 transmits the response voice data "Which room?" to the device 140 (corresponding to Step S960 in FIG. 9).

Then, the device 140 receives the response voice data (corresponding to Step S660: Yes in FIG. 6), and outputs a voice "Which room?" (Step S1015, corresponding to Step S680 in FIG. 6).

In the processing in Step S1010, when the predetermined period T1 has lapsed after the switching of the state to the voice input receivable state, the state is switched again to the voice input unreceivable state (corresponding to Step S720 in FIG. 7). Accordingly, the user, who has heard the voice "Which room?" which is output from the device 140, performs a new voice input start operation with respect to the device 140 to newly input a voice (Step S1020, corresponding to Step S600: Yes in FIG. 6). Then, the state is switched to the voice input receivable state (Step S1025, corresponding to Step S610 in FIG. 6), and the device 140 performs first voice input processing (Step S1030, corresponding to Step S630 in FIG. 6).

FIG. 11C is a diagram schematically showing an example of a situation in which, while the state is the voice input receivable state in the first voice input processing, the touchpanel 1110, which is part of the display unit 270 included in the device 140 which is a smartphone, displays that the state is the voice input receivable state by blinking the region 1120.

Referring back to FIG. 10 again, the explanation on the specific example is continued.

In the first voice input processing, in the case where the user inputs a voice "Living room.", the device 140 transmits input voice data "Living room." to the voice dialogue agent 400 (corresponding to Step S740 in FIG. 7).

Then, the voice dialogue agent 400 receives the input voice data (corresponding to Step S800: Yes in FIG. 8), and performs first instruction execution processing (Step S1065, corresponding to Step S810 in FIG. 8).

Here, in the first instruction execution processing, in the case where the voice dialogue agent 400 generates response voice data "Living room temperature is 28 degrees C. Do you need any other help?", the voice dialogue agent 400 transmits the response voice data "Living room temperature is 28 degrees C. Do you need any other help?" to the device 140 (corresponding to Step S960: Yes in FIG. 9).

Then, the device 140 receives the response voice data (corresponding to Step S660: Yes in FIG. 6), and outputs a voice "Living room temperature is 28 degrees C. Do you need any other help?" (Step S1035, corresponding to Step S680 in FIG. 6).

In the processing in Step S1010, when the predetermined period T1 has lapsed after the switching of the state to the voice input receivable state, the state is switched again to the voice input unreceivable state (corresponding to Step S720 in FIG. 7). Accordingly, the user, who has heard the voice "Living room temperature is 28 degrees C. Do you need any other help?" which is output from the device 140, performs a new voice input start operation with respect to the device 140 to newly input a voice (Step S1040, corresponding to Step S600: Yes in FIG. 6). Then, the state is switched to the voice input receivable state (Step S1045, corresponding to Step S610 in FIG. 6), and the device 140 performs first voice input processing (Step S1050, corresponding to Step S630 in FIG. 6).

Figure 12:
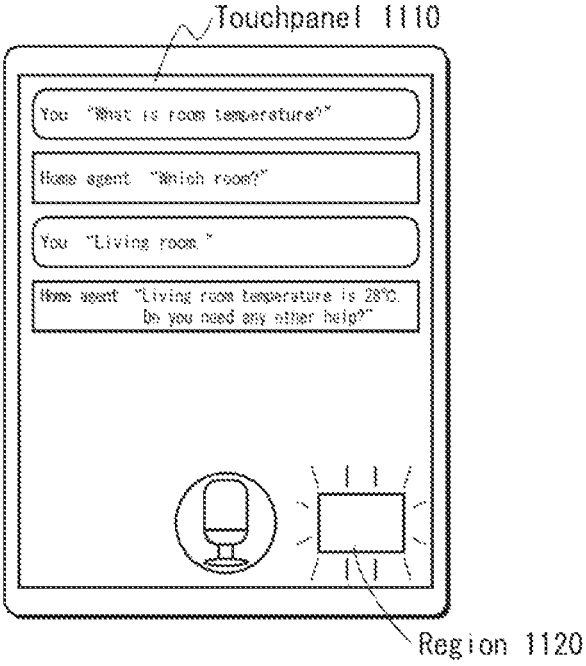
FIG. 12 is a pattern diagram showing contents displayed by the device 140.

FIG. 12 is a diagram schematically showing an example where, in the first voice input processing, while the state is the voice input receivable state, the touchpanel 1110, which is part of the display unit 270 included in the device 140 which is a smartphone, displays that the state is the voice input receivable state by blinking the region 1120.

Referring back to FIG. 10 again, the explanation on the specific example is continued.

In the first voice input processing, in the case where the user inputs a voice "No. Thank you.", the device 140 transmits input voice data "No. Thank you." to the voice dialogue agent 400 (corresponding to Step S740 in FIG. 7).

Then, the voice dialogue agent 400 receives the input voice data (corresponding to Step S800: Yes in FIG. 8), and performs first instruction execution processing (Step S1070, corresponding to Step S810 in FIG. 8).

Here, in the first instruction execution processing, in the case where the voice dialogue agent 400 generates response voice data "This ends dialogue.", the voice dialogue agent 400 transmits the response voice data "This ends dialogue." to the device 140 (corresponding to Step S960: Yes in FIG. 9).

Then, the device 140 receives the response voice data (corresponding to Step S660: Yes in FIG. 6), and outputs a voice "This ends dialogue." (Step S1055, corresponding to Step S680 in FIG. 6).

<Consideration>

According to the voice dialogue system 100 having the above configuration, the user switches the state of the device 140 by performing a voice input start operation with respect to the device 140, and inputs a voice. Then, when the predetermined period T1 has lapsed, the state of the device 140 is switched to the voice input unreceivable state even if the user does not perform any operation for switching the state of the device 140 to the voice input unreceivable state.

According to the voice dialogue system 100, therefore, a reduced number of operations need to be performed by the user in accordance with a voice input, compared with a voice dialogue system in which each time a voice input ends, it is necessary to perform an operation for switching the state of the device 140 to the voice input unreceivable state.

Embodiment 2

<Outline>

The following explains, as one aspect of the voice dialogue method relating to the present invention and one aspect of the device relating to the present invention, a first modified voice dialogue system that is a partial modification of the voice dialogue system 100 in Embodiment 1.

The voice dialogue system 100 in Embodiment 1 has been explained as an example of the configuration in which when the user performs a voice input start operation, the device 140 is in the voice input receivable state for a period from performance of the voice input start operation to lapse of the predetermined period T1.

Compared with this, the first modified voice dialogue system in Embodiment 2 is an example of configuration in which in the case where a device outputs a voice based on response voice data, the device is in the voice input receivable state for a period from output of the voice to lapse of the predetermined period T1, in addition to the above period.

The following explains the details of the first modified voice dialogue system, focusing on different points from the voice dialogue system 100 in Embodiment 1, with reference to the drawings.

<Configuration>

The first modified voice dialogue system is modified from the voice dialogue system 100 in Embodiment 1 so as to include a device 1300 instead of the device 14.

The device 1300 is not modified from the device 140 in Embodiment 1 in terms of hardware, but is partially modified from the device 140 in terms of software to be stored as an execution target. Accordingly, the device 1300 is modified from the device 140 in Embodiment 1 in terms of part of functions.

Figure 13:
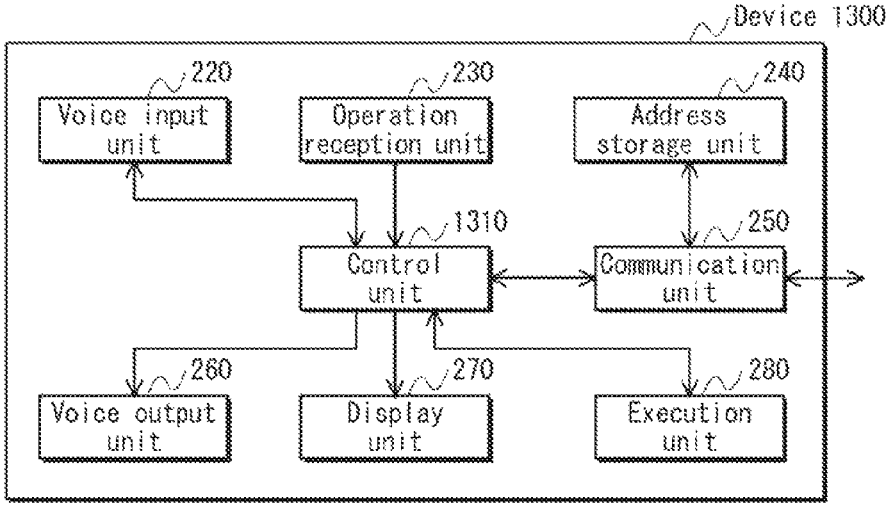
FIG. 13 is a block diagram showing functional configuration of a device 1300.

FIG. 13 is a block diagram showing functional configuration of the device 1300.

As shown in the figure, the device 1300 is modified from the device 140 in Embodiment 1 (see FIG. 2) so as to include a control unit 1310 instead of the control unit 210.

The control unit 1310 is modified from the control unit 210 in Embodiment 1 so as to have a first modified voice input unit state management function and a second device processing execution function, which are described below, instead of the voice input unit state management function and the first device processing execution function of the control unit 210.

Similarly to the voice input unit state management function in Embodiment 1, the first modified voice input unit state management function is a function of managing the state of the voice input unit 220, which is either the voice input receivable state or the voice input unreceivable state, and conditions for switching the state are partially modified from those in the voice input unit state management function in Embodiment 1.

Figure 14:
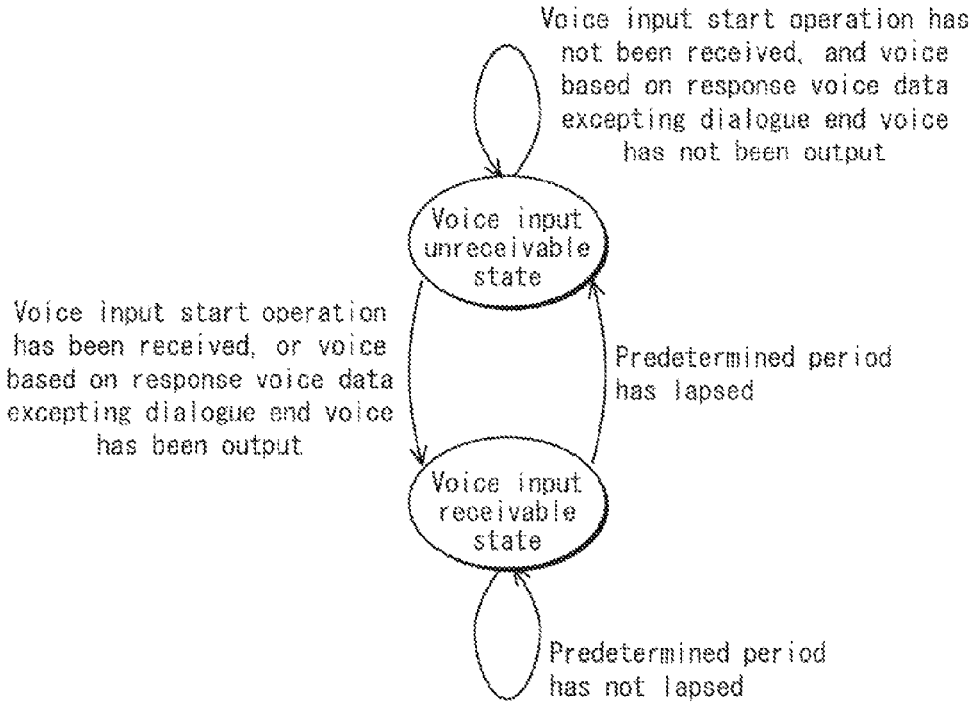
FIG. 14 shows switching of the state managed by a control unit 1310.

FIG. 14 shows switching of the state managed by the control unit 1310.

As shown in the figure, in the case where the state is the voice input unreceivable state, (1) the control unit 1310 keeps the state to the voice input unreceivable state until the operation reception unit 230 receives a voice input start operation or the voice output unit 260 outputs a voice included in voices based on response voice data except a predetermined voice. (2) After the reception of the voice input start operation by the operation reception unit 230 or output of the voice included in voices based on the response voice data by the voice output unit 260, the control unit 1310 switches the state to the voice input receivable state. Then, in the case where the state is the voice input receivable state, (3) the control unit 1310 keeps the state to the voice input receivable state until a predetermined period T1 (for example, five seconds) has lapsed after the switching of the state to the voice input receivable state. (4) After the lapse of the predetermined period T1, the control unit 1310 switches the state to the voice input unreceivable state.

Here, the predetermined voice included in the voices based on response voice data is a voice that indicates unnecessity of a new voice input, such as a voice "This ends dialogue.". Hereinafter, this voice is referred to also as a dialogue end voice.

Note that upon bootup of the device 1300, the control unit 1310 starts managing the state as the voice input unreceivable state.

Referring back to FIG. 13, the explanation on the control unit 1310 is continued.

The second device processing execution function is a function performed by the control unit 1310 controlling the voice input unit 220, the operation reception unit 230, the communication unit 250, the voice output unit 260, the display unit 270, and the execution unit 280 to cause the device 1300 to execute the second device processing that is its characteristic operation to execute a sequence of processing described below. In the sequence of processing, (1) when the user performs a voice input start operation, (2) the device 1300 receives a voice input from the user, and generates input voice data, (3) transmits the generated input voice data to a voice dialogue agent, (4) receives response voice data returned from the voice dialogue agent, (5) outputs a voice based on the received response voice data, and (6) in the case where the output voice is not a dialogue end voice, the device 1300 repeats the processing (2) and the subsequent processing even if the user does not perform a voice input start operation.

Note that the second device processing is explained in detail in section <Second Device Processing> later with reference to a flow chart.

The following explains the operation of the first modified voice dialogue system having the above configuration, with reference to the drawings.

<Operation>

The first modified voice dialogue system performs second device processing as its characteristic operation, in addition to the first agent processing in Embodiment 1. The second device processing is partially modified from the first device processing in Embodiment 1.

Explanation is given on the second device processing below, focusing on different points from the first device processing.

<Second Device Processing>

The second device processing is processing performed by the device 1300. In the second device processing, (1) when the user performs a voice input start operation, (2) the device 1300 receives a voice input from the user, and generates input voice data, (3) transmits the generated input voice data to a voice dialogue agent, (4) receives response voice data returned from the voice dialogue agent, (5) outputs a voice based on the received response voice data, and (6) in the case where the output voice is not a dialogue end voice, the device 1300 repeats the processing (2) and the subsequent processing even if the user does not perform a voice input start operation.

Figure 15:
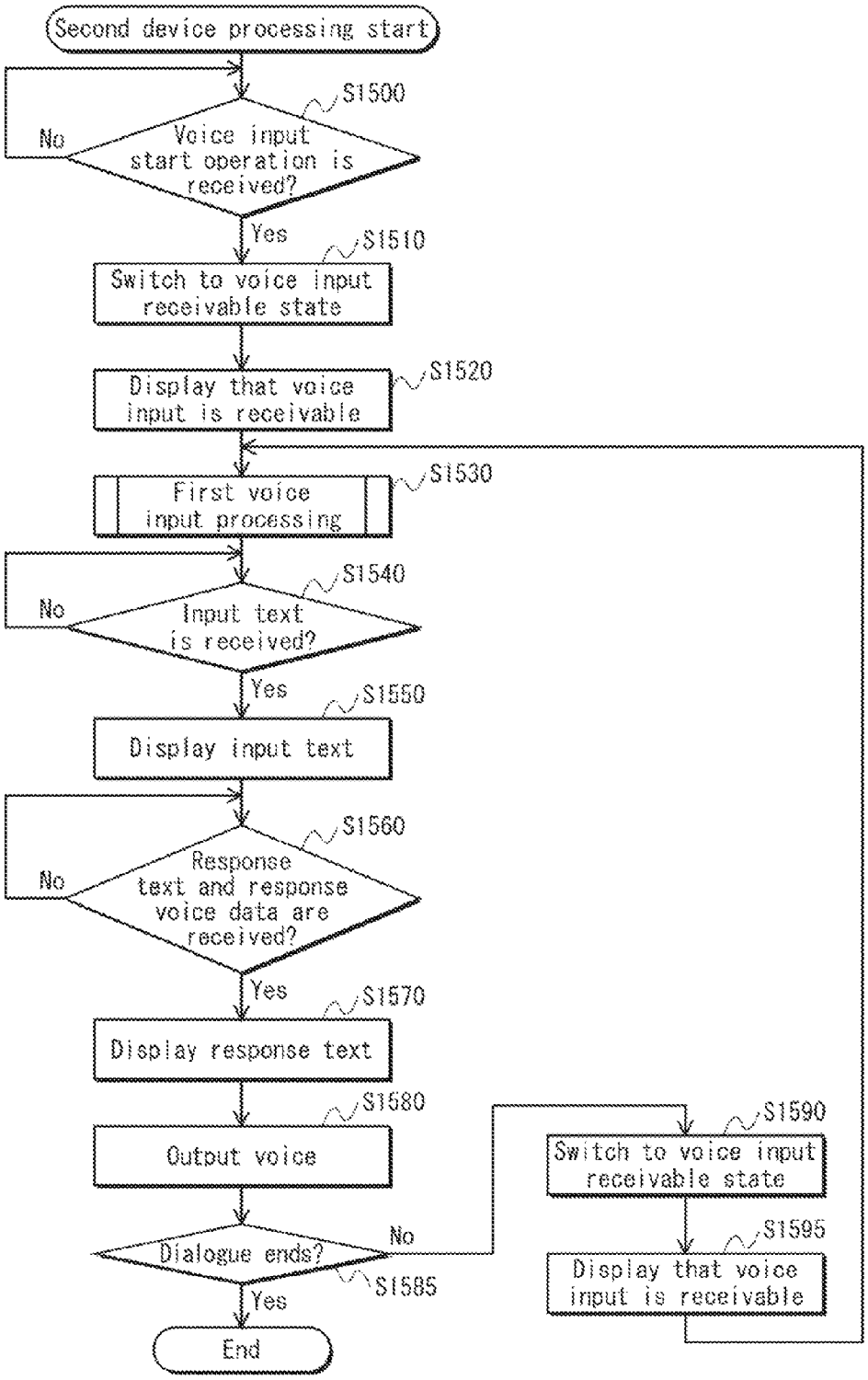
FIG. 15 is a flow chart of second device processing.

FIG. 15 is a flow chart of the second device processing.

Upon bootup of the device 1300, the second device processing is started.

At a time of bootup of the device 1300, the state managed by the control unit 1310 is the voice input unreceivable state.

In the figure, processing in Steps S1500-S1580 is the same as the processing in Steps S600-S680 in the first device processing in Embodiment 1 (see FIG. 6), and is accordingly regarded as having been already explained.

After the end of the processing in Step S1580, the control unit 1310 checks whether or not the voice, which is output from the voice output unit 260 in the processing in Step S1580, is a dialogue end voice (Step S1585). This processing is executed by for example checking whether or not the response text, which is received in the processing in Step S1560: Yes, is a predetermined character string (for example, a character string "This ends dialogue.").

In the processing in Step S1585, in the case where the response text is not a dialogue end voice (Step S1585: No), the control unit 1310 switches the state from the voice input unreceivable state to the voice input receivable state (Step S1590), and causes the display unit 270 to display that the state is the voice input receivable state (Step S1595).

After the end of the processing in Step S1595, the device 1300 returns to the processing in Step S1530 to perform the processing in Step S1530 and the subsequent steps.

In the processing in Step S1585, in the case where the response text is a dialogue end voice (Step S1585: Yes), the device 1300 ends the second device processing.

The following explains a specific example of the operation performed by the first modified voice dialogue system having the above configuration, with reference to the drawing.

<Specific Example>

Figure 16:
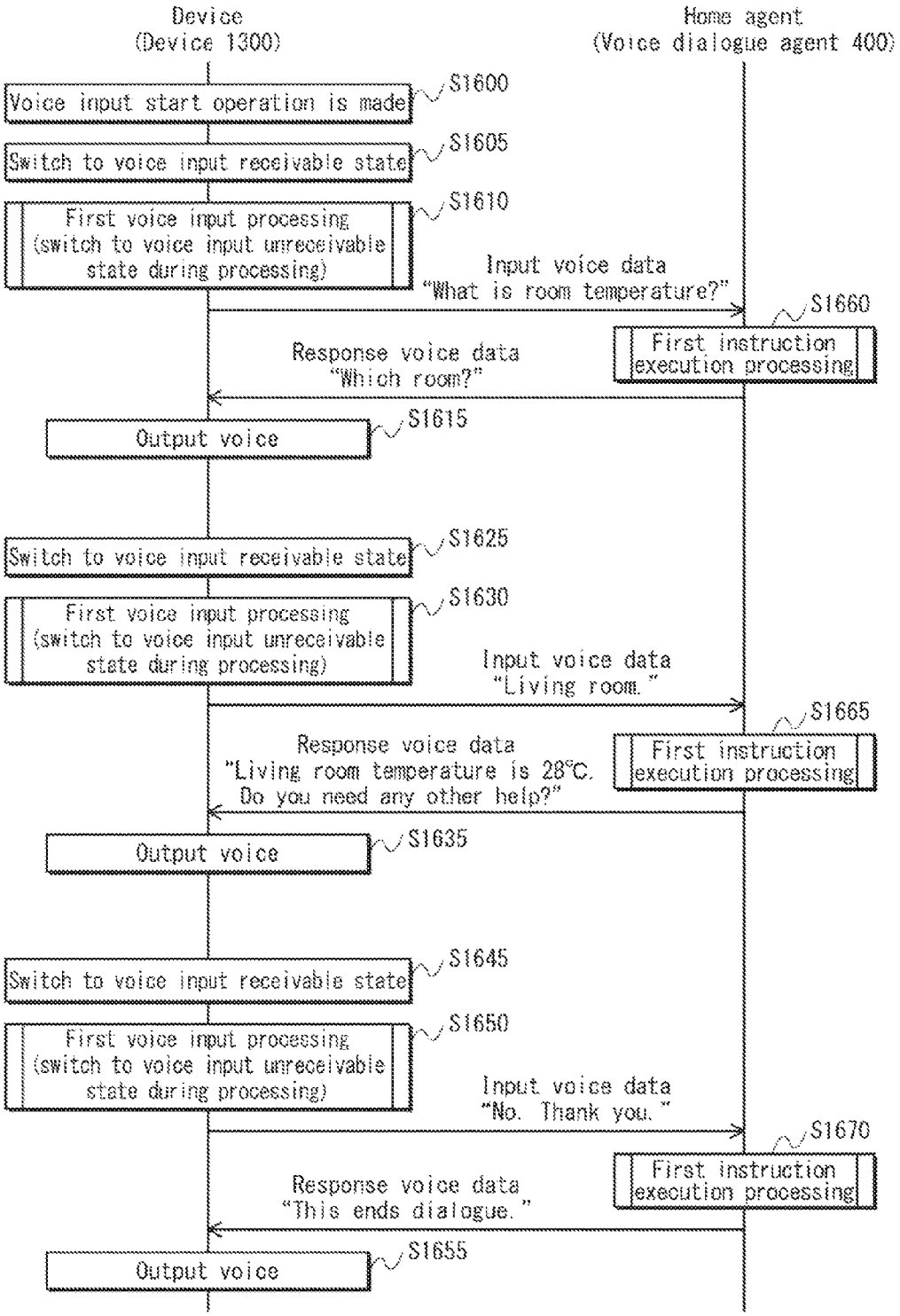
FIG. 16 is a procedure diagram schematically showing a situation in which a dialogue with a voice dialogue agent is performed.

FIG. 16 is a procedure diagram schematically showing a situation in which the user of the first modified voice dialogue system performs a voice dialogue with the voice dialogue agent 400 with use of the device 1300 (here, assumed to be a smartphone), and the voice dialogue agent 400 performs processing that reflects details of the dialogue.

Here, the explanation is given based on the assumption that a dialogue end voice is a voice "This ends dialogue.".

In the figure, processing in Steps S1600-S1615, processing in Steps S1630-S1635, processing in Steps S1650-S1655, and processing in Steps S1660-S1670 are respectively the same as the processing in Steps S1000-S1015, the processing in Steps S1030-S1035, the processing in Steps S1050-S1055, and the processing in Steps S1060-S1070 in the specific examples in Embodiment 1 (see FIG. 10). Accordingly, the processing in the figure is regarded as having been already explained.

After the end of the processing in Step S1615, since a voice "Which room?" is not a dialogue end voice (corresponding to Step S1585: No in FIG. 15), the state is switched to the voice input receivable state (Step S1625, corresponding to Step S1590 in FIG. 15). The device 1300 performs first voice input processing (Step S1630, corresponding to Step S1530 in FIG. 15).

After the end of the processing in Step S1635, since a voice "Living room temperature is 28 degrees C. Do you need any other help?" is not a dialogue end voice (corresponding to Step S1585: No in FIG. 15), the state is switched to the voice input receivable state (Step S1645, corresponding to Step S1590 in FIG. 15). The device 1300 performs first voice input processing (Step S1650, corresponding to Step S1530 in FIG. 15).

After the end of the processing in Step S1635, since a voice "This ends dialogue." is a dialogue end voice (corresponding to Step S1585: Yes in FIG. 15), the state is not switched to the voice input receivable state. The device 1300 ends the second device processing.

<Consideration>

According to the first modified voice dialogue system having the above configuration, in the case where the device 1300 outputs a voice based on response voice data transmitted from the voice dialogue agent 400 and the output voice is not a dialogue end voice, the state of the device 1300 is switched to the voice input receivable state even if the user does not perform a voice input start operation.

Accordingly, once the user performs a voice input start operation with respect to the device 1300, the user can newly input a voice without newly performing a voice input operation with respect to the device 1300, for a period from output of the voice based on the response voice data to lapse of the predetermined period T1 until a dialogue end voice is output.

According to the first modified voice dialogue system, as described above, a further reduced number of operations need to be performed by the user in accordance with a voice input, compared with the voice dialogue system 100 in Embodiment 1.

Embodiment 3

<Outline>

The following explains, as one aspect of the voice dialogue method relating to the present invention and one aspect of the device relating to the present invention, a second modified voice dialogue system that is partially modified from the voice dialogue system 100 in Embodiment 1.

The voice dialogue system 100 in Embodiment 1 has been explained as an example of the configuration in which when the user performs a voice input start operation with respect to the device 140, the device 140 is in the voice input receivable state for a period from performance of the voice input start operation to lapse of the predetermined period T1.

Compared with this, the second modified voice dialogue system in Embodiment 3 is an example of configuration in which once a user performs a voice input start operation with respect to a device, the device is in the voice input receivable state for a period from performance of the voice input start operation to output of a dialogue end voice.

The following explains the details of the second modified voice dialogue system, focusing on different points from the voice dialogue system 100 in Embodiment 1, with reference to the drawings.

<Configuration>

The second modified voice dialogue system is modified from the voice dialogue system 100 in Embodiment 1 so as to include a device 1700 instead of the device 140.

The device 1700 is not modified from the device 140 in Embodiment 1 in terms of hardware, but is partially modified from the device 140 in terms of software to be stored as an execution target. Accordingly, the device 1700 is modified from the device 140 in Embodiment 1 in terms of part of functions.

Figure 17:
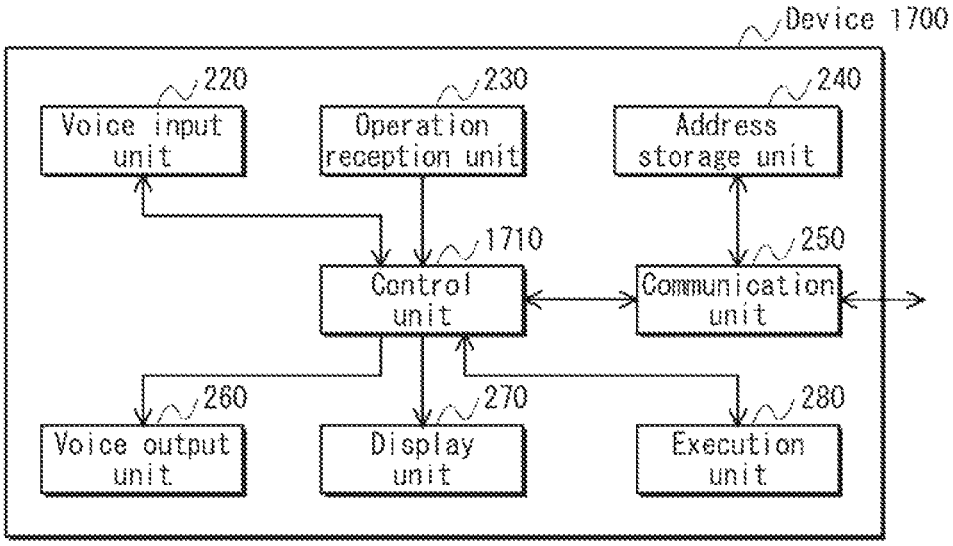
FIG. 17 is a block diagram showing functional configuration of a device 1700.

FIG. 17 is a block diagram showing functional configuration of the device 1700.

As shown in the figure, the device 1700 is modified from the device 140 in Embodiment 1 (see FIG. 2) so as to include the control unit 1710 instead of the control unit 210.

The control unit 1710 is modified from the control unit 210 in Embodiment 1 so as to have a second modified voice input unit state management function and a third device processing execution function, which are described below, instead of the voice input unit state management function and the first device processing execution function of the functions of the control unit 210, respectively.

Similarly to the voice input unit state management function in Embodiment 1 and the first modified voice input unit state management function in Embodiment 2, the second modified voice input unit state management function is a function of managing the state of the voice input unit 220, which is either the voice input receivable state or the voice input unreceivable state, and conditions for switching the state are partially modified from those in the voice input unit state management function in Embodiment 1.

Figure 18:
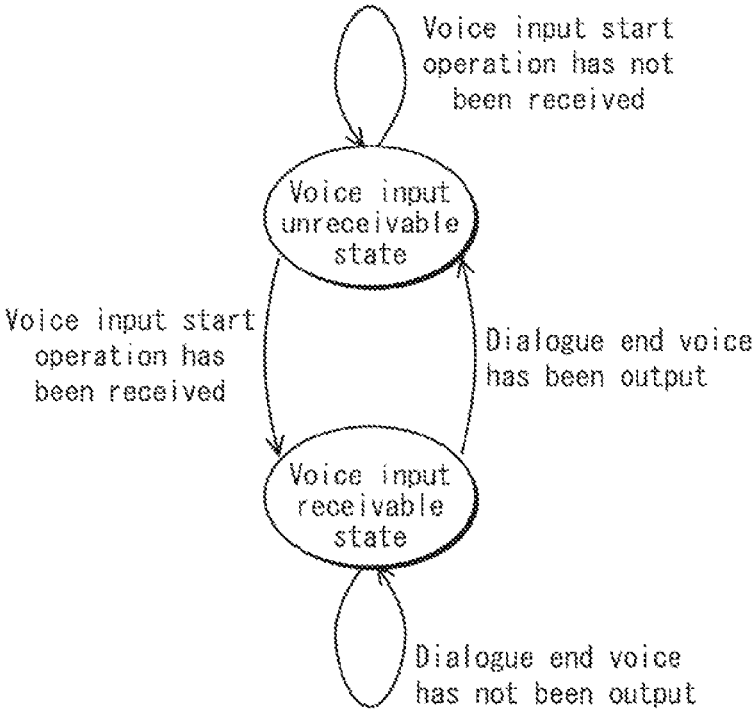
FIG. 18 shows switching of the state managed by a control unit 1710.

FIG. 18 shows switching of the state managed by the control unit 1710.

As shown in the figure, in the case where the state is the voice input unreceivable state, (1) the control unit 1710 keeps the state to the voice input unreceivable state until the operation reception unit 230 receives a voice input start operation, and (2) after the reception of the voice input start operation by the operation reception unit 230, the control unit 210 switches the state to the voice input receivable state. Then, in the case where the state is the voice input receivable state, (3) the control unit 1710 keeps the state to the voice input receivable state until the voice output unit 260 outputs a dialogue end voice (for example, a voice "This ends dialogue."), and (4) after the output of the dialogue end voice by the voice output unit 260, the control unit 1710 switches the state to the voice input unreceivable state.

Referring back to FIG. 17, the explanation on the control unit 1710 is continued.

The third device processing execution function is a function performed by the control unit 1710 controlling the voice input unit 220, the operation reception unit 230, the communication unit 250, the voice output unit 260, the display unit 270, and the execution unit 280 to cause the device 1700 to execute the third device processing, as its characteristic operation, to execute a sequence of processing described below. In the sequence of processing, (1) when the user performs a voice input start operation, (2) the device 1700 receives a voice input from the user, and generates input voice data, (3) transmits the generated input voice data to a voice dialogue agent, (4) receives response voice data returned from the voice dialogue agent, (5) outputs a voice based on the received response voice data, and (6) in the case where the output voice is not a dialogue end voice, repeats the processing (2) and the subsequent processing even if the user does not perform a voice input start operation.

Note that the third device processing is explained in detail in section <Third Device Processing> later with reference to a flow chart.

The following explains the operation of the second modified voice dialogue system having the above configuration, with reference to the drawings.

<Operation>

The second modified voice dialogue system performs third device processing as its characteristic operation, in addition to the first agent processing in Embodiment 1. The third device processing partially modified from the first device processing in Embodiment 1.

Explanation is given on the third device processing below, focusing on different points from the first device processing.

<Third Device Processing>

The third device processing is processing performed by the device 1700. In the third device processing, (1) when the user performs a voice input start operation with respect to the device 1700, (3) the device 1700 receives a voice input from the user, and generates input voice data, (3) transmits the generated input voice data to a voice dialogue agent, (4) receives response voice data returned from the voice dialogue agent, (5) outputs a voice based on the received response voice data, and (6) in the case where the output voice is not a dialogue end voice, repeats the processing (2) and the subsequent processing even if the user does not perform a voice input start operation.

Figure 19:
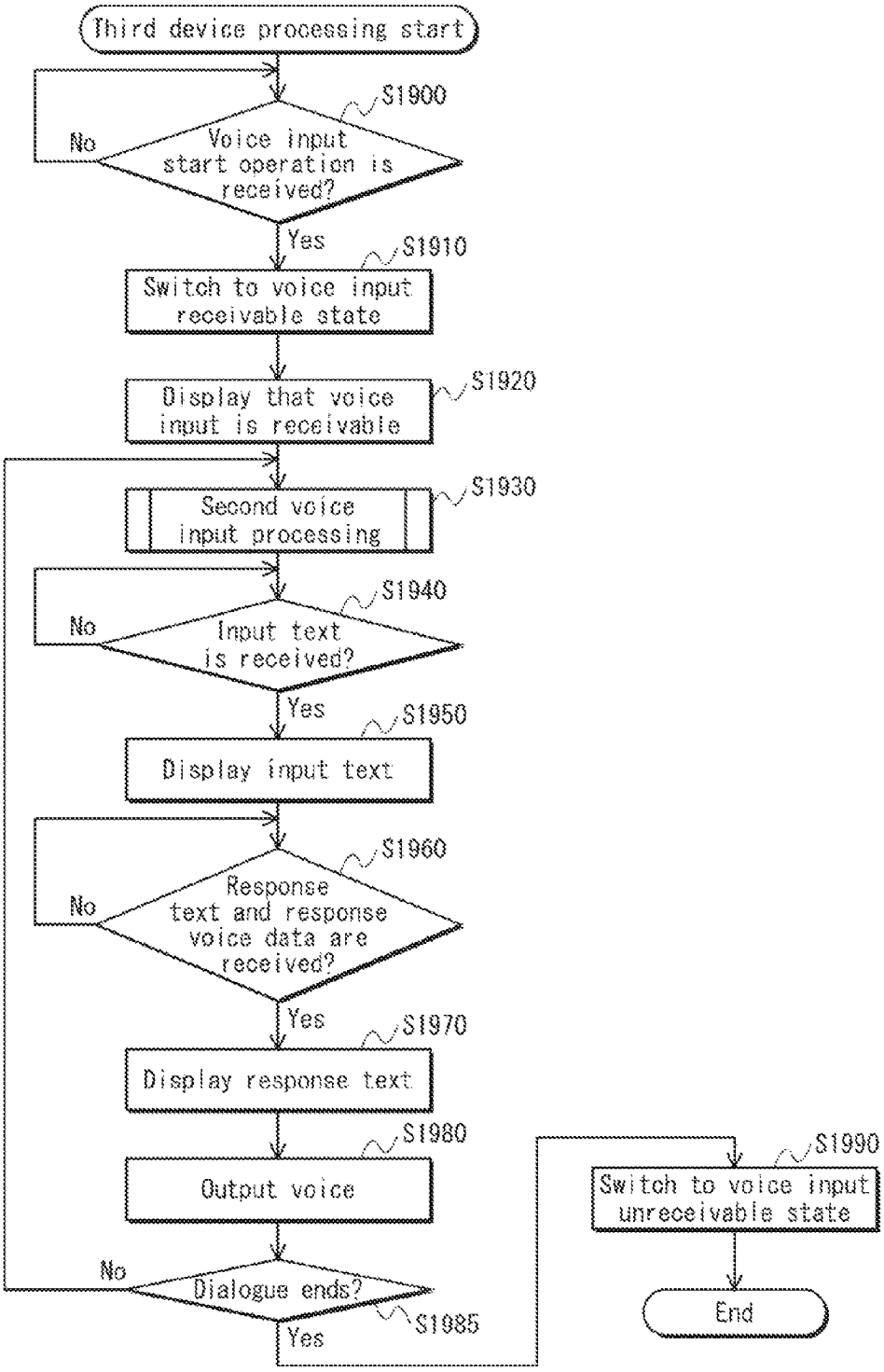
FIG. 19 is a flow chart of third device processing.

FIG. 19 is a flow chart of the third device processing.

Upon bootup of the device 1700, the third device processing is started.

At a time of bootup of the device 1700, the state managed by the control unit 1710 is the voice input unreceivable state.

In the figure, processing in Steps S1900-S1920 and processing in Steps S1940-S1980 is respectively the same as the processing in Steps S600-S620 and the processing in Steps S640-S680 in the first device processing in Embodiment 1 (see FIG. 6). Accordingly, the processing in the figure is regarded as having been already explained.

After the end of the processing in Step S1920, the device 1700 executes second voice input processing (Step S1930).

Figure 20:
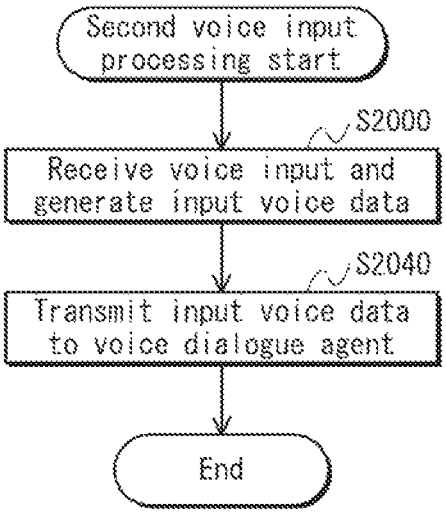
FIG. 20 is a flow chart of second voice input processing.

FIG. 20 is a flow chart of the second voice input processing.

When the second voice input processing is started, the voice input unit 220 receives a voice input from a user, and generates input voice data (Step S2000).

Then, the control unit 1910 controls the communication unit 250 to transmit the input voice data, which is generated by the voice input unit 220, to the voice dialogue agent 400 (Step S2040).

After the end of the processing in Step S2040, the device 1700 ends the second voice input processing.

Referring back to FIG. 19, the explanation on the third device processing is continued.

After the end of the second voice input processing, the device 1700 proceeds to processing in Step S1940 to perform the processing in Step S1940 and processing in subsequent steps.

After the end of the processing in Step S1980, the control unit 1710 checks whether or not the voice, which is output from the voice output unit 260 in the processing in Step S1980, is a dialogue end voice (Step S1985). This processing is executed by for example checking whether or not the response text, which is received in the processing in Step S1960: Yes, is a predetermined character string (for example, a character string "This ends dialogue.").

In the processing in Step S1985, in the case where the output voice is not a dialogue end voice (Step S1985: No), the device 1700 returns to the processing in Step S1930 to repeat the processing in Step S1930 and the subsequent steps.

In the processing in Step S1985, in the case where the output voice is a dialogue end voice (Step S1585: Yes), the control unit 1710 switches the state from the voice input receivable state to the voice input unreceivable state (Step S1990).

After the end of the processing in Step S1990, the device 1700 ends the third device processing.

The following explains a specific example of the operation performed by the second modified voice dialogue system having the above configuration, with reference to the drawing.

<Specific Example>

Figure 21:
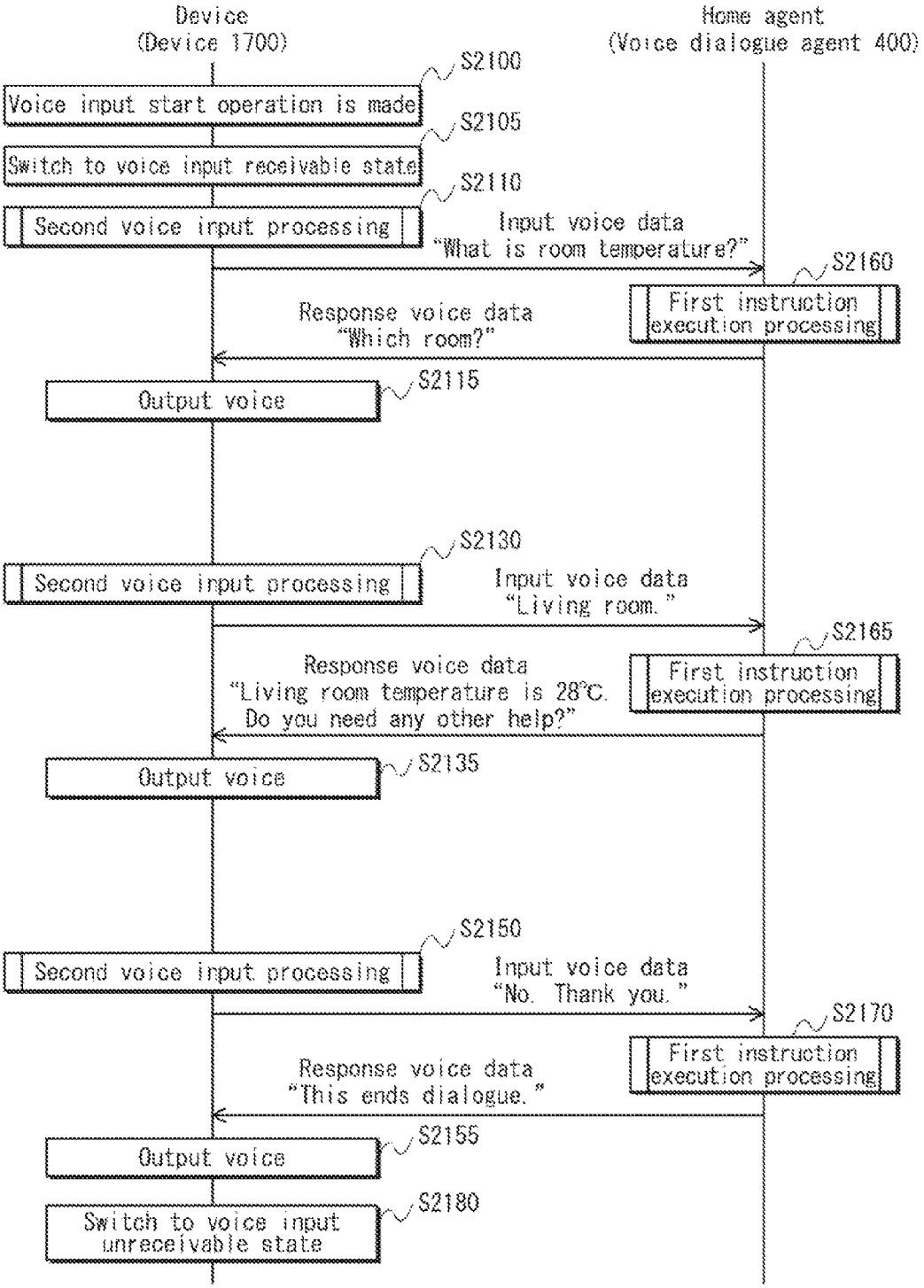
FIG. 21 is a procedure diagram schematically showing a situation in which a dialogue with a dialogue agent is performed.

FIG. 21 is a procedure diagram schematically showing a situation in which the user of the second modified voice dialogue system performs a voice dialogue with the voice dialogue agent 400 with use of the device 1700 (here, assumed to be a smartphone), and the voice dialogue agent 400 performs processing that reflects the dialogue.

Here, the explanation is given based on the assumption that a dialogue end voice is a voice "This ends dialogue.".

In the figure, processing in Step S2100, processing in Step S2105, processing in Step S2115, processing in Step S2135, processing in Step S2155, and processing in Steps S2160-S2170 are respectively the same as the processing in Step S1000, the processing in Step S1005, the processing in Step S1015, the processing in Step S1035, the processing in Step S1055, and the processing in Steps S1060-S1070 in the specific examples in Embodiment 1 (see FIG. 10). Accordingly, the processing in the figure is regarded as having been already explained.

After the end of the processing in Step S2105, the device 1700 performs second voice input processing (Step S2110, corresponding to Step S1930 in FIG. 19).

In the second voice input processing, in the case where the user inputs a voice "What is room temperature?", the device 1700 transmits input voice data "What is room temperature?" to the voice dialogue agent 400 (corresponding to Step S2040 in FIG. 20).

After the end of the processing in Step S2115, since the voice "Which room?" is not a dialogue end voice (corresponding to Step S1985: No in FIG. 19), the device 1700 performs second voice input processing (Step S2130, corresponding to Step S1930 in FIG. 19).

In the second voice input processing, in the case where the user inputs a voice "Living room.", the device 1700 transmits input voice data "Living room." to the voice dialogue agent 400 (corresponding to Step S2040 in FIG. 20).

After the end of the processing in Step S2135, since the voice "Living room temperature is 28 degrees C. Do you need any other help?" is not a dialogue end voice (corresponding to Step S1985: No in FIG. 19), the device 1700 performs second voice input processing (Step S2150, corresponding to Step S1930 in FIG. 19).

In the second voice input processing, in the case where the user inputs a voice "No. Thank you.", the device 1700 transmits input voice data "No. Thank you." to the voice dialogue agent 400 (corresponding to Step S2040 in FIG. 20).

After the end of the processing in Step S2135, since a voice "This ends dialogue." is a dialogue end voice (corresponding to Step S1585: Yes in FIG. 19), the state is switched to the voice input receivable state (corresponding to Step S1990 in FIG. 19). The device 1700 ends the third device processing.

<Consideration>

According to the second modified voice dialogue system having the above configuration, once voice input start operation is performed, the device 1700 keeps in the voice input receivable state for a period from performance of the voice input start operation to output of a dialogue end voice.

Accordingly, once the user performs a voice input start operation with respect to the device 1700, the user can newly input a voice without newly performing a voice input operation with respect to the device 1700 until a dialogue end voice is output.

According to the second modified voice dialogue system, as described above, a further reduced number of operations need to be performed by the user in accordance with a voice input, compared with the voice dialogue system 100 in Embodiment 1.

Embodiment 4

<Outline>

The following explains, as one aspect of the voice dialogue method relating to the present invention and one aspect of the device relating to the present invention, a third modified voice dialogue system that is partially modified from the second modified voice dialogue system in Embodiment 3.

The second modified voice dialogue system in Embodiment 3 has been explained as an example of the configuration in which once the device 1700 starts communication with a voice dialogue agent A, a voice dialogue agent as a communication party is limited to the voice dialogue agent A until a series of processing ends.

Compared with this, the third modified voice dialogue system in Embodiment 4 is an example of configuration in which in the case where a device starts communication with a voice dialogue agent A and a user of the third modified voice dialogue system inputs, with use of the device, a voice indicating that the user hopes to communicate with another voice dialogue agent B, a communication party of the device is changed from the voice dialogue agent A to the voice dialogue agent B.

The following explains the details of the third modified voice dialogue system, focusing on different points from the second modified voice dialogue system in Embodiment 3, with reference to the drawings.

<Configuration>

The third modified voice dialogue system is modified from the second voice dialogue system in Embodiment 3 so as to include a voice dialogue agent 2200 instead of the voice dialogue agent 400.

Similarly to the voice dialogue agent 400 in Embodiment 3, the voice dialogue agent 2200 is embodied by the voice dialogue agent server 110.

Software for embodying the voice dialogue agent 2200, which is executed by the voice dialogue agent server 110, is partially modified from the software for embodying the voice dialogue agent 400 in Embodiment 3. Accordingly, the voice dialogue agent 2200 is modified from the voice dialogue agent 400 in Embodiment 3 in terms of part of functions.

Figure 22:
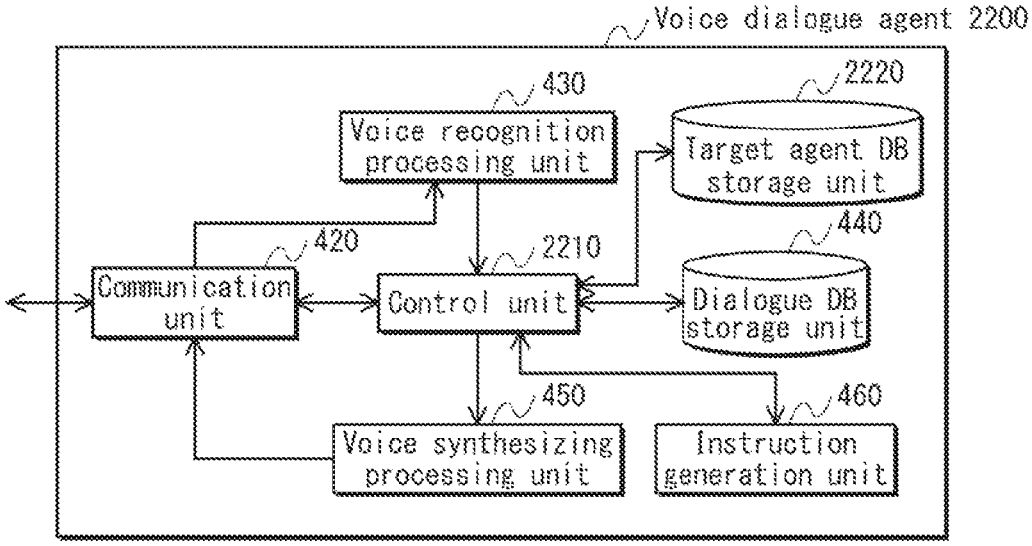
FIG. 22 is a block diagram showing functional configuration of a voice dialogue agent 2200.

FIG. 22 is a block diagram showing functional configuration of the voice dialogue agent 2200.

As shown in the figure, the voice dialogue agent 2200 is modified from the voice dialogue agent 400 in Embodiment 3 (see FIG. 4) so as to additionally include a target agent DB storage unit 2220 and include a control unit 2210 instead of the control unit 410.

The target agent DB storage unit 2220 is for example embodied by a memory and a processor that executes programs. The target agent DB storage unit 2220 is connected to the control unit 2210, and has a function of storing therein a target agent DB 2300.

Figures 23, 24:
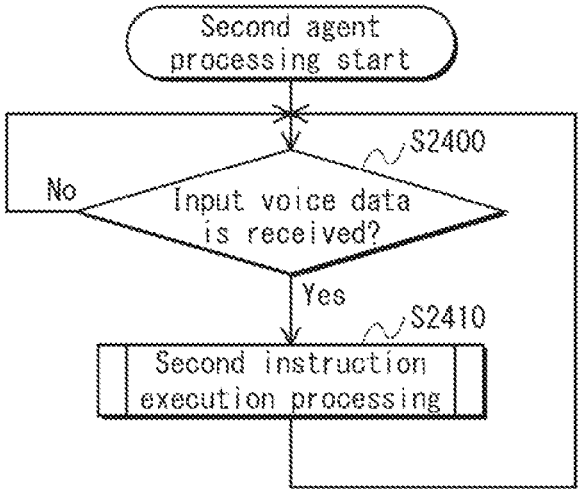
FIG. 23 is a data structure diagram showing a target agent DB 2300.
FIG. 24 is a flow chart of second agent processing.

FIG. 23 is a data structure diagram showing the target agent DB 2300 stored in the target agent DB storage unit 2220.

As shown in the figure, the target agent DB 2300 includes keyword 2310, target agent 2320, and IP address 2330 that are associated with each other.

The keyword 2310 indicates a character string that is assumed to be included in an input text converted by the voice recognition processing unit 430.

The target agent 2320 is information for specifying, as a communication party of the device 140, one of a plurality of voice dialogue agents 2200. Hereinafter, this one of the voice dialogue agents 2200 is referred to as an additional voice dialogue agent.

In this example, the additional voice dialogue agent specified by the target agent 2320 is a car agent, a retailer agent, or a home agent.

Here, the car agent indicates one of voice dialogue agents 2200 that provides a relatively satisfactory service relating to devices in mounted in a car. The retailer agent indicates one of voice dialogue agents 2200 that provides a relatively satisfactory service relating to devices in mounted in a retailer. The home agent indicates one of voice dialogue agents 2200 that provides a relatively satisfactory service relating to devices in mounted in a residence (home).

The IP address 2330 indicates an IP address in the network 120 relating to the voice dialogue agent server 110 that embodies an additional voice dialogue agent specified by the associated target agent 2320.

As shown in FIG. 23, each of the additional voice dialogue agents specified by the target agent 2320 is associated with one or more character strings indicated by the keyword 2310. For example, the car agent is associated with character strings indicated by the keyword 2310, such as character strings "in-car", "car", "vehicle", and "navigation system".

Since each of the additional voice dialogue agents, which is specified by the target agent 2320, is associated with one or more character strings, which are indicated by the keyword 2310, the voice dialogue agent 2200 can respond an ambiguous input.

For example, in the case where the user hopes to communicate with the car agent, the user sometimes inputs a voice "Connect to voice dialogue agent of navigation system.", and sometimes inputs a voice "Connect to voice dialogue agent of car.".

Here, the character strings indicated by the keyword 2310 "navigation system" and "car" are each associated with the car agent. Accordingly, both in the case where a voice "navigation system" is input and in the case where a voice "car" is input, it is possible to specify the car agent as the additional voice dialogue agent 2200, which is specified by the target agent 2320, by referring to the target agent DB 2300.

Referring back to FIG. 22, the explanation on the voice dialogue agent 2200 is continued.

The control unit 2210 is modified from the control unit 410 in Embodiment 3 so as to have a second agent processing execution function and a third agent processing execution function, which are described below, instead of the first agent processing execution function of the control unit 410.

The second agent processing execution function is a function performed by the control unit 2210 controlling the communication unit 420, the voice recognition processing unit 430, the voice synthesizing processing unit 450, and the instruction generation unit 460 to cause the voice dialogue agent 2200 to execute second agent processing as its characteristic operation to execute a sequence of processing described below. In the sequence of processing, (1) the voice dialogue agent 2200 receives input voice data transmitted from a device, (2) performs voice recognition processing on the received input voice data to generate an input text, and returns the generated input text to the device, (3) in the case where the generated input text indicates that the user hopes to communicate with another voice dialogue agent, establishes communication between the device and the other voice dialogue agent, (4) otherwise, generates an instruction set based on the generated input text, and executes the generated instruction set, (5) generates a response text based on an execution result of the instruction set, (6) converts the generated response text to response voice data, and (7) returns the response text and the response voice data to the device.

Note that the second agent processing is explained in detail in section <Second Agent Processing> later with reference to a flow chart.

The third agent processing execution function is a function performed by the control unit 2210 controlling the communication unit 420, the voice recognition processing unit 430, the voice synthesizing processing unit 450, and the instruction generation unit 460 to cause the voice dialogue agent 2200 to execute third agent processing as its characteristic operation to execute a sequence of processing described below. In the sequence of processing, (1) the voice dialogue agent 2200 starts communication with a device in response to a request from another voice dialogue agent, (2) receives input voice data transmitted from the device, (3) performs voice recognition processing on the received input voice data to generate an input text, and returns the generated input text, (4) generates an instruction set based on the generated input text, and executes the generated instruction set, (5) generates a response text based on an execution result of the instruction set, (6) converts the generated response text to response voice data, and (7) returns the response text and the response voice data to the device.

Note that the third agent processing is explained in detail in section <Third Agent Processing> later with reference to a flow chart.

The following explains the operation of the third modified voice dialogue system having the above configuration, with reference to the drawings.

<Operation>

The third modified voice dialogue system performs second agent processing and third agent processing as its characteristic operation, in addition to the first agent processing in Embodiment 1. The second agent processing and the third agent processing is partially modified from the first agent processing in Embodiment 3.

Explanation is given on the second agent processing and the third agent processing below, focusing on different points from the first agent processing.

<Second Agent Processing>

The second agent processing is processing performed by the voice dialogue agent 2200. In the second agent processing, (1) the voice dialogue agent 2200 receives input voice data transmitted from a device, (2) performs voice recognition processing on the received input voice data to generate an input text, and returns the generated input text to the device, (3) in the case where the generated input text indicates that the user hopes to communicate with another voice dialogue agent, establishes communication between the device and the other voice dialogue agent, (4) otherwise, generates an instruction set based on the generated input text, and executes the generated instruction set, (5) generates a response text based on an execution result of the instruction set, (6) converts the generated response text to response voice data, and (7) returns the response text and the response voice data to the device.

FIG. 24 is a flow chart of the second agent processing.

Upon bootup of the voice dialogue agent 2200, the second agent processing is started.

When the second agent processing is started, the voice dialogue agent 2200 stands by until the communication unit 420 receives input voice data transmitted from the device 1700 (Step S2400: Repetition of No). When the communication unit 420 receives the input voice data (Step S2400: Yes), the voice dialogue agent 2200 performs second instruction execution processing (Step S2410).

Figure 25:
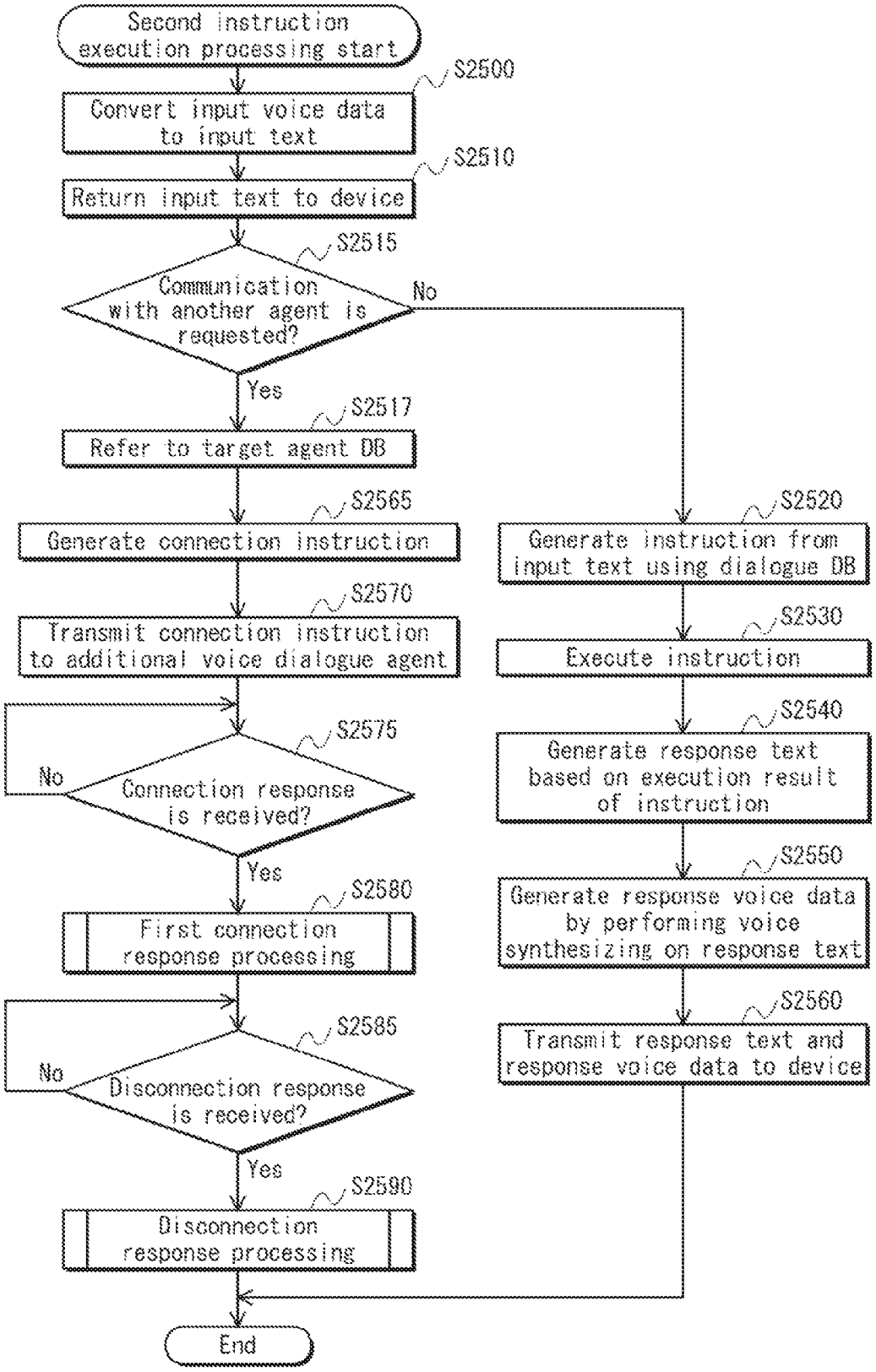
FIG. 25 is a flow chart of second instruction execution processing.

FIG. 25 is a flow chart of the second instruction execution processing.

In the figure, processing in Steps S2500-S2510 and processing in Steps S2520-S2560 is respectively the same as the processing in Steps S900-S910 and the processing in Steps S920-S960 in the first instruction execution processing in Embodiment 3 (see FIG. 9). Accordingly, the processing in the figure is regarded as having been already explained.

After the end of the processing in Step S2510, the control unit 2210 checks whether or not the input text, which is converted by the voice recognition processing unit 430, requests to communicate with another voice dialogue agent (Step S2515).

In the processing in Step S2515, in the case where the input text does not request communication with another voice dialogue agent (Step S2515: No), the voice dialogue agent 2200 proceeds to the processing in Step S2520 to perform the processing in Steps S2520-S2560.

In the processing in Step S2515, in the case where the input text requests to communicate with another voice dialogue agent (Step S2515: Yes), the control unit 2210 specifies a voice dialogue agent 2200 that is requested as a communication party, with reference to the target agent DB 2300 stored in the target agent DB storage unit 2220 (Step S2517). In other words, the control unit 2210 specifies, as the voice dialogue agent 2200 requested as a communication party, an additional voice dialogue agent that is specified by the target agent 2320 associated with a character string that is indicated by the keyword 2310 included in the input text, which is converted by the voice recognition processing unit 430.

After the specification of the additional voice dialogue agent requested as a communication party, the control unit 2210 generates a predetermined signal indicating to start communication between the specified additional voice dialogue agent and the device 1700 which has transmitted the input voice data (Step S2565). Hereinafter, this signal is referred to as a connection instruction.

After the generation of the connection instruction, the control unit 2210 controls the communication unit 420 to transmit the generated connection instruction to the additional voice dialogue agent, with use of an IP address indicated by the IP address 2330 which is associated with the character string indicate by the keyword 2310 (Step S2570).

Then, the control unit 2210 stands by until the communication unit 420 receives a connection response (described later) that is returned from the additional voice dialogue agent in response to the connection instruction that is transmitted in the processing in Step S2570 (Step S2575: Repetition of No).

When the connection response is received by the communication unit 420 (Step S2575: Yes), the voice dialogue agent 2200 executes first connection response processing (Step S2580).

Figure 26:
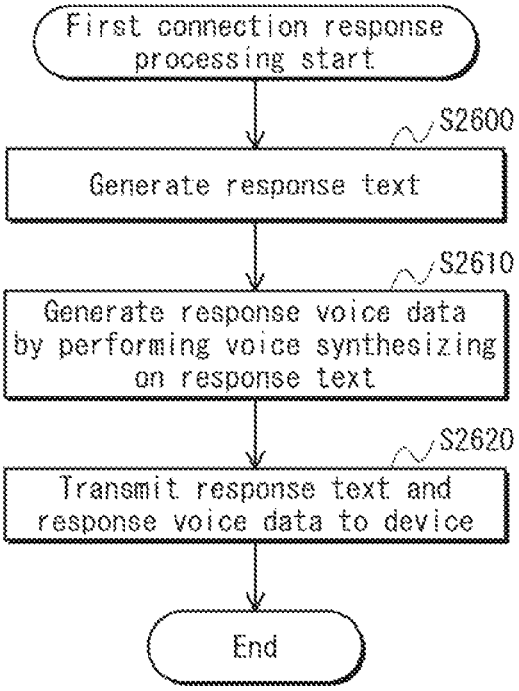
FIG. 26 is a flow chart of first connection response processing.

FIG. 26 is a flow chart of the first connection response processing.

When the first connection response processing is started, the control unit 2210 generates a predetermined response text indicating that communication becomes available between the additional voice dialogue agent and the device 1700 (Step S2600). The predetermined response text is for example a character string "Connection to [Additional voice dialogue agent] has been established.".

Here, in part [Additional voice dialogue agent] in the character string, a name of the voice dialogue agent 2200 (here, either of the car agent, the retailer agent, or the home agent), which is specified by the target agent 2320 included in the target agent DB 2300, is inserted.

After the generation of the response text, the voice synthesizing processing unit 450 performs voice synthesizing processing on the generated response text to generate response voice data (Step S2610).

After the generation of the response voice data, the control unit 2210 controls the communication unit 420 to transmit the generated response text and response voice data to the device 1700 which has transmitted the input voice data (Step S2620).

After the end of the processing in Step S2620, the voice dialogue agent 2200 ends the first connection response processing.

Referring back to FIG. 25, the explanation on the second instruction execution processing is continued.

After the end of the first connection response processing, the voice dialogue agent 2200 stands by until the communication unit 420 receives a disconnection response (described later) that is transmitted from the additional voice dialogue agent (Step S2585: Repetition of No).

When the communication unit 420 receives the disconnection response (Step S2585: Yes), the voice dialogue agent 2200 executes disconnection response processing (Step S2590).

Figure 27:
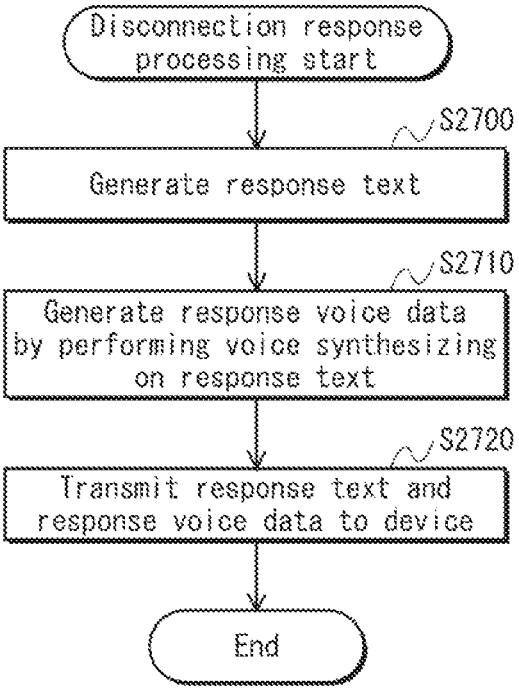

FIG. 27 is a flow chart of the disconnection response processing.

When the disconnection response processing is started, the control unit 2210 generates a predetermined response text indicating that the communication ends between the additional voice dialogue agent and the device 1700 (Step S2700). The predetermined response text is for example a character string "Connection to [Additional voice dialogue agent] has been terminated. Do you need any other help?".

Here, in part [Additional voice dialogue agent] in the character string, a name of the voice dialogue agent 2200 (here, either of the car agent, the retailer agent, or the home agent), which is specified by the target agent 2320 included in the target agent DB 2300, is inserted.

After the generation of the response text, the voice synthesizing processing unit 450 performs voice synthesizing processing on the generated response text to generate response voice data (Step S2710).

After the generation of the response voice data, the control unit 2210 controls the communication unit 420 to transmit the generated response text and response voice data to the device 1700 which has transmitted the input voice data (Step S2720).

After the end of the processing in Step S2720, the voice dialogue agent 2200 ends the disconnection response processing.

Referring back to FIG. 25 again, the explanation on the second instruction execution processing is continued.

After the end of the disconnection response processing, or after the end of the processing in Step S2560, the voice dialogue agent 2200 ends the second instruction execution processing.

Referring back to FIG. 24, the explanation on the second agent processing is continued.

After the end of the second instruction execution processing, the voice dialogue agent 2200 returns to the processing in Step S2400 to perform the processing in Step S2400 and the subsequent steps.

<Third Agent Processing>

The third agent processing is processing performed by the voice dialogue agent 2200. In the third agent processing, (1) the voice dialogue agent 2200 starts communication with a device in response to a request from another voice dialogue agent, (2) receives input voice data transmitted from the device, (3) performs voice recognition processing on the received input voice data to generate an input text, and returns the generated input text, (4) generates an instruction set based on the generated input text, and executes the generated instruction set, (5) generates a response text based on an execution result of the instruction set, (6) converts the generated response text to response voice data, and (7) returns the response text and the response voice data to the device.

FIG. 28 is a flow chart of the third agent processing.

In the figure, processing in Steps S2800-S2810 and processing in Steps S2820-S2860 is respectively the same as the processing in Steps S900-S910 and the processing in Steps S920-S960 in the first instruction execution processing in Embodiment 1 (see FIG. 9). Accordingly, the processing in the figure is regarded as having been already explained.

Upon bootup of the voice dialogue agent 2200, the third agent processing is started.

When the third agent processing is started, the voice dialogue agent 2200 stands by until the communication unit 420 receives a connection instruction transmitted from another voice dialogue agent (Step S2811: Repetition of No). When the communication unit 420 receives the connection instruction (Step S2811: Yes), the control unit 2210 controls the communication unit 420 to execute connection processing of starting communication with the device 1700 that is a communication party requested by the connection instruction.

Here, the connection processing includes processing of changing a transmission destination of input voice data to be transmitted from the device 1700 from the voice dialogue agent 2200, which has transmitted the connection instruction, to the voice dialogue agent 2200, which has received the connection instruction.

After the execution of the connection processing, the control unit 2210 controls the communication unit 420 to generate a connection response that is a signal indicating that communication with the device 1700 has started, and transmits the generated connection response to the voice dialogue agent which has transmitted the connection instruction (Step S2813).

Then, the control unit 2210 stands by until the communication unit 420 receives the input voice data transmitted from the device 1700 (Step S2814: Repetition of No). When the communication unit 420 receives the input voice data (Step S2814: Yes), the control unit 2210 performs the processing in Steps S2800-S2810.

After the end of the processing in Step S2810, the control unit 2210 checks whether or not the input text, which is converted by the voice recognition processing unit 430, requests to terminate communication with the voice dialogue agent 2200 (Step S2815).

In the processing in Step S2815, in the case where the input text does not indicate to terminate the communication with the voice dialogue agent 2200 (Step S2815: No), the voice dialogue agent 2200 proceeds to the processing in Step S2820 to perform the processing in Steps S2820-S2860. After the end of the processing in Step S2860, the voice dialogue agent 2200 returns to the processing in Step S2814 to perform the processing in Step S2814 and the subsequent steps.

In the processing in Step S2815, in the case where the input text indicates to terminate the communication with the voice dialogue agent 2200 (Step S2815: Yes), the control unit 2210 controls the communication unit 420 to execute disconnection processing of terminating the communication with the device 1700.

Here, the disconnection processing includes processing of changing the transmission destination of input voice data to be transmitted from the device 1700 from the voice dialogue agent 2200, which has received the connection instruction, to the voice dialogue agent 2200, which has transmitted the connection instruction.

After the execution of the disconnection processing, the control unit 2210 controls the communication unit 420 to generate a disconnection response that is a predetermined signal indicating that the communication with the device 1700 has been terminated, and transmits the generated disconnection response to the voice dialogue agent which has transmitted the connection instruction (Step S2890).

After the end of the processing in Step S2890, the voice dialogue agent 2200 returns to the processing in Step S2811 to perform the processing in Step S2811 and the subsequent steps.

The following explains a specific example of the operation performed by the third modified voice dialogue system having the above configuration, with reference to the drawing.

<Specific Example>

FIG. 29 is a procedure diagram schematically showing a situation in which the user of the third modified voice dialogue system starts, with use of the device 1700, a voice dialogue with a home agent, which is one of the voice dialogue agents 2200, and then starts communication with the car agent, which is one of the voice dialogue agents 2200, in response to a connection instruction generated by the home agent, and performs a dialogue with the car agent.

Here, the explanation is given based on the assumption that a specific voice dialogue agent server for the device 1700 used by the user is the voice dialogue agent server 110 that embodies the home agent, and a dialogue end voice is a voice "This ends dialogue.".

In the figure, processing in Steps S2900-S2905 is respectively the same as the processing in Steps S2100-S2105 in the specific example in Embodiment 3 (see FIG. 21). Accordingly, the processing in the figure is regarded as having been already explained.

After the end of the processing in Step S2905, the device 1700 performs second voice input processing (Step S2906, corresponding to Step S1930 in FIG. 19).

In the second voice input processing, in the case where the user inputs a voice "Connect to car agent.", the device 1700 transmits input voice data "Connect to car agent." to the home agent (corresponding to Step S2040 in FIG. 20).

Then, the home agent receives the input voice data (corresponding to Step S2400: Yes in FIG. 24), and performs second instruction execution processing (corresponding to Step S2410 in FIG. 24).

In the second instruction execution processing, since the input text requests to communicate with the car agent (corresponding to Step S2515: Yes in FIG. 25), the home agent transmits a connection instruction to the car agent (corresponding to Step S2570 in FIG. 25).

Then, the car agent receives the connection instruction (corresponding to Step S2811: Yes in FIG. 28), and starts communication with the device 1700 (corresponding to Step S2812 in FIG. 28), and transmits a connection response to the home agent (Step S2990, corresponding to Step S2813 in FIG. 28).

The home agent receives the connection response (corresponding to Step S2575: Yes in FIG. 25), and performs first connection response processing (Step S2965, corresponding to Step S2580 in FIG. 25).

Here, in the first connection response processing, in the case where the voice dialogue agent 2200 generates response voice data "Connection to car agent has been established.", the voice dialogue agent 2200 transmits response voice data "Connection to car agent has been established." to the device 1700 (corresponding to Step S2620 in FIG. 26).

Then, the device 1700 receives the response voice data (corresponding to Step S1960: Yes in FIG. 19), and outputs a voice "Connection to car agent has been established." (Step S2907, corresponding to Step S1980 in FIG. 19).

Since the voice "Connection to car agent has been established." is not a dialogue end voice (corresponding to Step S1985: No in FIG. 19), the device 1700 performs second voice input processing (Step S2910, corresponding to Step S1930 in FIG. 19).

In the second voice input processing, in the case where the user inputs a voice "What is temperature in car?", the device 1700 transmits input voice data "What is temperature in car?" to the car agent (corresponding to Step S2040 in FIG. 20).

Then, the car agent receives the input voice data (corresponding to Step S2814: Yes in FIG. 28). Since the input voice data does not request to terminate the communication (corresponding to Step S2815: No in FIG. 28), the car agent generates an instruction set corresponding to the input voice data, and executes the generated instruction set (Step S2994, corresponding to Step S2830 in FIG. 28).

Here, in execution of the instruction set, in the case where the car agent generates response voice data "Temperature in car is 38 degrees C. Do you need any other help?", the car agent transmits the response voice data "Temperature in car is 38 degrees C. Do you need any other help?" to the device 1700 (corresponding to Step S2860: Yes in FIG. 28).

Then, the device 1700 receives the response voice data (corresponding to Step S1960: Yes in FIG. 19), and outputs a voice "Temperature in car is 38 degrees C. Do you need any other help?" (Step S2915, corresponding to Step S1980 in FIG. 19).

Since the voice "Temperature in car is 38 degrees C. Do you need any other help?" is not a dialogue end voice (corresponding to Step S1985: No in FIG. 19), the device 1700 performs second voice input processing (Step S2930, corresponding to Step S1930 in FIG. 19).

In the second voice input processing, in the case where the user inputs a voice "No. Thank you.", the device 1700 transmits input voice data "No. Thank you." to the car agent (corresponding to Step S2040 in FIG. 20).

Then, the car agent receives the input voice data (corresponding to Step S2814: Yes in FIG. 28). Since the input voice data requests to terminate the communication (corresponding to Step S2815: Yes in FIG. 28), the car agent terminates the communication with the device 1700 (corresponding to Step S2870 in FIG. 28), and transmits a disconnection response to the home agent (Step S2998, corresponding to Step S2890 in FIG. 28).

Then, the home agent receives the disconnection response (corresponding to Step S2585: Yes in FIG. 25), and performs disconnection response processing (Step S2970, corresponding to Step S2890 in FIG. 25).

Here, in the disconnection processing, in the case where the voice dialogue agent 2200 generates response voice data "Connection to car agent has been terminated. Do you need any other help?", the voice dialogue agent 2200 transmits the response voice data "Connection to car agent has been terminated. Do you need any other help?" to the device 1700 (corresponding to Step S2720 in FIG. 27).

Then, the device 1700 receives the response voice data (corresponding to Step S1960: Yes in FIG. 19), and outputs a voice "Connection to car agent has been terminated. Do you need any other help?" (Step S2935, corresponding to Step S1980 in FIG. 19).

Since the voice "Connection to car agent has been terminated. Do you need any other help?" is not a dialogue end voice (corresponding to Step S1985: No in FIG. 19), the device 1700 performs second voice input processing (Step S2950, corresponding to Step S1930 in FIG. 19).

In the second voice input processing, in the case where the user inputs a voice "No. Thank you.", the device 1700 transmits input voice data "No. Thank you." to the home agent (corresponding to Step S2040 in FIG. 20).

Then, the home agent receives the input voice data (corresponding to Step S2800: Yes in FIG. 24), and performs second instruction execution processing (Step S2975, corresponding to Step S2410 in FIG. 24).

Here, in the second instruction execution processing, in the case where the home agent generates response voice data "This ends dialogue.", the home agent transmits the response voice data "This ends dialogue." to the device 1700 (corresponding to Step S2560 in FIG. 25).

Then, the device 1700 receives the response voice data (corresponding to Step S1960: Yes in FIG. 19), and outputs a voice "This ends dialogue." (Step S2955, corresponding to Step S1980 in FIG. 19).

Since the voice "This ends dialogue." is a dialogue end voice (corresponding to Step S1585: Yes in FIG. 19), the state is switched to the voice input receivable state (corresponding to Step S1990 in FIG. 19). The device 1700 ends the third device processing.

<Consideration>

According to the third modified voice dialogue system having the above configuration, in the case where the user of the third modified voice dialogue system, who is communicating with the voice dialogue agent A, hopes to cause the voice dialogue agent B rather than the voice dialogue agent A to perform processing, it is possible to change the voice dialogue agent that is appropriate for performing the processing via communication from the voice dialogue agent A to the voice dialogue agent B to cause the voice dialogue agent B to perform desired processing.

Also, in this case, since the voice dialogue agent A transfers input voice data that is not modified to the voice dialogue agent B, the voice dialogue agent B performs voice recognition processing on the input voice data. As a result, the user can receive a more appropriate service from the voice dialogue agent B.

Embodiment 5

<Outline>

The following explains, as one aspect of the voice dialogue method relating to the present invention and one aspect of the device relating to the present invention, a fourth modified voice dialogue system that is partially modified from the third modified voice dialogue system in Embodiment 4.

The third modified voice dialogue system in Embodiment 4 has been explained as an example of the configuration in which in the case where a device starts communication with the voice dialogue agent A and the user of the third modified voice dialogue system inputs, with use of the device, a voice indicating that the user hopes to communicate with another voice dialogue agent B, a communication party of the device is changed from the voice dialogue agent A to the voice dialogue agent B.

Compared with this, the fourth modified voice dialogue system in Embodiment 5 is an example of configuration in which in the case where a device starts communication with a voice dialogue agent A and predetermined condition is satisfied for the communication, the voice dialogue agent A determines that the voice dialogue agent B rather than the voice dialogue agent A is appropriate as a communication party, and a communication party of the device is changed from the voice dialogue agent A to the voice dialogue agent B.

The following explains the details of the fourth modified voice dialogue system, focusing on different points from the third modified voice dialogue system in Embodiment 4, with reference to the drawings.

<Configuration>

The fourth modified voice dialogue system is modified from the third voice dialogue system in Embodiment 4 so as to include a voice dialogue agent 3000 instead of the voice dialogue agent 2200.

Similarly to the voice dialogue agent 2200 in Embodiment 4, the voice dialogue agent 3000 is embodied by the voice dialogue agent server 110.

Software for embodying the voice dialogue agent 3000, which is executed by the voice dialogue agent server 110, is partially modified from the software for embodying the voice dialogue agent 2200 in Embodiment 3. Accordingly, the voice dialogue agent 3000 is modified from the voice dialogue agent 2200 in Embodiment 4 in terms of part of functions.

FIG. 30 is a block diagram showing functional configuration of the voice dialogue agent 3000.

As shown in the figure, the voice dialogue agent 3000 is modified from the voice dialogue agent 2200 in Embodiment 4 (see FIG. 22) so as not to include the target agent DB storage unit 2220, and so as to additionally include an available service DB storage unit 3020 and include a control unit 3010 instead of the control unit 2210.

The available service DB storage unit 3020 is for example embodied by a memory and a processor that executes programs. The available service DB storage unit 3020 is connected to the control unit 3010, and has a function of storing therein an available service DB 3100.

FIG. 31 is a data structure diagram showing the available service DB 3100 stored in the available service DB storage unit 3020.

As shown in the figure, the available service DB 3100 includes keyword 3110, target agent 3120, processing details 3130, IP address 3140, and availability 3150 that are associated with each other.

The keyword 3110 indicates a character string that is assumed to be included in an input text converted by the voice recognition processing unit 430.

The target agent 3120 is information for specifying an additional voice dialogue agent as a communication party of the device 1700.

In this example, the additional voice dialogue agents specified by the target agent 2320 include the car agent, the retailer agent, and the home agent, similarly to Embodiment 4.

The processing details 3130 are information for specifying, in the case where a character string indicated by the associated keyword 3110 is included in an input text that is converted by the voice recognition processing unit 430, processing that is determined to be executed by a device that is specified by the associated target device 3120.

The IP address 3140 indicates an IP address in the network 120 relating to the voice dialogue agent server 110 that embodies the additional voice dialogue agent specified by the associated target agent 3120.

The availability 3150 is information for specifying whether or not the voice dialogue agent can perform processing specified by the associated processing details 3130.

Referring back to FIG. 30, the explanation on the voice dialogue agent 3000 is continued.

The control unit 3010 is modified from the control unit 2210 in Embodiment 4 so as to have a fourth agent processing execution function, which is described below, instead of the second agent processing execution function of the control unit 2210.

The fourth agent processing execution function is a function performed by the control unit 3010 controlling the communication unit 420, the voice recognition processing unit 430, the voice synthesizing processing unit 450, and the instruction generation unit 460 to control the voice dialogue agent 3000 to execute the fourth agent processing, which is its characteristic operation, to execute a sequence of processing described below. In the sequence of processing, (1) the voice dialogue agent 3000 receives input voice data transmitted from a device, (2) performs voice recognition processing on the received input voice data to generate an input text, and returns the generated input text to the device, (3) in the case where the generated input text includes a predetermined keyword, establishes communication between the device and a target agent associated with the predetermined keyword, (4) otherwise, generates an instruction set based on the generated input text, and executes the generated instruction set, (5) generates a response text based on an execution result of the instruction set, (6) converts the generated response text to response voice data, and (7) returns the response text and the response voice data to the device.

Note that the fourth agent processing is explained in detail in section <Fourth Agent Processing> later with reference to a flow chart.

The following explains the operation of the fourth modified voice dialogue system having the above configuration, with reference to the drawings.

<Operation>

The fourth modified voice dialogue system performs fourth agent processing as its characteristic operation, in addition to the second device processing and the third agent processing in Embodiment 4. The fourth agent processing is partially modified from the second agent processing in Embodiment 3.

Explanation is given on the fourth agent processing below, focusing on different points from the second agent processing.

<Fourth Agent Processing>

The fourth agent processing is processing performed by the voice dialogue agent 3000. In the fourth agent processing, (1) the voice dialogue agent 3000 receives input voice data transmitted from a device, (2) performs voice recognition processing on the received input voice data to generate an input text, and returns the generated input text to the device, (3) in the case where the generated input text includes a predetermined keyword, establishes communication between the device and a target agent associated with the predetermined keyword, (4) otherwise, generates an instruction set based on the generated input text, and executes the generated instruction set, (5) generates a response text based on an execution result of the instruction set, (6) converts the generated response text to response voice data, and (7) returns the response text and the response voice data to the device.

FIG. 32 is a flow chart of the fourth agent processing.

Upon bootup of the voice dialogue agent 3000, the fourth agent processing is started.

When the fourth agent processing is started, the voice dialogue agent 3000 stands by until the communication unit 420 receives input voice data transmitted from the device 1700 (Step S3200: Repetition of No). When the communication unit 430 receives the input voice data (Step S3200: Yes), the voice dialogue agent 3000 performs second instruction execution processing (Step S3210).

FIG. 33 is a flow chart of the third instruction execution processing.

In the figure, processing in Steps S3300-S3310, processing in Steps S3320-S3360, processing in Steps S3365-S3375, and processing in Steps S3385-S3390 are respectively the same as the processing in Steps S2500-S2510, the processing in Steps S2520-S2560, the processing in Steps S2565-S2575, and the processing in Steps S2585-S2590 in Embodiment 4. Accordingly, the processing in the figure is regarded as having been already explained.

After the end of the processing in Step S3310, the control unit 3010 refers to the available service DB 3100 stored in the available service DB storage unit 3020 (Step S3312) to determine whether or not another voice dialogue agent is appropriate for performing processing corresponding to the input text data (Step S3315). In other words, in the case where the input text data includes a character string indicated by the keyword 3110 and an additional voice dialogue agent specified by the target agent 3120 associated with the keyword 3110 is not the voice dialogue agent 3000 which is currently performing the third instruction execution processing, the control unit 3010 determines that the other voice dialogue agent (another additional voice dialogue agent specified by the target agent 3120) is appropriate for performing the processing. Otherwise, the control unit 3010 determines that the other voice dialogue agent is not appropriate for performing the processing.

In the processing in Step S3315, in the case where the control unit 3010 determines that the other voice dialogue agent is not appropriate for performing the processing (Step S3315: No), the voice dialogue agent 3000 proceeds to the processing in Step S3320 to perform the processing in Steps S3320-S3360.

In the processing in Step S3315, in the case where the control unit 3010 determines that the other voice dialogue agent is appropriate for performing the processing (Step S3315: Yes), the voice dialogue agent 3000 proceeds to the processing in Step S3365 to perform the processing in Steps S3365-S3375.

In the processing in Step S3375, when the communication unit 420 receives the connection response returned from the additional voice dialogue agent (Step S3375: Yes), the voice dialogue agent 3000 performs second connection response processing (Step S3380).

FIG. 34 is a flow chart of the second connection response processing.

When the second connection response processing is started, the control unit 3010 controls the communication unit 420 to transfer the input voice data, which is received in the processing in Step S3200: Yes, to the additional voice dialogue agent, which is specified by the processing in Step S3315: Yes (Step S3400).

After the end of the processing in Step S3400, the voice dialogue agent 3000 ends the second connection response processing.

Referring back to FIG. 33, the explanation on the second instruction execution processing is continued.

After the end of the second connection response processing, the voice dialogue agent 3000 proceeds to Step S3385 to perform the processing in Steps S3385-S3390.

After the end of the processing in Step S3390, or after the end of the processing in Step S3360, the voice dialogue agent 3000 ends the third instruction execution processing.

Referring back to FIG. 32, the explanation on the fourth agent processing is continued.

After the end of the third instruction execution processing, the voice dialogue agent 3000 returns to the processing in Step S3200 to perform the processing in Step S3200 and the subsequent steps.

The following explains a specific example of the operation performed by the fourth modified voice dialogue system having the above configuration, with reference to the drawing.

<Specific Example>

FIG. 35 is a procedure diagram schematically showing a situation in which the user of the fourth modified voice dialogue system starts, with use of the device 1700, a voice dialogue with the home agent, which is one of the voice dialogue agents 3000, and then starts communication with the car agent in response to a connection instruction generated by the home agent, and performs a dialogue with the car agent.

Here, the explanation is given based on the assumption that a specific voice dialogue agent server for the device 1700 used by the user is the voice dialogue agent server 110 that embodies the home agent, and a dialogue end voice is a voice "This ends dialogue.".

In the figure, processing in Steps S3500-S3505 is respectively the same as the processing in Steps S2900-S2905 in the specific example in Embodiment 4 (see FIG. 29). Accordingly, the processing in the figure is regarded as having been already explained.

After the end of the processing in Step S3505, the device 1700 performs second voice input processing (Step S3506, corresponding to Step S1930 in FIG. 19).

In the second voice input processing, in the case where the user inputs a voice "What is temperature in car?", the device 1700 transmits input voice data "What is temperature in car?" to the home agent (corresponding to Step S2040 in FIG. 20).

Then, the home agent receives the input voice data (corresponding to Step S3200: Yes in FIG. 32), and performs third instruction execution processing (corresponding to Step S3210 in FIG. 32).

In the third instruction execution processing, since the input text includes keywords "temperature" and "in-car" and an additional voice dialogue agent specified by the target agent 3120 is not the home agent (corresponding to Step S3315: No in FIG. 33), the home agent transmits a connection instruction to the car agent (corresponding to Step S3370 in FIG. 33).

Then, the car agent receives the connection instruction (corresponding to Step S2811: Yes in FIG. 28), and starts communication with the device 1700 (corresponding to Step S2812 in FIG. 28), and transmits a connection response to the home agent (Step S3590, corresponding to Step S2813 in FIG. 28).

The home agent receives the connection response (corresponding to Step S3375: Yes in FIG. 33), and performs second connection response processing (corresponding to Step S3380 in FIG. 33).

In the second connection response processing, the home agent transmits input voice data "What is temperature in car?" to the car agent (corresponding to Step S3400 in FIG. 34).

Then, the car agent receives the input voice data (corresponding to Step S2814: Yes in FIG. 28). Since the input voice data does not request to terminate the communication (corresponding to Step S2815: No in FIG. 28), the car agent generates an instruction set corresponding to the input voice data, and executes the generated instruction set (Step S3594, corresponding to Step S2830 in FIG. 28).

Here, in execution of the instruction set, in the case where the car agent generates response voice data "Temperature in car is 38 degrees C. Do you need any other help?", the car agent transmits the response voice data "Temperature in car is 38 degrees C. Do you need any other help?" to the device 1700 (corresponding to Step S2860: Yes in FIG. 28).

Then, the device 1700 receives the response voice data (corresponding to Step S1960: Yes in FIG. 19), and outputs a voice "Temperature in car is 38 degrees C. Do you need any other help?" (Step S3507, corresponding to Step S1980 in FIG. 19).

Since the voice "Temperature in car is 38 degrees C. Do you need any other help?" is not a dialogue end voice (corresponding to Step S1985: No in FIG. 19), the device 1700 performs second voice input processing (Step S3510, corresponding to Step S1930 in FIG. 19).

In the second voice input processing, in the case where the user inputs a voice "Turn on air conditioner with 25 degrees C. of temperature setting.", the device 1700 transmits input voice data "Turn on air conditioner with 25 degrees C. of temperature setting." to the car agent (corresponding to Step S2040 in FIG. 20).

Then, the car agent receives the input voice data (corresponding to Step S2814: Yes in FIG. 28). Since the input voice data does not request to terminate the communication (corresponding to Step S2815: No in FIG. 28), the car agent generates an instruction set corresponding to the input voice data, and executes the generated instruction set (Step S3594, corresponding to Step S2830 in FIG. 28).

Here, in execution of the instruction set, in the case where the car agent generates response voice data "Air conditioner is turned on with 25 degrees C. of temperature setting. Do you need any other help?", the car agent transmits the response voice data "Air conditioner is turned on with 25 degrees C. of temperature setting. Do you need any other help?" to the device 1700 (corresponding to Step S2860 in FIG. 28).

Then, the device 1700 receives the response voice data (corresponding to Step S1960: Yes in FIG. 19), and outputs a voice "Air conditioner is turned on with 25 degrees C. of temperature setting. Do you need any other help?" (Step S3525, corresponding to Step S1980 in FIG. 19).

Since the voice "Air conditioner is turned on with 25 degrees C. of temperature setting. Do you need any other help?" is not a dialogue end voice (corresponding to Step S1985: No in FIG. 19), the device 1700 performs second voice input processing (Step S3530, corresponding to Step S1930 in FIG. 19).

In the second voice input processing, in the case where the user inputs a voice "No. Thank you.", the device 1700 transmits input voice data "No. Thank you." to the car agent (corresponding to Step S2040 in FIG. 20).

Then, the car agent receives the input voice data (corresponding to Step S2814: Yes in FIG. 28). Since the input voice data requests to terminate the communication (corresponding to Step S2815: Yes in FIG. 28), the car agent terminates the communication with the device 1700 (corresponding to Step S2870 in FIG. 28), and transmits a disconnection response to the home agent (Step S3598, corresponding to Step S2890 in FIG. 28).

Then, the home agent receives the disconnection response (corresponding to Step S2585: Yes in FIG. 25), and performs disconnection response processing (Step S2970, corresponding to Step S2890 in FIG. 25).

Here, in the disconnection processing, in the case where the voice dialogue agent 2200 generates response voice data "This ends dialogue.", the voice dialogue agent 2200 transmits the response voice data "This ends dialogue." to the device 1700 (corresponding to Step S2720 in FIG. 27).

Then, the device 1700 receives the response voice data (corresponding to Step S1960: Yes in FIG. 19), and outputs a voice "This ends dialogue." (Step S3555, corresponding to Step S1980 in FIG. 19).

Since the voice "This ends dialogue." is a dialogue end voice (corresponding to Step S1985: Yes in FIG. 19), the state is switched to the voice input receivable state (corresponding to Step S1990 in FIG. 19). The device 1700 ends the fourth device processing.

<Consideration>

According to the fourth modified voice dialogue system having the above configuration, in the case where the voice dialogue agent A determines that the voice dialogue agent B rather than the voice dialogue agent A is appropriate as a communication party of the user while the user of the fourth modified voice dialogue system communicates with the voice dialogue agent A, it is possible to change a voice dialogue agent as the communication party of the user from the voice dialogue agent A to the voice dialogue agent B.

With this configuration, even if the user does not know the type of service provided by each of the voice dialogue agents, the user can receive a service provided by a more appropriate voice dialogue agent.

Also, in this case, since the voice dialogue agent A transfers input voice data that is not modified to the voice dialogue agent B, the voice dialogue agent B performs voice recognition processing on the input voice data. As a result, the user can receive a more appropriate service from the voice dialogue agent B.

Embodiment 6

The following exemplifies an operation situation of the voice dialogue system 100 in Embodiment 1. Note that the voice dialogue system 100 in Embodiment 1 may be of course operated in an operation situation other than the operation situation exemplified here.

FIG. 36A is a diagram schematically showing an operation situation in which the voice dialogue system 100 in Embodiment 1 is operated.

In FIG. 36A, a group 3600 is for example a company, an organization, or a family, and its size is not limited. A plurality of devices 3601 (devices A and B and so on) and a home gateway 3602 are disposed in the group 3600. The devices 3601 include not only devices that are connectable to the Internet (for example, a smartphone, a PC, and a TV) but also devices that are disconnectable from the Internet by themselves (for example, an illumination lamp, a washing machine, a refrigerator). The devices 3601 may include devices that are disconnectable from the Internet by themselves but are connectable to the Internet via the home gateway 3602. Also, the group 3600 includes a user 10 who uses the devices 3601. For example, the devices which are disposed in the group 3600 each correspond to the device 140 in Embodiment 1.

A cloud server 3611 is disposed in a data center administration company 3610. The cloud server 3611 is a virtual server that cooperates with various devices through the Internet. The cloud server 3611 mainly manages big data that is difficult to deal with by a normal data base management tool or the like. The data center administration company 3610 performs management of data and the cloud server 3611, and administers a data center for performing such management. Services performed by the data center administration company 3610 are described in detail later. Here, the data center administration company 3610 is not limited to a company only performing data management, administration of the cloud server 3611, and so on. For example, a device manufacturer developing and manufacturing one type of the devices 3601 may serve as the data administration center 3610 when the device manufacturer also performs data management and administration of the cloud server 3611 (see FIG. 36B). Also, the data center administration company 3610 does not need to be a single company. For example, when a device manufacturer and another management company perform data management and administration of the cloud server 3611 together, then either one or both of the device manufacturer and the management company may serve as the data center administration company 3610 (see FIG. 36C). For example, the data center administration company 3610 provides the voice dialogue agent 400 that is associated with the device 140 (hereinafter, referred to also as a first voice dialogue agent).

A service provider 3620 has a server 3621. The server 3621 here for example includes a memory embedded in a PC for individual use, and its size is not limited. Also, there is a case where the service provider 3620 does not have the server 3621. For example, the service provider 3620 provides another voice dialogue agent 400 that is connected to the first voice dialogue agent (hereinafter, referred to also as a second voice dialogue agent).

Next, an explanation is given on a flow of information in the above operation situation.

First, the device A or B, which is disposed in the group 3600, transmits log information to the cloud server 3611, which is disposed in the data center administration company 3610. The cloud server 3611 accumulates the log information transmitted from the device A or B (arrow (a) in FIG. 36A). Here, the log information is information indicating a driving situation, an operation time and date, and so on of the devices 3601. The log information includes for example a viewing history of a TV, timer recording information of a recorder, a driving time and date and a laundry amount of a washing machine, and a time and date and the number of opening and closing a refrigerator. Without limiting to the information described above, the log information includes all information that is acquirable from all the devices 3601. There is a case where the log information is provided directly from the devices 3601 to the cloud server 3611 through the Internet. Alternatively, the log information may be provided from the home gateway 3602 to the cloud server 3611 after being accumulated from the devices 3601 to the home gateway 3602.

Next, the cloud server 3611, which is disposed in the data center administration company 3610, provides the accumulated log information to the service provider 3620 in certain units. Here, the log information may be provided in units according to which the data center administration company 3610 can organize the accumulated log information and provide the organized log information to the service provider 3620. Alternatively, the log information may be provided in units requested by the service provider 3620. Moreover, the log information may not be provided in certain units, and alternatively an amount of the log information to be provided sometimes varies in accordance with circumstances. The log information is stored as necessary in the server 3621 of the service provider 3620 (arrow (b) in FIG. 36A). Then, the service provider 3620 organizes the log information so as to be adapted to a service to be provided to a user, and provides the organized information to the user. The user to which the organized information to be is provided may be the user 10 who uses the devices 3601 or an external user 20. The service may be provided for example from the service provider 3620 directly to the user (arrow (e) in FIG. 36A). Alternatively, the service may be provided for example to the user again via the cloud server 3611 of the data center administration company 3610 (arrows (c) and (d) in FIG. 36A). Moreover, the cloud server 3611 of the data center administration company 3610 may organize the log information so as to be adapted to a service to be provided to the user, and provide the organized information to the service provider 3620.

Note that the user 10 and the user 20 may be different or the same.

The following exemplifies several types of service that can be provided in the above operation situation.

<Service Type 1: Local Data Center Type>

FIG. 37 is a diagram schematically showing service type 1 (local data center type service).

Here, the service provider 3620 acquires information from the group 3600, and provides a service to a user. In this type of service, the service provider 3620 has functions of a data center administration company. That is, the service provider 3620 includes a cloud server 3611 performing big data management. As such, there is no data center administration company.

In this type of service, the service provider 3620 administers and manages the data center (the cloud server 3611) (3703). Also, the service provider 3620 manages an OS (3702) and an application (3701). The service provider 3620 performs service provision (3704) with use of the OS (3702) and application (3701), which are managed by thereby.

<Service Type 2: IaaS Type>

FIG. 38 is a diagram schematically showing service type 2 (IaaS (Infrastructure as a Service) type). Here, IaaS is a model in which infrastructure for constructing and operating a computer system is provided as a cloud service through the Internet.

In this type of service, the data center administration company 3610 administers and manages the data center (the cloud server 3611) (3703). Further, the service provider 3620 manages the OS (3702) and the application (3701). The service provider 3620 performs service provision (3704) with use of the OS (3702) and the application (3701), which are managed thereby.

<Service Type 3: PaaS Type>

FIG. 39 is a diagram schematically showing service type 3 (PaaS (Platform as a Service) type). Here, PaaS is a model in which a platform for constructing and operating software is provided as a service through the Internet.

In this type of service, the data center administration company 3610 manages the OS (3702), and administers and manages the data center (the cloud server 3611) (3703). Further, the service provider 3620 manages the application (3701). The service provider 3620 performs service provision (3704) with use of the OS (3702), which is managed by the data center administration company 3610, and the application (3701), which is managed by the service provider 3620.

<Service Type 4: SaaS Type>

FIG. 40 is a diagram schematically showing service type 4 (SaaS (Software as a Service) type). In this model, for example, an application that is provided by a platform provider having a data center (a cloud server) is provided to a business or a person (a user) without having a data center (a cloud server) as a cloud service through a network such as the Internet.

In this type of service, the data center administration company 3610 manages the application (3701), manages the OS (3702), and administers and manages the data center (the cloud server 3611) (3703). Further, the service provider 3620 performs service provision (3704) with use of the application (3701) and the OS (3702), which are managed by the data center administration company 3610.

The main actor in service provision is the service provider 3620 in all of the above service types. Further, for example, the service provider 3620 or the data center administration company 3610 may develop their own OS, application, or big data database, or may outsource any of these to a third party.

<Supplement>

One aspect of the voice dialogue method relating to the present invention and one aspect of the device relating to the present invention have been explained by exemplifying the five voice dialogue systems in Embodiments 1 to 5 and the operation situation of the voice dialogue system in Embodiment 6. However, the voice dialogue method and the device relating to the present invention are not of course limited to the voice dialogue method and the device as used in the voice dialogue system and the operation situation which are exemplified in Embodiments 1 to 6.

(1) In Embodiment 1, the voice dialogue system 100 has been explained to include the voice dialogue agent server 110, the network 120, the gateway 130, and the device 140 as shown in FIG. 1. A voice dialogue system as another example may include a mediation server 4150 in addition to the voice dialogue agent server 110, the network 120, the gateway 130, and the device 140. The mediation server 4150 has a function of storing therein the target agent DB 2300, associating between the voice dialogue agents, switching a connection destination, and so on.

FIG. 41 is a system configuration diagram showing configuration of a voice dialogue system 4100 that includes the mediation server 4150.

FIG. 42 is a block diagram showing functional configuration of the mediation server 4150.

As shown in the figure, the mediation server 4150 includes a communication unit 4220, a control unit 4210, and a target agent DB storage unit 4230.

Here, the target agent DB storage unit 4230 has a function of storing therein the target agent DB 2300, similarly to the target agent DB storage unit 2220 in Embodiment 4.

Also, a voice dialogue system as further another example may include a mediation server 4350 instead of the mediation server 4150. The mediation server 4350 has a function of storing therein the available service DB 3100, associating between the voice dialogue agents, switching a connection destination, and so on.

FIG. 43 is a block diagram showing functional configuration of the mediation server 4350.

As shown in the figure, the mediation server 4350 includes a communication unit 4320, a control unit 4310, and an available service DB storage unit 4330.

Here, the available service DB storage unit 4330 has a function of storing therein the available service DB 3100, similarly to the available service DB storage unit 3020 in Embodiment 5.

(2) In Embodiment 1, the image shown in FIG. 12 is exemplified as an image displayed on the display unit 270 included in the device 140.

Another examples of this image are shown in FIG. 44A to FIG. 44D, FIG. 45A, and FIG. 45B.

In the examples in FIG. 12, FIG. 44A to FIG. 44D, and FIG. 45B, displayed response texts each include, at the beginning thereof, a character string specifying a subject outputting a voice such as "You", "Car agent", "Home agent", or the like. Also, in the example in FIG. 45A, an icon (image) specifying a subject outputting a voice is displayed.

Figure 44A:
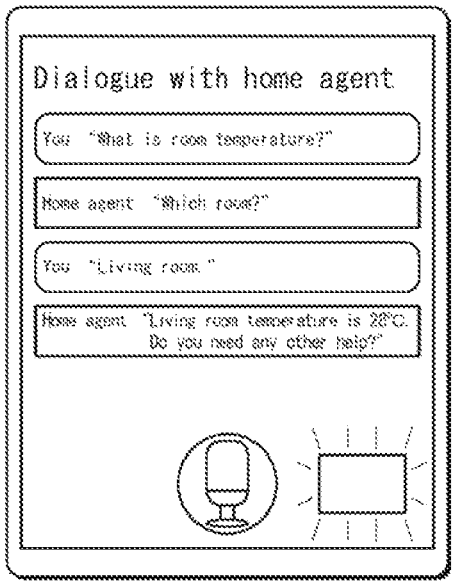
Figure 44B:
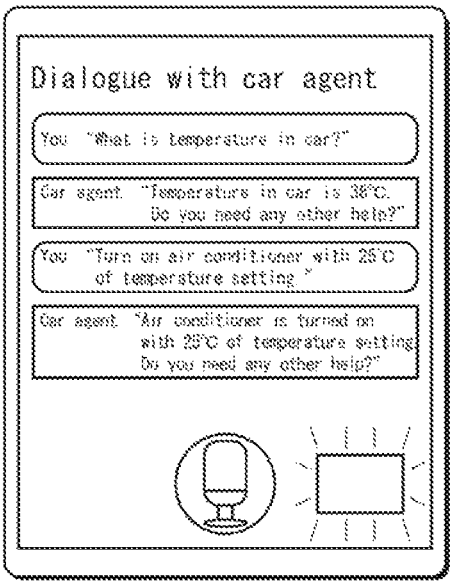
Figure 44C:
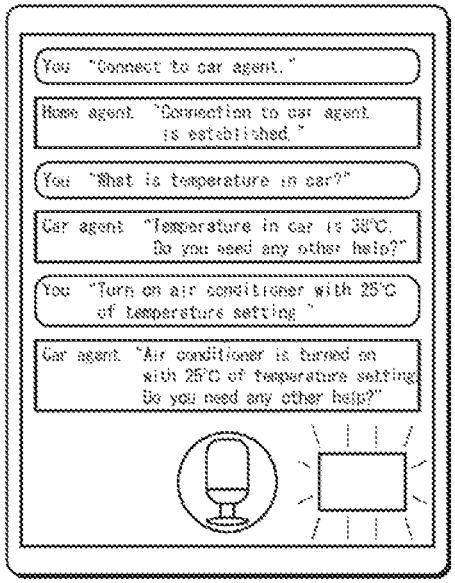

In the examples in FIG. 44A and FIG. 44B, a character string specifying a voice dialogue agent with which the user currently makes a dialogue is displayed on an upper part of the screen such that the user recognizes the voice dialogue agent with which the user currently makes a dialogue. Such a character strings displayed here are "Dialogue with home agent" and "Dialogue with car agent".

Figure 44D:
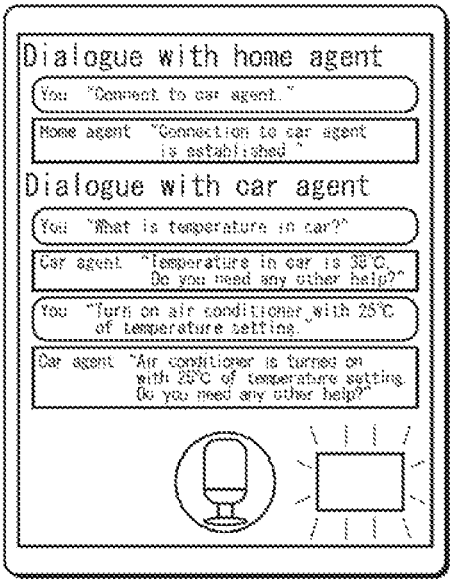

In the example in FIG. 44D, a character string specifying a voice dialogue agent with which the user currently makes a dialogue (or has made a dialogue in the past) is included in each of the displayed response texts, such that the user recognizes the voice dialogue agent with which the user currently makes a dialogue (or has made a dialogue in the past). Such a character strings displayed here are "Dialogue party is home agent" and "Dialogue party is car agent". Also, in the example in FIG. 45B, an icon (image) specifying a voice dialogue agent with which the user currently makes a dialogue (or has made a dialogue in the past) is displayed.

These display examples are just examples. Alternatively, a voice dialogue agent with which the user currently makes a dialogue may be indicated by color, shape of the screen, shape of part of the screen, or the like. Furthermore, each subject outputting a voice may be indicated by changing a background color, a wall paper, and the like on the display. In this way, it is only necessary to display a voice dialogue agent with which the user makes a dialogue or a subject outputting a voice so as to be recognizable by the user.

(3) In Embodiment 1 and the modifications, the example has been explained that a voice dialogue agent with which the user makes a dialogue or a subject outputting a voice is displayed so as to be visually recognizable by the user. However, the present invention is not necessarily limited to the example where a voice dialogue agent with which the user makes a dialogue or a subject outputting a voice is displayed so as to be visually recognizable by the user, as long as the voice dialogue agent with which the user makes a dialogue or the subject outputting a voice is recognizable by the user.

For example, a voice "Dialogue party is home agent" may be output, such that a voice dialogue agent with which the user makes a dialogue is recognizable by the user. Alternatively, a sound effect may be output, such that the voice dialogue agent with which the user makes a dialogue is recognizable by the user. Further alternatively, the voice dialogue agent with which the user makes a dialogue may be indicated by changing voice tone, speech rate, voice volume, or the like.

(4) In Embodiment 1, the explanation has been provided that the state is managed by the control unit 210 in the form as shown in the switching of the state shown in FIG. 3. Also, in Embodiment 2, the explanation has been provided that the state is managed by the control unit 1310 in the form as shown in the switching of the state shown in FIG. 14. Furthermore, in Embodiment 3, the explanation has been provided that the state is managed by the control unit 1710 in the form as shown in the switching of the state shown in FIG. 18.

Management of the state performed by the control unit is not limited to be in the above forms. Alternatively, other forms for managing the state may be employed. FIG. 46 to FIG. 50 each show an example of switching of the state managed by the control unit in other forms.

For example, according to management of the state in a form shown in switching of the state in FIG. 48, in the case where a voice output by the voice output unit 260 based on a response text transmitted from the voice dialogue agent 110 is a dialogue end voice, the state is switched to the voice input unreceivable state even if the predetermined period has not lapsed after the switching of the state to the voice input receivable state. Accordingly, in the case where a voice signal, which is generated by the voice dialogue agent 110 and received by the communication unit 250, indicates unnecessity of a new voice input, the voice input unit 220 is switched to the voice input unreceivable state even if the predetermined period has not lapsed after the switching to the voice input receivable state.

(5) In Embodiment 1, the display unit 270 has been explained, for example, as being embodied by a touchpanel, a touchpanel controller, and a processor that executes programs, and having the configuration of displaying that the display unit 270 is in the voice input receivable state by blinking the region 1120 that is positioned at the lower right in the display unit 270 (see FIG. 11A, FIG. 11C, FIG. 12, and so on). However, the configuration of the display unit 270 is not limited to the above configuration example as long as the user can recognize that the display unit 270 is in the voice input receivable state. Another configuration example may be employed in which the display unit 270 is embodied by an LED (Light Emitting Diode) and a processor that executes programs, and displays that the display unit 270 is in the voice input receivable state by lighting the LED. In the other configuration example, the display unit 270 does not display a response text received by the communication unit 250 because of not including means for displaying character strings.

(6) In Embodiment 1, the explanation has been provided that the communication unit 250 has the configuration in which in the case where a specific one of the voice dialogue agent servers 110 is not designated as a voice dialogue agent server 110 that is a communication party, the communication unit 250 communicates with a specific voice dialogue agent server with reference to an IP address stored in the address storage unit 240. Alternatively, another configuration example may be employed in which the address storage unit 240 does not store therein the IP address of the specific voice dialogue agent server, and the communication unit 250 communicates with a voice dialogue agent server designated by the user or a voice dialogue agent server that embodies the voice dialogue agent designated by the user.

(7) In Embodiment 1, the devices 140 each have been explained as communicating with the voice dialogue agent 110 via the gateway 130 and the network 120.

Alternatively, another configuration may be employed in which the devices 140 may each have a function of directly connecting with the network 120 without the gateway 130 and communicate with the voice dialogue agent without the gateway 130. In the case where all the devices 140 are directly connected to the network 120 without the gateway 130, the gateway 130 is not necessary.

(8) Part or all of the elements constituting the above embodiments and modifications may be configured from a single system LSI. The system LSI is a super multifunctional LSI that is manufactured by integrating a plurality of components on a single chip. Specifically, the system LSI is a computer system composed of a microprocessor, a ROM, a RAM, and so on. Functions of the system LSI are achieved by the microprocessor operating in accordance with a computer program that is stored in the ROM, the RAM, or the like.

(9) Part or all of the elements constituting the above embodiments and modifications may be composed of an IC (Integrated Circuit) card detachable from a device or a module. The IC card or the module is a computer system composed of a microprocessor, a ROM, a RAM, and so on. The IC card or the module may include the above super multifunctional LSI. Functions of the IC card or the module are achieved by the microprocessor operating in accordance with a computer program that is stored in the ROM, the RAM, or the like. The IC card or the module may be each tamper-resistant.

(10) The computer program or the digital signal which is used in the above embodiments and modifications may be recorded in a computer-readable recording medium such as a flexible disk, a hard disk, a CD-ROM, an MD, a DVD, a DVD-ROM, a DVD-RAM, a BD, a semiconductor memory, or the like.

Also, the computer program or the digital signal which is used in the above embodiments and modifications may be transmitted through an electric communication network, a wireless or wired communication network, a network such as the Internet, data broadcasting, or the like.

The computer program or the digital signal which is used in the above embodiments and modifications can be implemented in another computer system, by transmitting the computer program or the digital signal which is recorded in the recording medium to the other computer system, or by transmitting the computer program or the digital signal to the other computer system via the network.

(12) The above embodiments and modifications may be combined with each other.

(13) The following further explains configurations, modifications, and effects of the voice dialogue method and the device relating to one aspect of the present invention.

(a) One aspect of the present invention provides a voice dialogue method that is performed by a voice dialogue system, the voice dialogue system including: a voice signal generation unit; a voice dialogue agent unit; a voice output unit; and a voice input control unit, the voice dialogue method comprising: a step of, by the voice signal generation unit, receiving a voice input and generating a voice signal based on the received voice input; a step of, by the voice dialogue agent unit, performing voice recognition processing on the generated voice signal and performing processing based on a result of the voice recognition processing to generate a response signal; a step of, by the voice output unit, outputting a voice based on the generated response signal; and a step of, when the voice output unit outputs the voice, by the voice input control unit, keeping the voice signal generation unit in a receivable state for a predetermined period after output of the voice, the receivable state being a state in which a voice input is receivable.

According to the voice dialogue method relating to one aspect of the present invention, in the case where a voice generated by the voice dialogue agent unit is output, a user can input a voice without performing an operation with respect to the voice dialogue system. This reduces the number of times that the user needs to perform an operation in accordance with a voice that is dialogically input, compared with conventional techniques.

(b) Also, the voice dialogue system may further include a display unit, and the voice dialogue method may further comprise a step of, while the voice signal generation unit is in the receivable state, by the display unit, displaying that the voice signal generation unit is in the receivable state.

This configuration allows the user to visually recognize whether or not the voice signal generation unit is in the receivable state.

(c) Also, the voice dialogue system may further include an additional voice dialogue agent unit, and the voice dialogue method may further comprise: a step of, by the voice dialogue agent unit, determining, based on the result of the voice recognition processing, which one of the voice dialogue agent unit and the additional voice dialogue agent unit is appropriate for performing the processing based on the result of the voice recognition processing; a step of, when the voice dialogue agent unit determines that the voice dialogue agent unit is appropriate for performing the processing based on the result of the voice recognition processing, by the voice dialogue agent unit, performing the processing based on the result of the voice recognition processing; a step of, when the voice dialogue agent unit determines that the additional voice dialogue agent unit is appropriate for performing the processing based on the result of the voice recognition processing, by the additional voice dialogue agent unit, performing voice recognition processing on a voice received by the voice signal generation unit, performing processing based on a result of the voice recognition processing performed by the additional voice dialogue agent unit to generate a response signal; and a step of, by the voice output unit, outputting a voice based on the response signal generated by the additional voice dialogue agent unit.

According to this configuration, it is possible to cause the additional voice dialogue agent unit to perform processing that is appropriate for being performed by the additional voice dialogue agent unit rather than the voice dialogue agent unit.

(d) Also, the voice dialogue method may further comprise: a step of, when the voice dialogue agent unit determines that the voice dialogue agent unit is appropriate for performing the processing based on the result of the voice recognition processing, by the display unit, displaying that the voice dialogue agent unit is appropriate for performing the processing based on the result of the voice recognition processing; and a step of, when the voice dialogue agent unit determines that the additional voice dialogue agent unit is appropriate for performing the processing based on the result of the voice recognition processing, by the display unit, displaying that the additional voice dialogue agent unit is appropriate for performing the processing based on the result of the voice recognition processing.

This configuration allows the user to visually recognize which one of the voice dialogue agent unit and the additional voice dialogue agent unit is appropriate for performing the processing.

(e) Also, the voice dialogue method may further comprise a step of, when the voice dialogue agent unit determines that the additional voice dialogue agent unit is appropriate for performing the processing based on the result of the voice recognition processing, by the voice dialogue agent unit, transferring a voice signal generated by the voice signal generation unit to the additional voice dialogue agent unit, and by the additional voice dialogue agent unit, performing voice recognition processing on the transferred voice signal.

This configuration allows the additional voice dialogue agent unit to perform the voice recognition processing with use of the voice signal transferred from the voice dialogue agent unit.

(f) Also, the voice dialogue method may further comprise a step of, when the voice signal generation unit is in the receivable state and a response signal generated by the voice dialogue agent unit indicates that a new voice input does not need to be received, by the voice input control unit, switching the voice signal generation unit to an unreceivable state even during the predetermined period, the unreceivable state being a state in which a voice input is unreceivable.

According to this configuration, in the case where a voice input does not need to be received, it is possible to switch the voice signal generation unit to the unreceivable state even during the predetermined period.

(g) One aspect of the present invention provides a device comprising: a voice signal generation unit configured to receive a voice input and generate a voice signal based on the received voice input; a transmission unit configured to transmit the generated voice signal to an external server: a reception unit configured to receive a response signal that is returned from the server, the response signal being generated by the server based on the voice signal; a voice output unit configured to output a voice based on the received response signal; and a voice input control unit configured to, when the voice output unit outputs a voice, keep the voice signal generation unit in a receivable state for a predetermined period after output of the voice, the receivable state being a state in which a voice input is receivable.

According to the device relating to the one aspect of the present invention, in the case where a voice generated by the server is output, the user can input a voice without performing an operation with respect to the device. This reduces the number of times that the user needs to perform an operation in accordance with a voice that is dialogically input, compared with a conventional technique.

INDUSTRIAL APPLICABILITY

The voice dialogue method and the device relating to the present invention are widely utilizable for a voice dialogue system that performs processing based on a voice that is dialogically input by a user.

REFERENCE SIGNS LIST

100 voice dialogue system
110 voice dialogue agent server

120 network
130 gateway
140 device
210 control unit
220 voice input unit
230 operation reception unit
240 address storage unit
250 communication unit
260 voice output unit
270 display unit
280 execution unit
400 voice dialogue agent
410 control unit
420 communication unit
430 voice recognition processing unit
440 dialogue DB storage unit
450 voice synthesizing processing unit
460 instruction generation unit

The invention claimed is:

1. A voice dialogue method that is performed by a voice dialogue system, the voice dialogue system including: [a voice signal generation unit; a voice dialogue agent unit; an additional voice dialogue agent unit; a voice output unit; and a voice input control unit] *a first device; a second device; a first voice dialogue agent server; and a second voice dialogue agent server, wherein*

*the first device is a computer-embedded device that is capable of connecting to a network and performing input and output via a voice with a user,*

*the first voice dialogue agent server and the second voice dialogue agent server are each a voice dialogue agent server that is accessed by the first device via the network, and is capable of performing, as an agent for the first device, recognition of a voice inputted by the device and synthesizing of a voice to be outputted by the first device, and* the voice dialogue method [comprising] *comprises*:

[a step of, by the voice signal generation unit,] receiving a voice input [and] *at the first device;* generating a voice signal *at the first device* based on the received voice input, *and transmitting the voice signal from the first device to the first voice dialogue agent server*;

[a step of, by the voice dialogue agent unit,] performing voice recognition processing on the generated voice signal [and] *at the first voice dialogue agent server to generate first text input;* determining, *at the first voice dialogue agent server* based on [a result of the voice recognition processing] *the generated first text input* and agent information, which one of the [voice dialogue agent unit] *first voice dialogue agent server* and the [additional voice dialogue agent unit] *second voice dialogue agent server* is appropriate for performing voice-related processing that is processing based on the voice signal, the agent information being stored in a memory included in the [voice dialogue agent unit] *first voice dialogue agent server* and associating the [additional voice dialogue agent unit] *second voice dialogue agent server* with one or more keywords;

[a step of, when the voice dialogue agent unit determines that the voice dialogue agent unit is appropriate for performing the voice-related processing, by the voice dialogue agent unit, performing processing based on the result of the voice recognition processing to generate a response signal, and by the voice output unit, outputting a voice based on the response signal generated by the voice dialogue agent unit;

a step of, when the voice dialogue agent unit determines that the additional voice dialogue agent unit is appropriate for performing the voice-related processing, by the voice dialogue agent unit, transferring the voice signal to the additional voice dialogue agent unit, by the additional voice dialogue agent unit, performing new voice recognition processing on the transferred voice signal and performing processing based on a result of the new voice recognition processing to generate a response signal, and by the voice output unit, outputting a voice based on the response signal generated by the additional voice dialogue agent unit; and a step of, when the voice output unit outputs a voice, by the voice input control unit, keeping the voice signal generation unit in a receivable state for a predetermined period after output of the voice, the receivable state being a state in which a voice input is receivable]

*when the determining determines that the first voice dialogue agent server is appropriate for performing the voice-related processing, (i) generating, from the generated first text input, a first instruction set for the first device or another device associated with the first voice dialogue agent server, (ii) executing the generated first instruction set using the first device or the other device associated with the first voice dialogue agent server, (iii) generating a first response signal based on the execution of the generated first instruction set using the first device or the other device associated with the first voice dialogue agent server, (iv) transmitting the generated first response signal from the first voice dialogue agent server to the first device, and (v) outputting a voice at the first device based on the received first response signal generated at the first voice dialogue agent server;*

*when the determining determines that the second dialogue agent server is appropriate for performing the voice-related processing, (i) transferring the voice signal from the first voice dialogue agent server to the second voice dialogue agent server, (ii) performing new voice recognition processing on the transferred voice signal at the second voice dialogue agent server to generate second text input, (iii) generating, from the generated second text input, a second instruction set for the second device, (iv) executing the generated second instruction set using the second device, (v) generating a second response signal based on the execution of the generated second instruction set using the second device, (vi) transmitting the generated second response signal from the second voice dialogue agent server to the first device, and (vii) outputting a voice at the first device based on the received second response signal generated at the second voice dialogue agent server; and*

*displaying, on a screen of the first device or a screen of the second device, a text character string obtained by recognizing voice input from the user and a text character string indicating a response signal by the first device or the second device, while indicating a distinction between the user, the first voice dialogue agent server, and the second voice dialogue agent server.*

2. The voice dialogue method of claim [1] *6*, wherein the voice dialogue system further includes a display [unit], and the voice dialogue method further comprises

[a step of, while the voice signal generation unit] *when the device* is in the receivable state, [by the display unit,] displaying *on the display* that the [voice signal generation unit] *first device* is in the receivable state.

3. The voice dialogue method of claim 2, further comprising:

[a step of, when the voice dialogue agent unit determines that the voice dialogue agent unit is appropriate for performing the voice-related processing, by the display unit,] *when the determining determines that the first voice dialogue agent server is appropriate for performing the voice-related processing,* displaying *on the display* that the [voice dialogue agent unit] *first voice dialogue agent server* is appropriate for performing the voice-related processing; and

[a step of, when the voice dialogue agent unit determines that the additional voice dialogue agent unit is appropriate for performing the voice-related processing, by the display unit,] *when the determining determines that the second dialogue agent server is appropriate for performing the voice-related processing,* displaying *on the display* that the [additional voice dialogue agent unit] *second voice dialogue agent server* is appropriate for performing the voice-related processing.

4. The voice dialogue method of claim 2, further comprising

[a step of,] when the [voice signal generation unit] *first device* is in the receivable state and a response signal generated by the [voice dialogue agent unit] *first voice dialogue agent server* indicates that a new voice input does not need to be received, [by the voice input control unit,] switching the [voice signal generation unit] *first device* to an unreceivable state even during the predetermined period, the unreceivable state being a state in which a voice input is unreceivable.

5. The voice dialogue method of claim 1, wherein the [additional voice dialogue agent unit] *second voice dialogue agent server* is provided in plural, the agent information associates each of a plurality of identifiers with one or more keywords, the identifiers each identifying one of the [additional voice dialogue agent units] *second voice dialogue agent servers*, and the voice dialogue method further comprises

[a step of,] when any of the keywords is included in the result of the [voice recognition processing, by the voice dialogue agent unit] *generated first text input*, determining, *at the first voice dialogue agent server,* that one of the [additional voice dialogue agent units] *second voice dialogue agent servers* that is identified by an identifier associated with the included keyword is appropriate for performing the voice-related processing.

*6. The voice dialogue method of claim 1, further comprising*

*when the first device outputs a voice, keeping the first device in a receivable state for a predetermined period after output of the voice, the receivable state being a state in which a voice input is receivable at the first device.*

*7. The voice dialogue method of claim 1,*

*wherein the first device or the other device associated with the first voice dialogue agent server is disposed in a home, and the second device is disposed in a vehicle.*

*8. The voice dialogue method of claim 7,*

*wherein the first device is one of a television, an air conditioner, a recorder, a washing machine, and a portable smartphone,*

*wherein the other device associated with the first voice dialogue agent server is different from the first device and is one of a television, an air conditioner, a recorder, a washing machine, and a portable smartphone, and*

*wherein second device is one of a car air conditioner and a car navigation system.*

*9. The voice dialogue method of claim 1,*

*wherein the first device includes a display which displays (i) when the determining determines that the first voice dialogue agent server is appropriate for performing the voice-related processing, a first character string or a first icon identifying the first voice dialogue agent server and the received first response signal, and (ii) when the determining determines that the second dialogue agent server is appropriate for performing the voice-related processing, a second character string or a second icon identifying the second voice dialogue agent server and the received second response signal.*

* * * * *